US007225342B2

(12) United States Patent
Takao et al.

(10) Patent No.: US 7,225,342 B2
(45) Date of Patent: May 29, 2007

(54) TERMINAL APPARATUS, COMMUNICATION METHOD, AND COMMUNICATION SYSTEM

(75) Inventors: Naoya Takao, Kobe (JP); Keiji Sugiyama, Jyoyo (JP); Toshiya Mori, Settu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 714 days.

(21) Appl. No.: 10/623,742

(22) Filed: Jul. 22, 2003

(65) Prior Publication Data

US 2004/0131187 A1 Jul. 8, 2004

(30) Foreign Application Priority Data

Jul. 23, 2002 (JP) ............................ 2002-213401
Oct. 15, 2002 (JP) ............................ 2002-300108

(51) Int. Cl.
*G06F 1/24* (2006.01)
(52) U.S. Cl. ....................... 713/193; 713/153; 713/168
(58) Field of Classification Search ............... 713/193, 713/168, 153
See application file for complete search history.

(56) References Cited

U.S. PATENT DOCUMENTS 5,109,384 A * 4/1992 Tseung ....................... 714/748
5,297,143 A * 3/1994 Fridrich et al. ............. 370/445
6,223,286 B1 * 4/2001 Hashimoto ................... 713/178

FOREIGN PATENT DOCUMENTS

| EP | 0 887 982 | 12/1998 |
|---|---|---|
| JP | 2002-122366 | 4/2002 |
| WO | 02/01799 | 1/2002 |

OTHER PUBLICATIONS

Harney H and Muckenhirn C, entitled "*Group Key Management Protocol (GKMP) Specification*", RFC 2093, IETF Network Working Group, Jul. 1997, pp. 1-23, XP015007877.
Dondeti L.R., et al., entitled "*Scalabe Secure One-To-Many Group Communication Using Dual Encryption*", Computer Communications, Elsevier Science Publishers BV, Amsterdam, NL, vol. 23, No. 17, Nov. 1, 2000, pp. 1681-1701, XP004238472.

* cited by examiner

*Primary Examiner*—Thomas R. Peeso
(74) *Attorney, Agent, or Firm*—Wenderoth, Lind & Ponack, L.L.P.

(57) ABSTRACT

A manager or an issuer issues a participation certificate, for an ordinary user who will newly join a group formed on a network made up of specified users, on which the manager or issuer creates a digital signature by the use of a private key of the group. Members belonging to the group authenticate one another as belonging to the same group and as authorized members of the group, on the basis of their respective participation certificates.

34 Claims, 33 Drawing Sheets

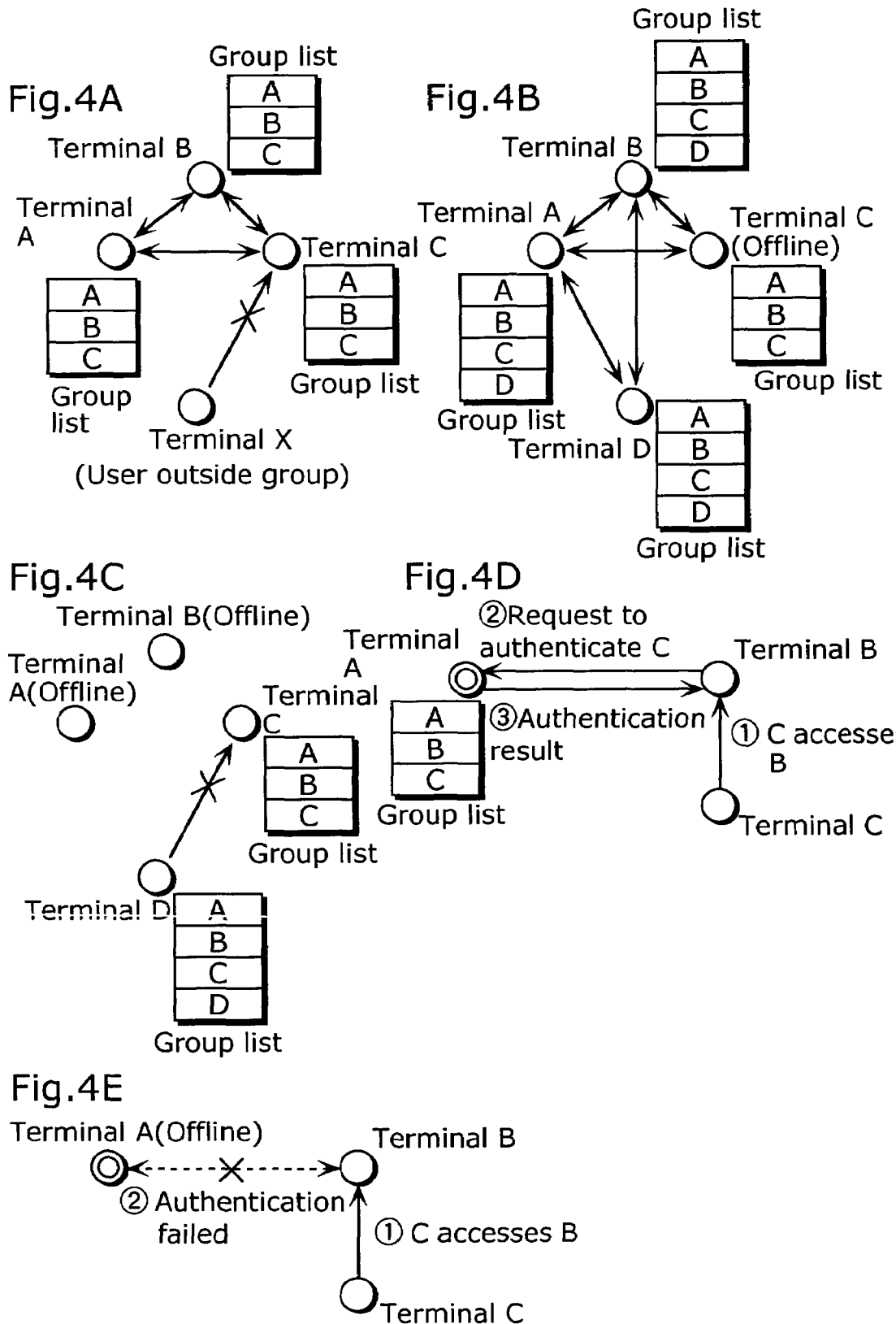

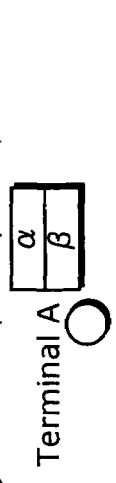
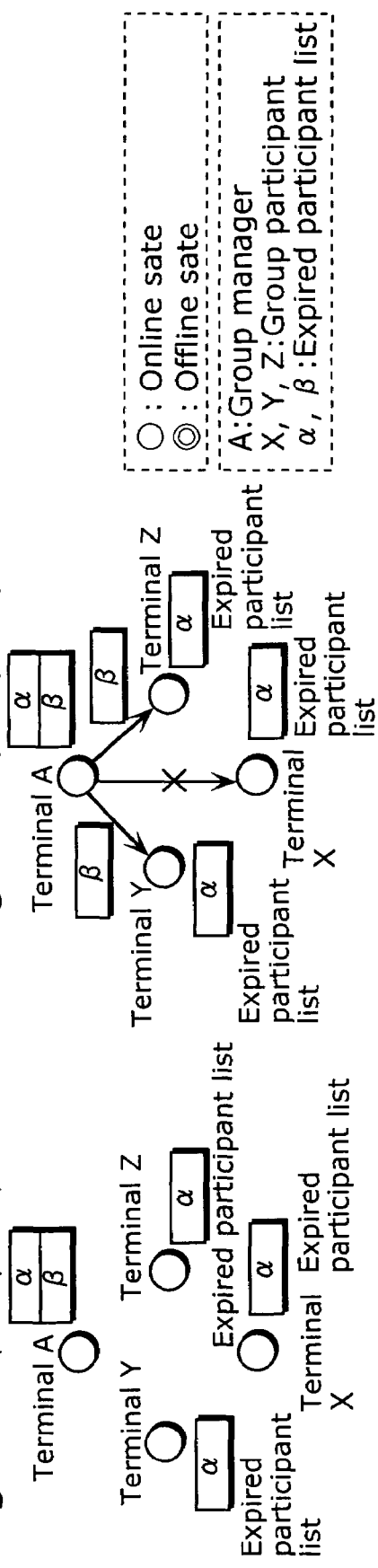
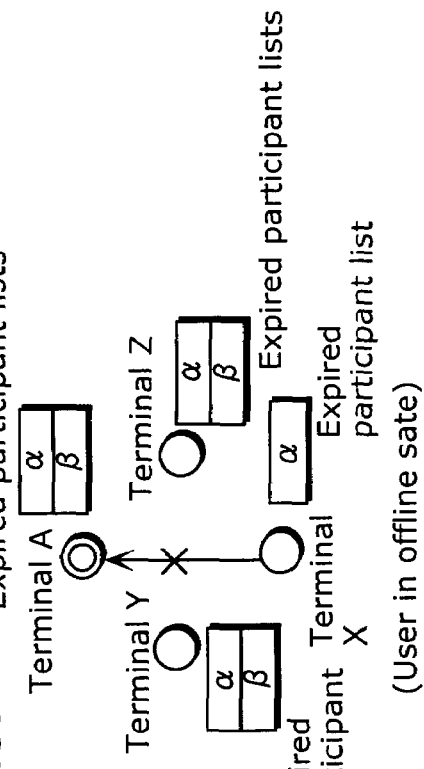
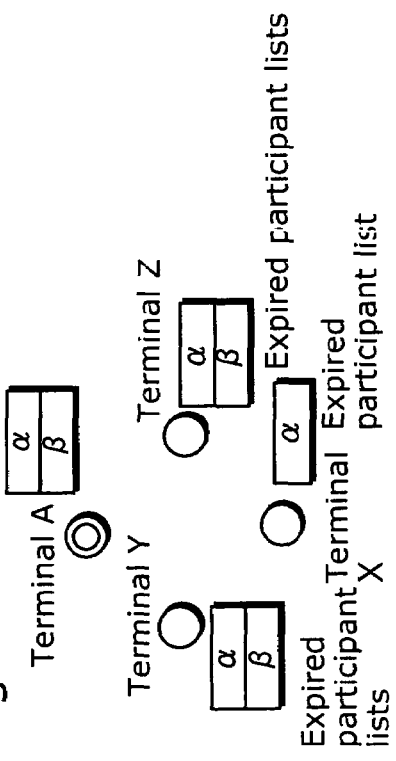

Fig.10

KX_P:Public key of X
KX_S:Private key of X
KG_P:Group public key
C_X=e(KX_P+T_X, KG_S):Group participation certificate of X

Fig.15

KB_P:Public key of B
KB_S:Private key of B
KG_P:Group public key
I_B=e(KB_P+T_B, KG_S)
            :Group participation certificate issue permit of B

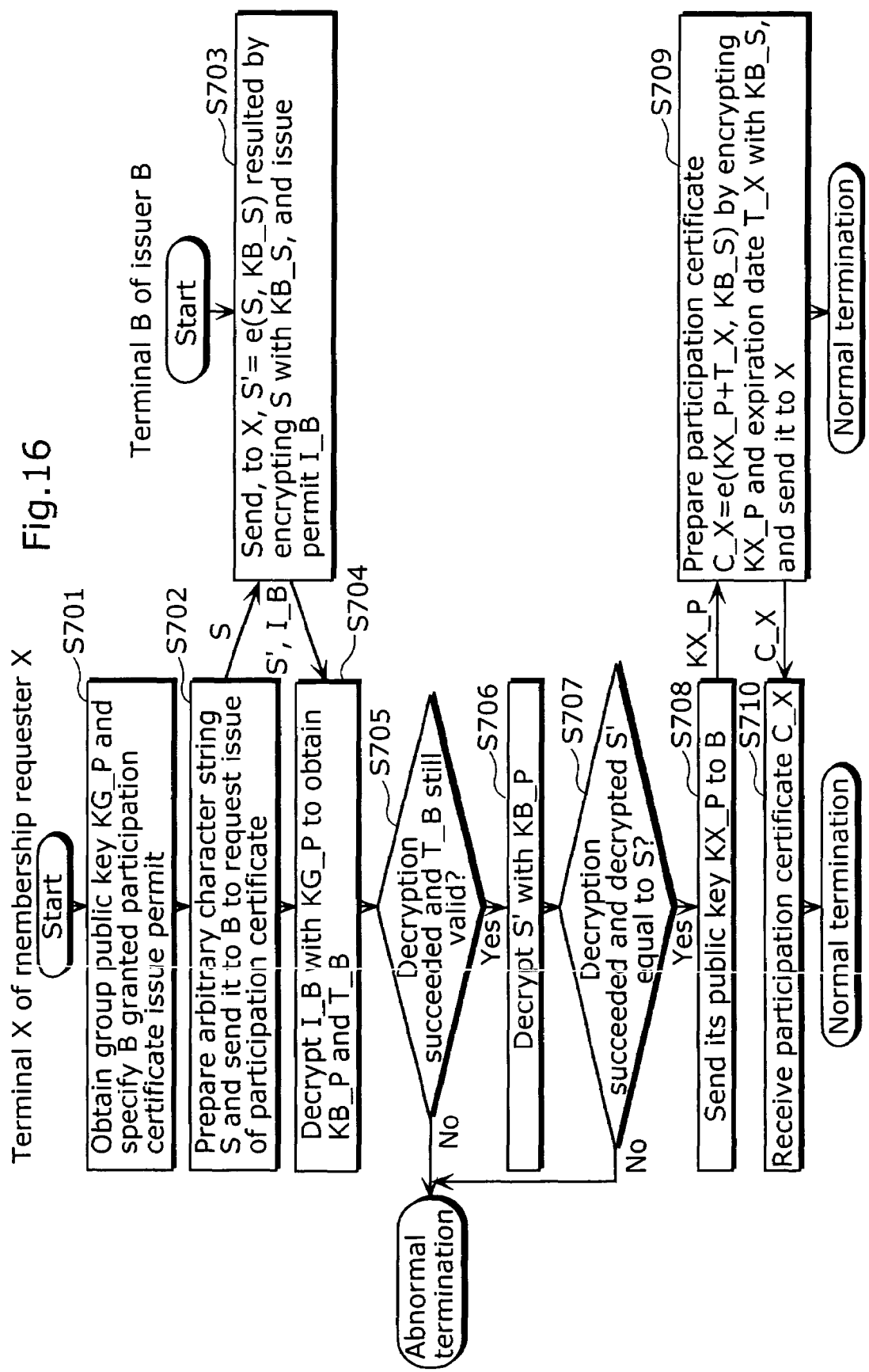

Fig.17

```
KX_P:Public key of X
KX_S:Private key of X
KG_P:Group public key
I_B=e(KB_P+T_B, KG_S)
    :Group participation certificate issue permit of B
C_X=e(KX_P+T_X, KB_S):Group participation certificate of X
```

Fig.18

```
KY_P:Public key of Y
KY_S:Private key of Y
KG_P:Group public key
I_C=e(KC_P+T_C, KG_S)
    :Group participation certificate issue permit of another issuer C
C_Y=e(KX_P+T_X, KB_S)
        :Group participation certificate of Y issued by C
```

Fig.21

KX_P:Public key of X
KX_S:Private key of X
KG_P:Group public key
I_B=e(KB_P+T_B, KG_S)
   :Group participation certificate issue permit of B
C_X=e(KX_P+T_X', KB_S):Group participation certificate of X

Fig.23

KB_P:Public key of B
KB_S:Private key of B
KG_P:Group public key
I_B'=e(KB_P+T_B', KG_S)
    :Group participation certificate issue permit of B

Fig.25

RLT_X: Collection of expired participant lists (expired participant list set) possessed by X
DRL_X: Collection of expired participant lists (difference expired participant list) not possessed by X
ARL_X: Collection of expired participant lists (additional expired participant list) not possessed by X
a, b, c, d, ...: Expired participant list ID
CRL(a): Expired participant list whose ID is "a"

Fig.27

KG_P:Group public key
IG:Information about group
    (Category, information required for participation etc.)

Fig.29

EY:Entry point information Y
    (IP address, port number etc.)
C_Y:Group participation certificate of Y

Fig.31

KG_P':Latest group public key

Fig.34

EY:Entry point information of Y
    (IP address, port number etc.)
C_Y:Group participation certificate of Y
I_B:Group participation certificate issue permit of B

TERMINAL APPARATUS, COMMUNICATION METHOD, AND COMMUNICATION SYSTEM

BACKGROUND OF THE INVENTION (1) Field of the Invention

The present invention relates to a communication method used between a terminal belonging to a virtual group comprised of a plurality of terminals connected to one another via a general network and another terminal whose relation with the group is unknown. More particularly, the present invention relates to an authentication method for performing authentication between the terminal and the other terminal in situations such as when the other terminal joins the group and when the other terminal wishes to obtain information it requires from the terminal belonging to the group.

(2) Description of the Related Art

The number of user terminals enjoying a variety of network services on the Internet has been increasing at an accelerated rate thanks to reductions in the prices of Internet access devices and connection fees, as well as to a wider variety of connection devices and the improvement in the speed of communications. At around the time when the commercial application of the Internet first started, most of the Internet services were one-way services in which ordinary users download information from the servers of information providers, by using their own terminals. At present, however, such information providers are not limited to a certain type of people, as there are an increased number of users wishing to transmit their privately-owned information (e.g. text data, still picture data, sound data, and moving picture data), many of whom place their information on WWW (World Wide Web) servers so that other users can view such information.

Methods in which such information providers provide information are roughly divided into two: information providers (1) operate their own servers to provide information; and (2) upload information they wish to provide onto servers that accept information on a free or chargeable basis.

Furthermore, there is an increasing demand for sharing privately-owned information only among a plurality of terminals owned by specific users (to be referred to as "group" hereinafter) such as friends, family members and those who have the same hobby, rather than transmitting information to general user terminals. As a major method in response to such a demand, there is a method utilizing an authentication server (which may be the server of an information provider) on which a set of a user ID and password (to be also referred to as "group list" hereinafter) of a user who has been permitted to join a group is registered, and a decision is made as to whether or not to permit such user to share information in the group, by verifying the set of the user ID and password inputted from a user terminal.

Also, when a formed group is made public, membership to the group is solicited from general users by registering information about the group (i.e. the category of the group, member information, and conditions for membership) on the authentication server. Then, the general users know about the registered group by accessing the authentication server, and obtain information required for joining the group. Many of the groups intended for having communications over networks (e.g. chat, BBS, and mailing list) let the public know about them in the above manner.

In a case such as the one described above where an information provider stores information on a server, and an information user accesses the server through his/her terminal (so-called client-server model), the following problems arise: when an information provider operates a server on his/her own, (1) A high degree of knowledge is required: a technical knowledge on servers, networks and so forth is required, making it difficult for general users to operate servers of their own;

(2) Costly: operation cost is required for making a server dedicated to providing information in operation all the time, other than costs for equipment and software;

(3) There are limitations on the capacity of servers regardless of whether a service is chargeable or free: since there is a limitation on the information storage capacity of a server in many cases (in a case of servers which impose charges for information usage on information users, it is possible to relax limitations on capacity by making such information users bear most of the costs), and therefore, only a limited number of people can be information providers;

(4) Privacy leakage: there is a possibility that information stored on a server may be leaked to a third person due to some sort of accident even when an information provider is trustworthy, and therefore, it is difficult to protect privacy in a perfect manner; and (5) Reliability as an open issue to be addressed: no information can be provided or shared at all when a server becomes inaccessible due to some sort of trouble.

The above-listed "limitations on capacity" does not pose a problem when an information provider can recover all costs incurred for providing information by obtaining an income in compensation for providing information. However, it is impossible to recover such costs when general users disseminate information or share information among user terminals.

As a solution to the above-listed problems that arise when information is shared in a communication of a client-server model as mentioned above, a peer to peer (to be referred to as "P2P" hereinafter) model has been a recent focus of attention. A "P2P" model is a communication method in which information is not concentrated on a server but is directly sent/received to and from an information provider and an information user when required, and therefore can serve as a solution to the above-listed problems (for example, refer to Keiichi KOYANAGI, *P2P—New Century of the Internet* (*P2P Internet no shin-seiki*), Ohmsha Ltd, 2002).

FIG. 1 is a conceptual diagram showing the flow of processing in a case where information is transferred among user terminals participating in a P2P model network (to be referred to as "P2P network" hereinafter). Assume that each user terminal (more specifically, terminals A–F) in FIG. 1 knows the existence of at least one other terminal participating in the P2P network. For example, the terminal A knows the terminals B and F, the terminal B knows the terminals A, C and D, the terminal D knows the terminals B and E, the terminal E knows only the terminal D, and the terminal F knows the terminals A and C, respectively. Here, assume that a user of the terminal A wishes to obtain certain information in the above state. In order to receive information that the user of the terminal A requires, the user needs to make a search required for specifying the terminal of another user who possesses such information.

Regarding the instructions of the user, the terminal A sends, to the terminals B and F, a request indicating that the user of the terminal A wishes to search for a user terminal having the above information (to be referred to as "search request" hereinafter). Next, the terminals B and F relay the search request sent from the terminal A to the user terminals they respectively know, and further to the user terminals known to the user terminals that terminals B and F know (S1501). Then, user terminals that have information satisfying the search request (the terminals C and E in this case) directly notify the terminal A that they have such information (S1502 and S1503). The terminal A selects the terminal E based on a certain sort of judgment criteria, and the information is directly transferred from the terminal E to the terminal A in the end (S1504). Of course, both the terminals C and E may directly transfer such information to the terminal A.

Accordingly, the above problems (1)–(5) with the client-server model can be solved as described below:

(1) A high degree of knowledge on server operation is not required, since there is no need for operating a server;

(2) Cost for operating or using a server is not required;

(3) Since the information recipient A receives information directly from the information sender E, limitations on the amount of information to be transferred are imposed only on a local recording capacity of the terminal E, meaning that there is virtually no limitation on capacity;

(4) Since information is not transferred via a third person other than the terminals A and E, information privacy can be protected if the communication between the terminals A and E is encrypted by using an existing technique; and (5) It is possible for the terminal A to obtain necessary information from the terminal C, even when the terminal E is not on the network (in offline state).

Meanwhile, when a user wishes to participate in a group formed on the P2P network, and to share privately-owned information among other group members, the following requirements (A) and (B) need to be satisfied (due to the fact that there is no authentication server in this case):

(A) A user wishing to join the group needs to obtain information about the group using some method or other;

(B) User terminals of group members need to authenticate one another to confirm if they really participate in such group, when information is to be shared among such group members.

First, let us think about the requirement (A).

An information search method of the above-mentioned P2P model can be used to obtain information about the group. By making a search which is required for obtaining information about the group on the P2P network, it is possible to obtain the group information on the network without needing to use an authentication server.

First, a user is required to obtain (1) information for identifying the group on the network and (2) information about the attribute of the group and the like that is indicative of which category such group belongs to, and then (3) information indicating where to be connected in order to participate in the group.

The above information (1) is an ID and the like assigned to the group by which the group can be uniquely identified. The above information (2) is the group category, its intention, requirements for participating the group, and the like. Finally, the information (3) is IP addresses, port numbers and the like of group members which are required for actually making an access to such group members.

In the following, the above information (1) is referred to as "group identification information", the information (2) is referred to as "group attribute information" and the information (3) is referred to as "entry point information". Moreover, the information (1) and (2) are collectively referred to as "group information".

First, a user obtains group identification information and group attribute information by means of a search, and decides whether or not to join the group by referring to the obtained group attribute information. When deciding to join the group, the user searches for entry point information of the group so as to obtain the entry point information. When this is done, the user specifies which entry point information in the group is needed, according to the previously obtained group identification information. When obtaining the entry point information, the user then needs to go through the procedure for joining the group by making an access to the entry point indicated by such entry point information. When the above processing is performed by the use of the search method of the P2P network, two problems arise because of the fact that the group information is not managed by an authentication server.

The first problem is the falsification of the group information. As shown in FIG. 2, assume that there are three groups G1, G2, and G3 on the network. Here, the terminal A of the user A specifies a condition α which should be satisfied by a group that the user A wishes to join, and searches for group information on the P2P network (S3101).

Next, upon receipt of the search request from the terminal A, the terminals B and F belonging to the group G2 judge whether the group information of their group matches the condition α specified by the terminal A. In an example shown in FIG. 2, since the group G2 does not satisfy the condition α, the terminals B and F transfer the above search request to the user terminals they respectively know. Subsequently, the terminals C and D of the group G1 that satisfy the condition α notify the terminal A of group identification information DI1 and group attribute information AI1 they possess (S3102 and S3103).

Accordingly, the user A of the terminal A comes to know the existence of a group that satisfies the condition α s/he specified, and therefore obtains an opportunity to participate in such group.

As shown in FIG. 3, however, it is easy to falsify group information on the P2P network. The user A in FIG. 3 specifies the condition α which should be satisfied by a group the user A wishes to join, using the terminal A, and searches for group information on the P2P network, as in the case of FIG. 2 (S3201).

In response to this search, there is a possibility that fraudulent responses are returned in the following manner:

(1) A person who responds to the search falsifies group attribute information of its own group For example, assume the following case: the user B of the terminal B sends, to the terminal A as a response to the search request, not group attribute information AI2 but group attribute information AI1 of another group which satisfies the condition α, out of the group information of the group to which the user B belongs (S3202). In this case, there is a possibility that the user A will join the group G2 which does not satisfy the condition α which s/he specified.

(2) A person who responds to the search uses group identification information of another group and falsifies group attribute information of such group For example, assume the following case: the user E of the terminal E uses group identification information DI1 of another group, and fakes such group attribute information AI4 that satisfies the condition α so as to send the fake group attribute information to the terminal A (S3203). As a result, there arises a possibility that the user A obtains false group attribute information of the group G1, and that false group attribute information AI4, which is not the group attribute information of the G1, is disseminated as such. Similarly, the same kind of falsification can take place when a search is made for entry point information.

Here, referring to FIG. 2, an explanation is given of the flow of processing for searching for entry point information, utilizing the information search method of the P2P network.

First, the user A specifies a condition α and group identification information of a group whose entry point information s/he wishes to obtain so as to make a search. Users C and D who belong to a group identified by such specified group identification information return their own entry point information as a response to the above search via their respective terminals.

In this case, too, it is easy for the above users who return a response to make a fraudulent response because of the fact that the group identification information and corresponding entry point information are not managed together by a server. In such a case, a fraudulent response is assumed to be made in the following manner:

(3) A person who responds to the search uses group identification information of another group and falsifies entry point information of such group. For example, it is possible for the terminal E to falsify entry point information and therefore return the entry point information of the terminal B in response to a search made by the terminal A for obtaining entry point information of the group G1. In this case, there is a possibility that the terminal A will join the group G2, which is not the group G1, and therefore, the member B of the group G2 is forced to deal with a wrong access made by the terminal A.

Of the above three fraudulent responses, the response (1) can take place in communications of a client-server model, but the responses (2) and (3) are more likely to take place in P2P environments. Since group identification information and corresponding group attribute information, and group identification information and corresponding entry point information are not managed by a server, a malicious user can make a fraudulent response by tampering with and transmit fake group attribute information and entry point information.

With the existing information search method of the P2P network, it is not possible to ascertain the validity of the above response. This is because anyone can make a response to a search made by a searcher in the existing search method of the P2P network.

The second problem is concerned with the uniqueness of a group. When a group is managed by an authentication server in a collective manner, it is easy to create an identifier for discriminating one group from another by the use of an authentication server. By using such an identifier as group identification information, a user can uniquely identify a group whose information s/he wishes to obtain.

On the P2P network, however, anyone can form a group freely and therefore it is not easy to determine an identifier for uniquely making a distinction between other groups. For example, assume that the user A forms a group and assigns an identifier G1 to such group, after which the user B forms another group and assigns the same identifier G1 to such group. In this case, another user C cannot discriminate between the user A's group and the user B's group using the identifier G1. More importantly, since a case is assumed where the user B will intentionally use the same identifier as that of the user A's group, the second problem cannot be solved by just using identifiers. Thus, what should be used as group identification information is one of the biggest issues in a case where groups are operated on the P2P network.

In order to solve the first and the second problems described above, it is possible to use a method in which information about a group and users is managed on an authentication server and actual data transfer is carried out in a P2P system. Such method, which is known as hybrid P2P, is one of the solutions to the above-mentioned problems (3) and (4) with client-server model. With this method, it is possible to protect group information from falsification, allowing group uniqueness to be easily assured.

Next, let us think about the requirement (B).

Referring to FIG. 4, an explanation is given of existing methods and the problems thereof.

As shown in FIG. 4, the first existing method is a method in which each user terminal in the group holds the same group list as one owned by an authentication server in the client-server model. In FIG. 4A, the user terminals A, B and C have their respective group lists on which the terminals A, B and C are described as the user (member) terminals making up the group (members). For example, when the user terminal C lets the other terminals (terminals A and B) know its user ID and password, the terminals A and B compare such user ID and password with the user ID and password described in their respective group lists. If the result of such comparison shows that the user ID and password presented by the terminal C match the user ID and password described on the group lists of the terminals A and B, the terminal C is authenticated as a group member, and is allowed to share information among the terminals A, B and C. Therefore, a user terminal X, which is not a group member, cannot know the user IDs and passwords described in the group list, and thus, the user terminal X is not allowed to share information among the terminals A, B and C. Accordingly, the privacy of the group comprised of the terminals A, B and C is protected.

However, there is a problem with the first existing method. Assume that the terminal A or the terminal B lets a terminal D join the group as a new member while the terminal C is in an offline state. In such a case, as shown in FIG. 4B, the user ID and password of the newly added terminal D are added to the group list of the terminals A, B and D, which enables them to share the group list with the same contents. However, since the terminal C is in an offline state at this point of time, it is impossible for the terminal C to update its group list. Next, assume the case where the terminals A and B are in offline state and only the terminals C and D are participating in the network (in an online state) (FIG. 4C). In this case, the terminal C cannot authenticate the terminal D as a group member since there is no description about the terminal D in the group list of the terminal C, making it impossible for information to be shared between the terminals C and D despite the fact that they are members of the same group (although there is a description about the terminal D in the group list of the terminal D, the terminal C cannot trust such description because of the possibility that the terminal D has tampered with the group list). In other words, there is a problem with the first existing method in that synchronization cannot be maintained among group lists possessed by the respective user terminals.

The second existing method to circumvent this problem is a method in which only a specified member holds a group list and such specified member makes changes in group members on the group list and performs authentication concerning a participation status of the user terminals in the group.

However, when hybrid P2P is employed in response to the requirement (A), the problems (1), (2) and (5) with the client-server model cannot be solved.

Furthermore, regarding the requirement (B), the second existing method has a problem in that, when the above-described specified member is in an offline state, the other members cannot authenticate with each other. In FIG. 4D, for example, assume that the terminal A is the above-described specified member, and the terminals B and C are the other group members. When the terminal A is in an online state, it is possible for the terminal B to authenticate the terminal C as a group member by making an inquiry about the terminal C to the terminal A. As shown in FIG. 4E, however, since the terminal B fails to make an inquiry to the terminal A when the terminal A is in an offline state, the terminal B cannot authenticate the terminal C, making it impossible for information to be shared between the terminals B and C, despite the fact that they are members of the same group.

As described above, when wishing to share information within a group on the P2P network that is capable of solving the problems of the client-server model, the following problems occur:

(1) There is a possibility that synchronization cannot be maintained among group lists possessed by the respective user terminals, in which case authentication cannot be performed even among members of the same group; and (2) If a specified member responsible for holding the group list is in offline state, the other members cannot authenticate with one another as members of the group.

Meanwhile, in a public key encryption system such as PKI, authentication is generally performed between terminals by the use of expired participants lists distributed from a specified server. Users make an access, via their terminals, to a server that distributes expired participant lists at the time of authentication or on a specified date, so as to update their respective expired participant lists possessed by their terminals.

However, since there is no server on the P2P network which is in operation all the time, it is impossible, with the above method, to obtain an expired participant list when the manager terminal is in an offline state.

As shown in FIG. 5A, a possible method which addresses this problem is one in which the manager A who prepared the expired participant lists broadcasts new expired participant lists to the terminals of all the group members via the terminal A. However, since the terminals of the group members are not always in an online state, the terminal X of the member X in an offline state cannot obtain an expired participant list as shown in FIG. 5B.

Furthermore, as shown in FIGS. 5C and 5D, if the terminal A enters in to an offline state before the terminal X, which failed to obtain an expired participant list, enters in to an online state, it is impossible for the terminal X now in the online state to make an access to the terminal A, and therefore, the terminal X cannot obtain an expired participant list after all, as shown in FIG. 5D.

SUMMARY OF THE INVENTION

The present invention has been conceived in view of the above problems. Accordingly, an object of the present invention is to provide a communication method and others which allows necessary information to be searched for without necessitating a server operation even when information is to be shared in a group, as well as allowing authentication to be always performed between arbitrary members to confirm if such members are members of the group.

In order to achieve the above object, a terminal apparatus according to the present invention is a terminal apparatus that communicates with another terminal apparatus on a network, and the terminal apparatus possesses a public key of a group formed on the network. The terminal apparatus comprises: an inquiry information sending unit operable to send inquiry information to the other terminal apparatus, where the inquiry information indicates an inquiry about whether or not other terminal apparatus is a terminal apparatus that is an authorized member of the group; an encrypted information receiving unit operable to receive predetermined encrypted information from the other terminal apparatus in response to the inquiry information sent by the inquiry information sending unit; a decryption trial unit operable to try decrypting the received encrypted information by using the group public key; an information judgment unit operable to make a judgment on whether or not decrypted information is appropriate, when the decryption succeeds in the decryption trial unit; and a terminal judgment unit operable to judge that the other terminal apparatus is a terminal apparatus that is an authorized member of the group, when the information judgment unit judges that the decrypted information is appropriate.

Accordingly, with the terminal apparatus according to the present invention, since information sent from a terminal apparatus to be authenticated which sent inquiry information used for authentication is decrypted with the public key of the group, and a judgment is made about whether or not the details of such information is appropriate so as to see if the terminal apparatus to be authenticated is an authorized member of the group, it is possible to always perform authentication to confirm whether or not the terminal apparatus to be authenticated is a terminal apparatus of a member of the group, without necessitating a server operation.

Also, in order to achieve the above object, the terminal apparatus according to the present invention is a terminal apparatus that communicates with another terminal apparatus on a network. The terminal apparatus comprises: an inquiry information sending unit operable to send inquiry information to the other terminal apparatus, where the inquiry information indicates that a user of the terminal apparatus whishes to obtain group information including a public key of a group formed on the network; a group information receiving unit operable to receive, from the other terminal apparatus, the group information on which a digital signature is created, in response to the inquiry information sent by the inquiry information sending unit; a group information verification unit operable to verify validity of the received group information, by using the public key included in the group information; and a group information judgment unit operable to judge that the group information has been obtained from a terminal apparatus of an authorized member of the group, when the validity of the group information is verified by the group information verification unit.

Accordingly, since a judgment is made on whether the other terminal apparatus is a terminal apparatus of a member of the group by (i) sending, to the other terminal, information indicating that the user of the terminal apparatus wishes to obtain group information, and (ii) by verifying the validity of the group information by the use of the group public key, the group information received from the other terminal on which a digital signature is created using the private key of the group, it is possible to always obtain group information from a terminal apparatus of an authorized member of the group, without necessitating a server operation.

Note that, in order to achieve the above object, it is possible for the present invention to be embodied as a communication method which includes, as its steps, the characteristic elements of the above terminal apparatus, and as a program which includes these steps. Also, such program can not only be stored in a ROM and the like included in a terminal apparatus, but also be distributed via recording media such as a CD-ROM, and transmission media such as a communication network. Furthermore, the present invention is also capable of being embodied as a communication system that includes the above terminal apparatus more than one in number.

FURTHER INFORMATION ABOUT TECHNICAL BACKGROUND TO THIS APPLICATION

The following prior applications are incorporated herein by reference:

Japanese Patent Application No. 2002-213401 filed Jul. 23, 2002; and

Japanese Patent Application No. 2002-300108 filed Oct. 15, 2002.

BRIEF DESCRIPTION OF THE DRAWINGS

These and other subjects, advantages and features of the invention will become apparent from the following description thereof taken in conjunction with the accompanying drawings that illustrate a specific embodiment of the invention. In the Drawings:

FIG. 4A is a diagram explaining a method, in the first existing method, for performing authentication among user terminals of the group, with each user terminal possessing a group list.

FIG. 4B is a diagram explaining a problem, in the first existing method, that occurs due to the fact that there is a terminal in an offline state when a terminal D is newly added.

FIG. 4C is a diagram explaining a problem, in the first existing method, that occurs due to the fact that some of group lists do not match when a terminal D is newly added.

FIG. 4D is a diagram explaining a method, in the second existing method, for performing authentication between user terminals of the group, with only a terminal of a specified member possessing a group list.

FIG. 4E is a diagram explaining a problem, in the second existing method, that occurs when a terminal of a specified member enters into an offline state.

FIG. 5A is a diagram explaining an existing method in which authentication is performed among terminals by broadcasting new expired participant lists from a terminal of a manager to terminals of group members.

FIG. 5B is a diagram explaining a problem, in the existing method of FIG. 5A, that occurs due to the fact that there is a member terminal in an offline state.

FIG. 5C is a diagram explaining a problem, in the existing method of FIG. 5A, that occurs when the terminal of the manager enters into an offline state.

FIG. 5D is a diagram explaining a problem, in the existing method of FIG. 5A, that occurs due to the fact that the terminal of the manger enters into an offline state.

FIG. 10 is a diagram showing an example of information possessed by a terminal of a membership requester after a process "Authenticate each other between group members" in the first embodiment.

FIG. 15 is a diagram showing an example of information possessed by a terminal of a candidate issuer after the process "Add group issuers" in the second embodiment.

FIG. 16 is a flowchart showing a flow of a process "Request new membership to group" in the second embodiment.

FIG. 17 is a diagram showing an example of information possessed by a terminal of a membership requester after the process "Request new membership to group" in the second embodiment.

FIG. 18 is a diagram showing an example of information possessed by a terminal of one of two participants after a process "Authenticate each other between group members" in the second embodiment.

FIG. 21 is a diagram showing an example of information possessed by a terminal of a participation certificate renew requester after the process "Renew group participation certificate" in the second embodiment.

FIG. 23 is a diagram showing an example of information possessed by a terminal of an issuer after the process "Renew group participation certificate issue permit" in the second embodiment.

FIG. 25 shows the meanings of terms used in FIG. 24.

FIG. 27 is a diagram showing an example of information possessed by a terminal of a searcher after the process "Obtain group information" in the third embodiment.

FIG. 29 is a diagram showing an example of information possessed by a terminal of a searcher after the process "Obtain entry point information" in the third embodiment.

FIG. 31 is a diagram showing an example of information possessed by a terminal of a searcher after the process "Renew group public key" in the third embodiment.

FIG. 34 is a diagram showing an example of information possessed by a terminal of a searcher after the process "Obtain entry point information" in the fourth embodiment.

DETAILED DESCRIPTION OF THE PREFERRED EMBODIMENTS

The following gives detailed explanations of the preferred embodiments of the present invention with reference to the drawings.

First, a brief description is given of the present invention. The present invention relates to communications among a plurality of terminals which are connected to one another over a network.

Ethernet, networks using analog/digital public or private lines, ADSL (Asymmetric Digital Subscriber Line), wireless LAN (Local Area Network) and the like are assumed as a network employed by the present invention, but the present invention is not limited to these networks. Moreover, TCP/IP (Transmission Control Protocol/Internet Protocol), which is widely used on the Internet, is assumed as a lower protocol of the network in the present invention, but the present invention is not limited to this protocol.

Each of the terminals has a communication interface that supports the above network, and communication processing is performed by causing the CPU in the respective terminals to execute a program for controlling the communication interface so as to communicate with another terminal. The following cases are assumed regarding such a program: (1) the program is stored in the ROM (Read Only Memory) inside the respective terminals from which such program is loaded onto the main memory or the RAM (Random Access Memory) of the respective terminals for execution; (2) the program is stored in a nonvolatile storage apparatus such as a hard disk and a removable disk of the respective terminals, from which such program is loaded onto the main memory or the RAM of the respective terminals for execution; and (3) the program is executed in combination of (1) and (2).

Furthermore, each of the terminals is equipped with input means for accepting inputs from its user. A keyboard, a mouse, a tablet and the like are usually used as such input means. Note that the configuration of such input means is generally known as those of a personal computer, and therefore detailed explanations thereof are omitted since they are out of the main focus of the present invention.

Note that a term "user" used in the following indicates a user of each of the terminal. Also note that in the network assumed by the present invention, each user terminal is not necessarily connected to the network all the time, and that address information of each user terminal (e.g. IP address, port number) required for communicating with another user is not fixed, and therefore address information can change every time each user gets connected to the network.

Figure 6:
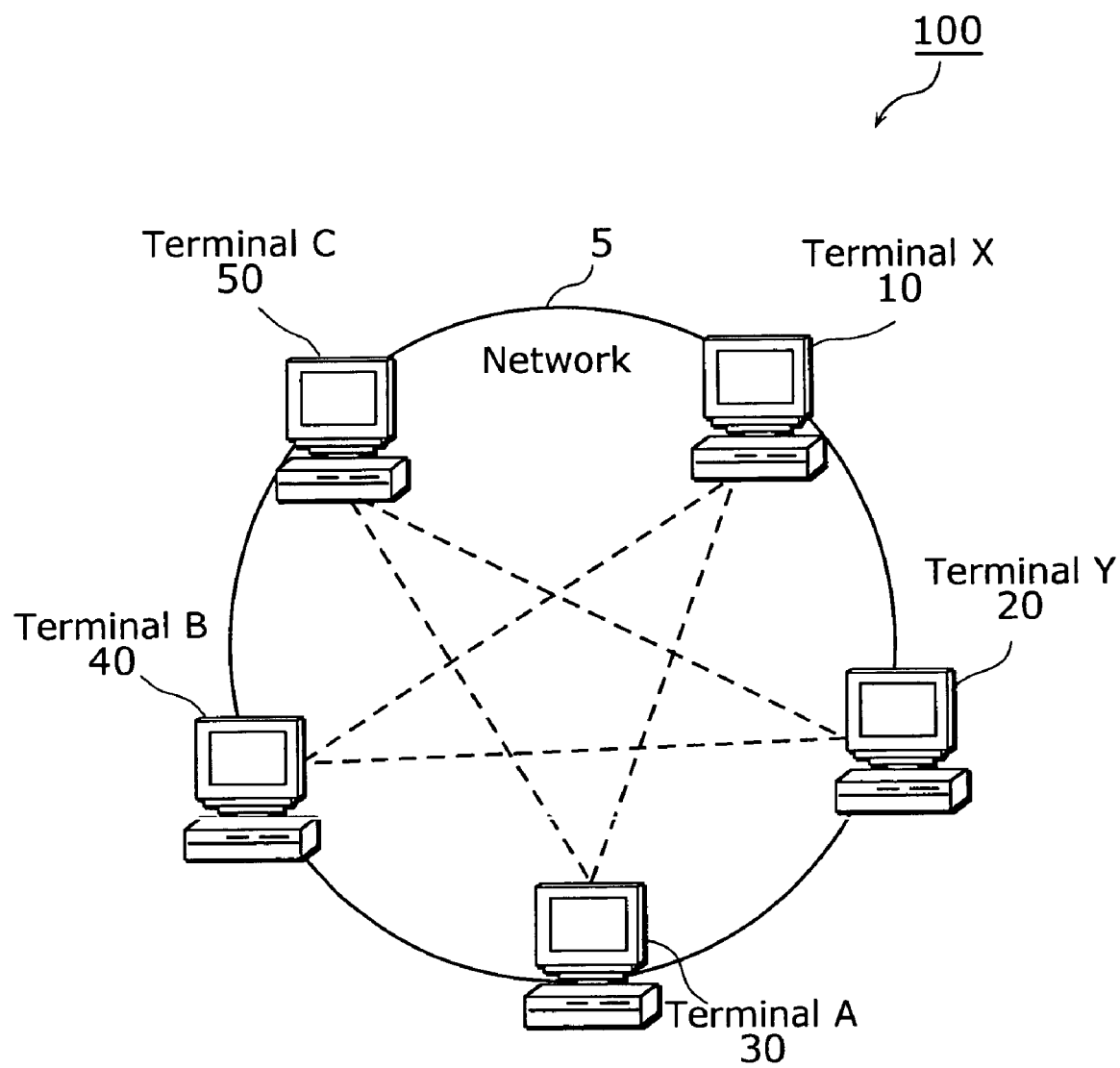
FIG. 6 is a diagram showing an example of a communication system according to the present invention.

In the following embodiments, as shown in FIG. 6, a P2P network is assumed as an example of the above-mentioned network, and each embodiment is explained with the P2P network in mind. A communication system 100 illustrated in FIG. 6 includes a virtual group formed on a P2P network 5 which is made up of terminals 10–50, each having an equal relationship to each other.

First Embodiment

First, an explanation is given of the overview of the public key encryption system to be employed in the present embodiment. The public key encryption system, which is an encryption system using a "public key" and a "private key", has the following characteristics: (1) it is impossible to calculate a public key from a private key and vice versa on a realistic time scale; and (2) information encrypted with a public key can be decrypted only by the use of a corresponding private key, and information encrypted with a private key can be decrypted only with a corresponding public key.

According to the characteristic (1), no problem occurs even when a public key is leaked to a third person as long as a user of this encryption method secretly holds a private key (a public key can be made public). Therefore, a person wishing to send certain information in a confidential manner needs to obtain a public key of a recipient in advance, and encrypts such information with the public key of the recipient so as to send the encrypted information to the terminal of the recipient. Subsequently, the recipient decrypts the received encrypted information by using a private key that only s/he possesses. Since it is impossible to decrypt the above encrypted information with any keys other than the private key of the recipient, even if a third person intercepts such encrypted information, there is no possibility that the information may be leaked to such third person. In the following, information that results from encrypting information to be encrypted M with a key K is described as "e (M, K)", for example.

Furthermore, it is also possible to employ a "digital signature" (to be referred to simply as "signature" hereinafter) for verifying that information has not been tampered with, instead of encrypting information itself by using the public key encryption system. More specifically, assuming that derivative information "H" to be uniquely derived from information "M" to be signed in accordance with a specified algorithm "f" is H=f(M), and that signature information that results from encrypting this derivative information H with a sender's private key "K_S" is "Sgn", the sender adds Sgn=e(H, K_S) to the above information M, and sends the addition result to the terminal of the recipient.

The terminal of the recipient receives such information M and the signature information Sgn, decrypts the signature information Sgn with a sender's public key "K_P" so as to obtain the derivative information H, and confirms that the information M has not been tampered with by a third person by verifying that H=f(M) is satisfied. This is because H=f (M) cannot be satisfied if the information M has been tampered with by a third person, and it is impossible to create the signature information Sgn, which can be decrypted normally by the use of the sender's public key K_P, without the sender's private key K_S.

The public key encryption system and a signature method, which is an application of the public key encryption system, are widely used for Internet communications where security is required to be assured. In the following, a public key and a private key of a certain user A are described as "KA_P" and "KA_S", respectively.

In the present embodiment, "group" shall be defined as follows: (1) a group is comprised of at least one group participant (to be also referred to simply as "participant" hereinafter); (2) each participant can join more than one group; (3) each group has its unique shared information; and (4) shared information of a group can be sent/received among users who have authenticated one another as belonging to the same group (to be referred to also as "members" hereinafter). Note that the above group shall be made up of one or more participants such as friends, family members, those who have the same hobby, neighbors and the like.

In the present embodiment, users making up a group are categorized into two types: a participant serving as a manger having the authority to issue group participation certificates (to be referred to also as "participation certificates" hereinafter); and the other participants. Ordinary users on the network are allowed to participate in the group by asking such manager to issue their group participation certificates and obtaining them. "Group participation certificate" here is defined as information used for performing group authentication, and "group authentication" is defined as that which a user of a certain group shows to other users to demonstrate that such user is a participant of the group, and vice versa.

In order to manage such group, the following processes are required:
(1) Form group;
(2) Advertise group;
(3) Obtain group information;
(4) Obtain entry point information;
(5) Request new membership to group;
(6) Authenticate each other between group members;
(7) Share information between group members;
(8) Renew group participation certificate;
(9) Remove group members;
(10) Add group managers; and
(11) Renew group public key.

The following explains each of the above-listed processes.

1. Form Group

For sharing information and other purposes, a user A wishing to form a virtual group on the network generates a pair of a public key "KG_P" and a private key "KG_S" dedicated for a group to be formed, and stores such pair of keys on its terminal (to be referred to as "terminal A" hereinafter) or holds them on his/her own. These keys may be generated on the basis of information (pass phrase) specified by the user A via the input means, or information such as random numbers generated by the functionality of the terminal A (including the functionality based on an application program, which is applicable to the following paragraphs).

2. Advertise Group

Figure 1:
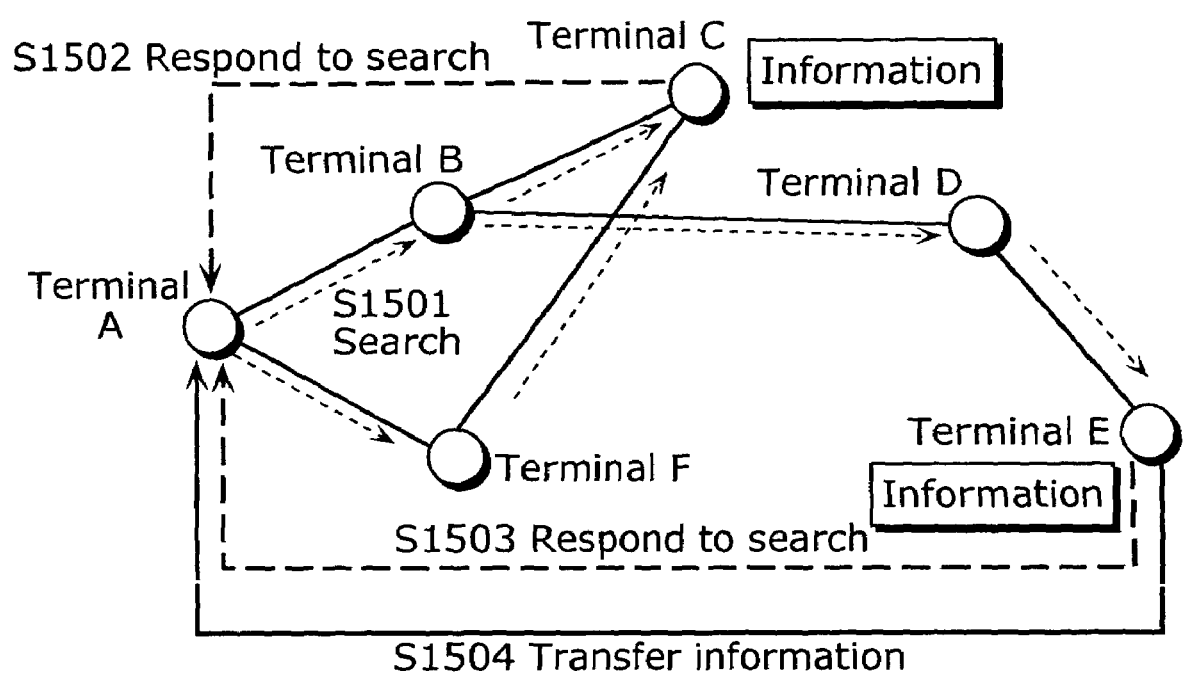
FIG. 1 is a conceptual diagram showing a flow of information transferred among user terminals participating in a P2P network.
Figure 2:
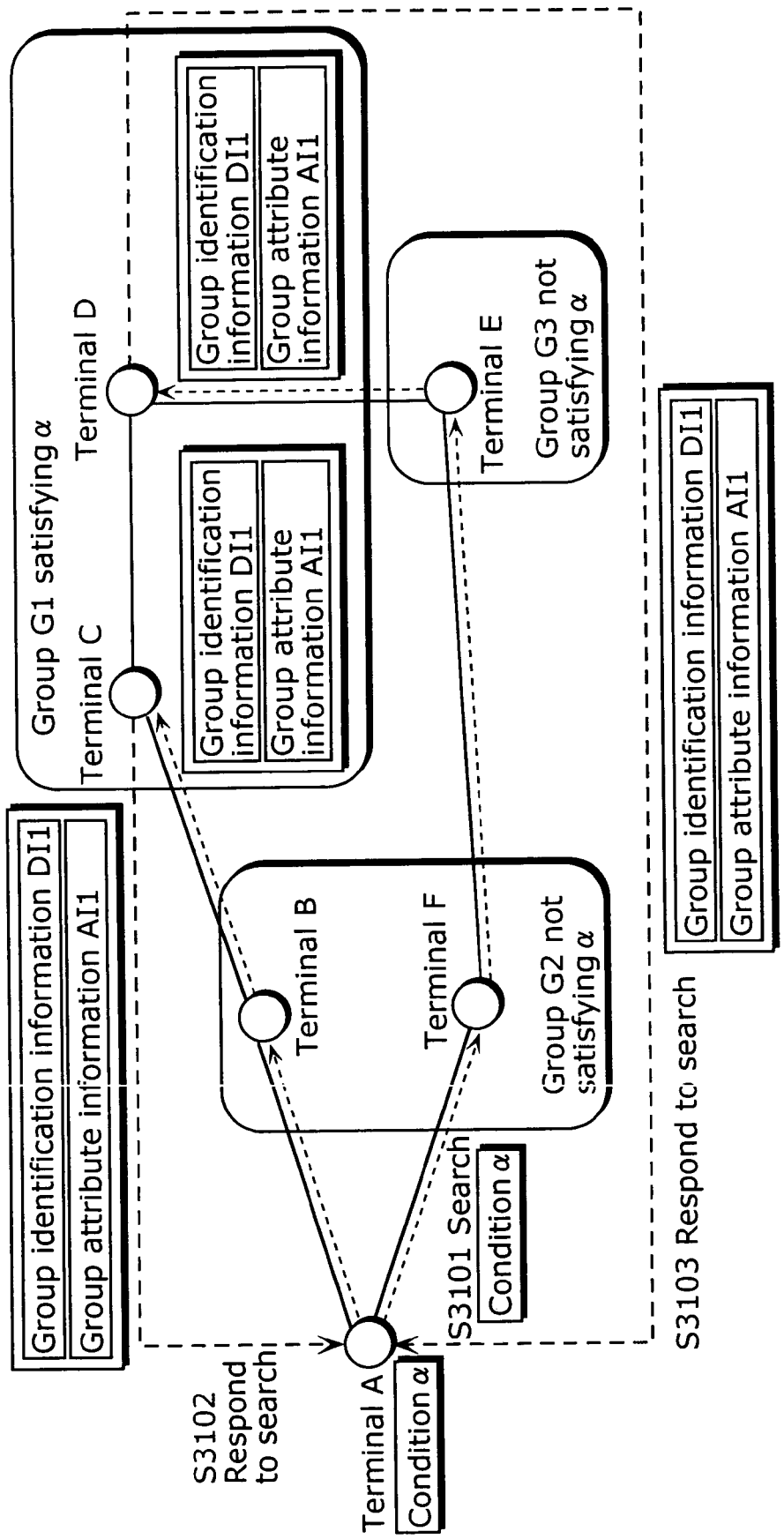
FIG. 2 is a conceptual diagram showing a flow of information in a case where group information is searched among three groups of G1, G2, and G3 on the P2P network.
Figure 3:
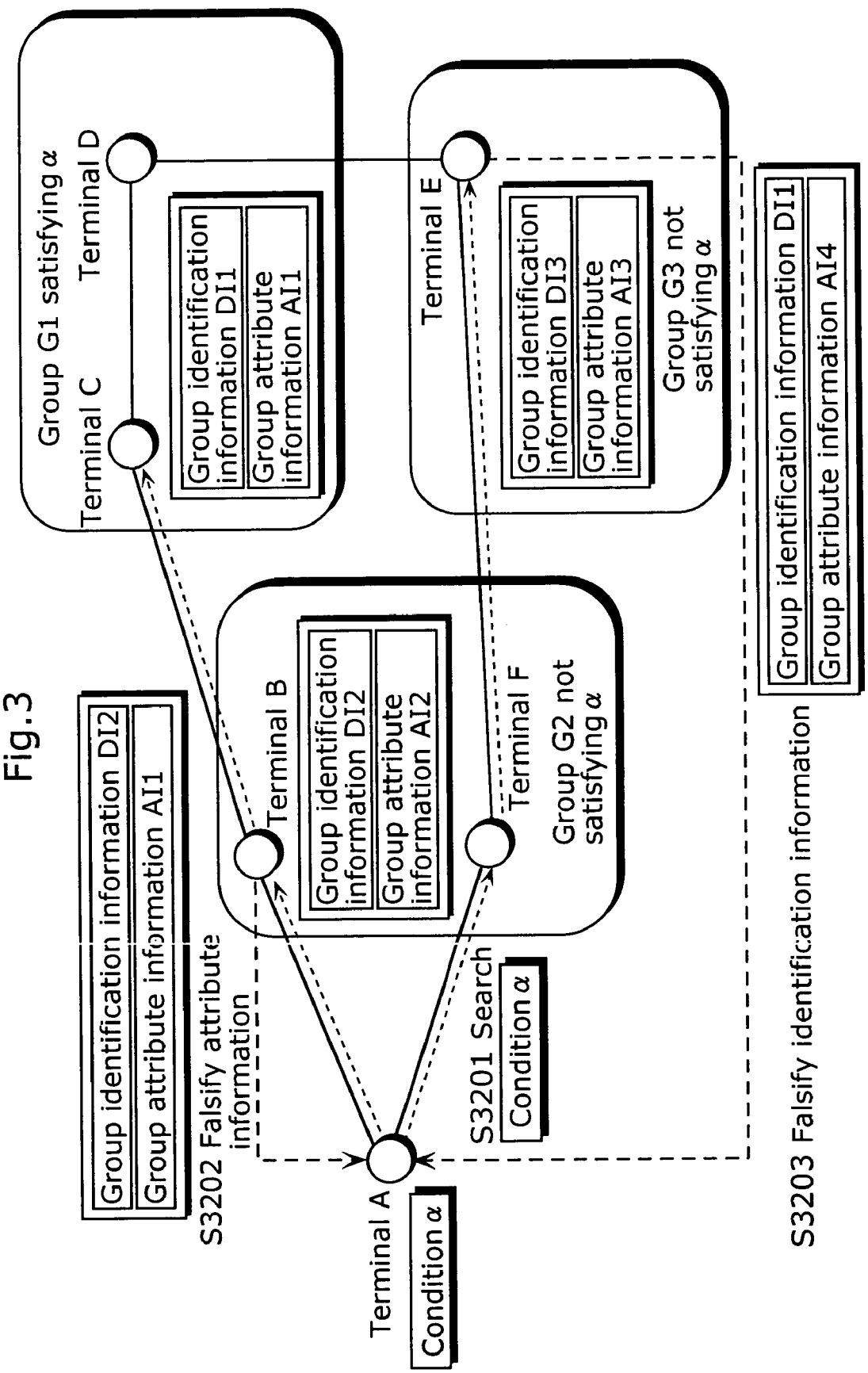
FIG. 3 is a conceptual diagram explaining a problem that occurs when group information is searched on the P2P network.

The terminal of a participant (the terminal A, for example) needs to disclose, to other user terminals, the generated group public key KG_P, as group information, as part of group identification information for identifying such group (e.g. group ID and the like which does not overlap with that of another group), by using some sort of method, examples of which are as listed below:

(1) The terminal A propagates the group information to all or some of the users on the P2P network illustrated in FIG. 1. Accordingly, such group information is transferred from one user terminal after another, and finally to a target terminal;

(2) The terminal A broadcasts such group information to the other user terminals connected to the same local area network (LAN) or virtual private network (VPN);

(3) The terminal A sends the group information (at least the group public key KG_P) directly to the other user terminals by E-mail and the like, which is a method other than information transfer on the P2P network;

(4) There is, for example, a group information index server for registering group information, and the terminal A registers information on such a group information index server so that other user terminals can freely obtain group information including the group public key KG_P; and (5) A combination of the above methods (1)~(4).

Note that the above group information includes group attribute information indicating the details of the group (e.g. the group name, information identifying the group originator, background, purposes, and conditions for participating in the group) and group identification information by which the group can be identified. Such group identification information shall include at least the group public key KG_P.

3. Obtain Group Information

A user X on the P2P network searches, via its terminal (to be referred to as "terminal X" hereinafter), for the group information which it wishes to belong to, by using one of the following methods so as to obtain the group identification information from the searched group information:

(1) Find a group that the user X wishes to join by specifying group identification information for identifying the group and group attribute information that is descriptive of the group, from the group information that the terminal X received in the past and currently holds (which includes group information that the terminal X received directly from the terminal A of the user A who is the group originator);

(2) Search for the group information, with part or whole of the group attribute information as a search key (which is also called a "keyword"), from among group information possessed by the other users, by utilizing the information search method of the P2P network illustrated in FIG. 1, and obtain the group identification information from the searched group information;

(3) If the group information index server is operated, a search is made for the group information, with part or whole of the group attribute information as a search key, on the group information index server, and obtain the group identification information;

(4) If the terminal X already knows about the terminal A of the group originator, obtain the group information and the group identification information directly from the group originator by using some sort of method (e.g. E-mail).

4. Obtain Entry Point Information

If the user X wishes to newly join a specified group, the user X needs to specify a group manager of such group and obtain entry point information required for connecting to the terminal of such manager (e.g. IP address and port number dedicated for communications). "Group manager" here means a user who has the authority to add or remove group members, and more specifically, a user who holds the group private key KG_S. In this case, the user X obtains the entry point information of the group manager by using one of the following methods:

(1) Perform a search, with part or whole of the group identification information as a search key, by utilizing the information search method of the P2P network illustrated in FIG. 1, to which the group manager responds. Then, the terminal X is notified of the entry point information of the group manager's terminal through such response from the group manager;

(2) Use a peer information server. "Peer information server" here means a server on which at least entry point information can be searched for among information of all the users connected to the P2P network in an online state or all the users participating in at least one group, and on which group identification information and group attribute information of each group is stored. The user X performs a search on such peer information server with the group identification information as a search key, and obtains the entry point information of the group manager's terminal according to the search result, as in the case of (1) above;

(3) If the terminal X already knows about the terminal A of the group manager and knows that the entry point information never changes, and that the terminal A is in an online state all the time, the terminal X is notified of the entry point information of the group manager;

5. Request New Membership to Group

The user X wishing to newly join a certain group communicates with the terminal A of the group manager A via the terminal X by the use of the entry point information, and asks the group manager to issue a "group participation certificate" to be explained later. A detailed explanation of this process is given later.

6. Authenticate Each Other Between Group Members

It is possible for group members who have obtained their group participation certificates in the above manner to authenticate each other as belonging to the same group. A detailed explanation of this process is given later.

7. Share Information Between Group Members

It is possible for a plurality of group members who have authenticated each other as belonging to the same group (e.g. the terminal X of the user X and the terminal Y of the user Y) to transfer the group information between themselves. This can be achieved by performing the following processes ((7-1) and (7-2)), for example:

(7-1) Setting of an Encryption Key Used for Communications

After the group members authenticated each other as belonging to the same group, the user X creates an encryption key "K_XY" shared by the users X and Y, and such encryption key is encrypted with a private key of the user X and a public key of the user Y so as to send the encrypted key to the terminal Y of the user Y. The user Y decrypts the received key with its own private key and the public key of the user X. In this case, no one other than the user Y can decrypt this encrypted key. Subsequently, it is possible for the encryption key K_XY to be safely notified from the terminal X of the user X to the terminal Y of the user Y.

(7-2) Encryption of Information to be Transferred

When information is transferred between the terminals X and Y after (7-1) is carried out, encryption is performed by using the common encryption key K_XY. Since a third person cannot know about the encryption key K_XY, it is impossible for such third person to decrypt the contents of the communication carried out between the terminals X and Y, nor is it possible for such third person to transfer false information to the terminal Y or the terminal X by pretending to be the user X or the user Y. Thus, the terminal X and the terminal Y can communicate with each other safely. Accordingly, it becomes possible for group members to share the group information among themselves in a secured manner.

Note that when three or more members have authenticated one another, an encryption key used for transferring information among their terminals is assumed to take the following forms:

(1) Use a different encryption key for a communication between each different set of two individuals. For example, when the terminals A, B and C have authenticated one another, an encryption key K_AB is used between the terminals A and B, an encryption key K_BC is used between the terminals B and C, and an encryption key K_CA is used between the terminals C and A, respectively;

(2) Use one and only common encryption key among the above terminals A, B and C who have authenticated one another. For example, in a case where the terminal C has newly been authenticated by the terminal A or the terminal B while the terminals A and B, which have authenticated each other, are communicating between themselves using the encryption key K_AB, the terminal A or the terminal B sends the K_AB encrypted with the public key of the terminal C to the terminal C, after which any two terminals out of the terminals A, B and C can use the encryption key K_AB.

8. Renew Group Participation Certificate

If a group participation certificate issued in the above manner includes expiration date information, a user possessing such group participation certificate will be unable to participate in the group (perform authentication among group members) after such expiration date, and therefore the group participation certificate needs to be renewed. A detailed explanation of this process is given later.

9. Remove Group Member

While it is possible for a user with a group participation certificate to stay in the group until the expiration date included in such group participation certificate, there may occur a case where such member is desired to be expelled from the group (desired to make it impossible for such user to be authenticated as a group member) before the expiration date. This can be achieved by performing processes described below. The subsequent paragraphs explain methods for removing a group member, which include two examples: "Delete group participation certificate (9-1)" and "Prepare expired participant information (9-2-1)~(9-2-4)".

(9-1) Delete Group Participation Certificate

By deleting a group participation certificate of a member to be expelled from the group, it becomes impossible for such member to be authenticated as a group member. To this end, the following processes need to be performed in each member terminal:

(9-1-1) Announce a Group Participation Certificate Deletion

The group manager makes an announcement, via its terminal, about the expulsion of a member terminal to be removed from the group;

(9-1-2) Delete Group Participation Certificate

The terminal of the member who has been announced of the deletion of its participation certificate deletes the group participation certificate it possesses. In this case, the terminal whose user has been announced of the participation certificate deletion shall forcefully delete the participation certificate;

(9-2-1) Prepare Expired Participant Information

One of the group members (including the group manager) prepares expired participant information which includes information identifying the expelled member (e.g. the public key of such member);

(9-2-2) Share Expired Participant Information

In performing authentication between group members, the list of expired participant information of one terminal and the list of expired participant information of the other terminal are compared against each other, and if there is expired participant information that is not included in one of these two lists, such information is complimented by the use of the other list so that expired participant lists of all group members can match one another;

(9-2-3) Expel Expired Participant

In performing authentication between group members, one group member checks to see if the other member to be authenticated is included in the expired participant list it owns, and will not authenticate such member to be authenticated as a group member if such member is included in the list. For example, if the public key of a user is used as an item to be described in the expired participant list, and the public key of such user to be authenticated is included in the expired participant list, authentication with the user is refused to be performed; and (9-2-4) Refuse to Renew Membership of Expired Participant In renewing a group participation certificate, the manager verifies, via its terminal, if information for identifying a participant who has requested the renewal of its group participation certificate (e.g. its pubic key) falls on any of the expired participant information included in the list of expired participants, and the renewal of the group participation certificate of such participant is rejected if there exists information of such participant in the list.

Note that when a deletion date is added in expired participant information, expired participant information after such deletion date shall be deleted. For example, by providing, as a deletion date, time a little past the expiration date of a group participation certificate, it is possible to delete unnecessary expired participant information one after another. Accordingly, it is possible to prevent an unlimited increase of items in the list of expired participant information.

Also, expired participant information may be prepared only by the group manager and may be encrypted with the group private key KG_S of such group manager so as to be shared within the group. Group members can decrypt the expired participant information by using the group public key KG_P which is made public, thereby enabling group members to verify whether or not the expired participant information has been tampered with. Accordingly, it is possible to prevent unauthorized expired participant information prepared by a malicious user from being shared among group members.

Furthermore, a target member may be expelled by combining "Delete group participation certificate (9-1)" and "Prepare expired participant and others (9-2-1)~(9-2-4)" where required.

Next, a detailed explanation is given of a method for removing a group member using the above expired participant information. Note that as a concrete example of the expired participant information, an "expired participant list" which lists information about members expelled from the group is used here.

Figure 7:
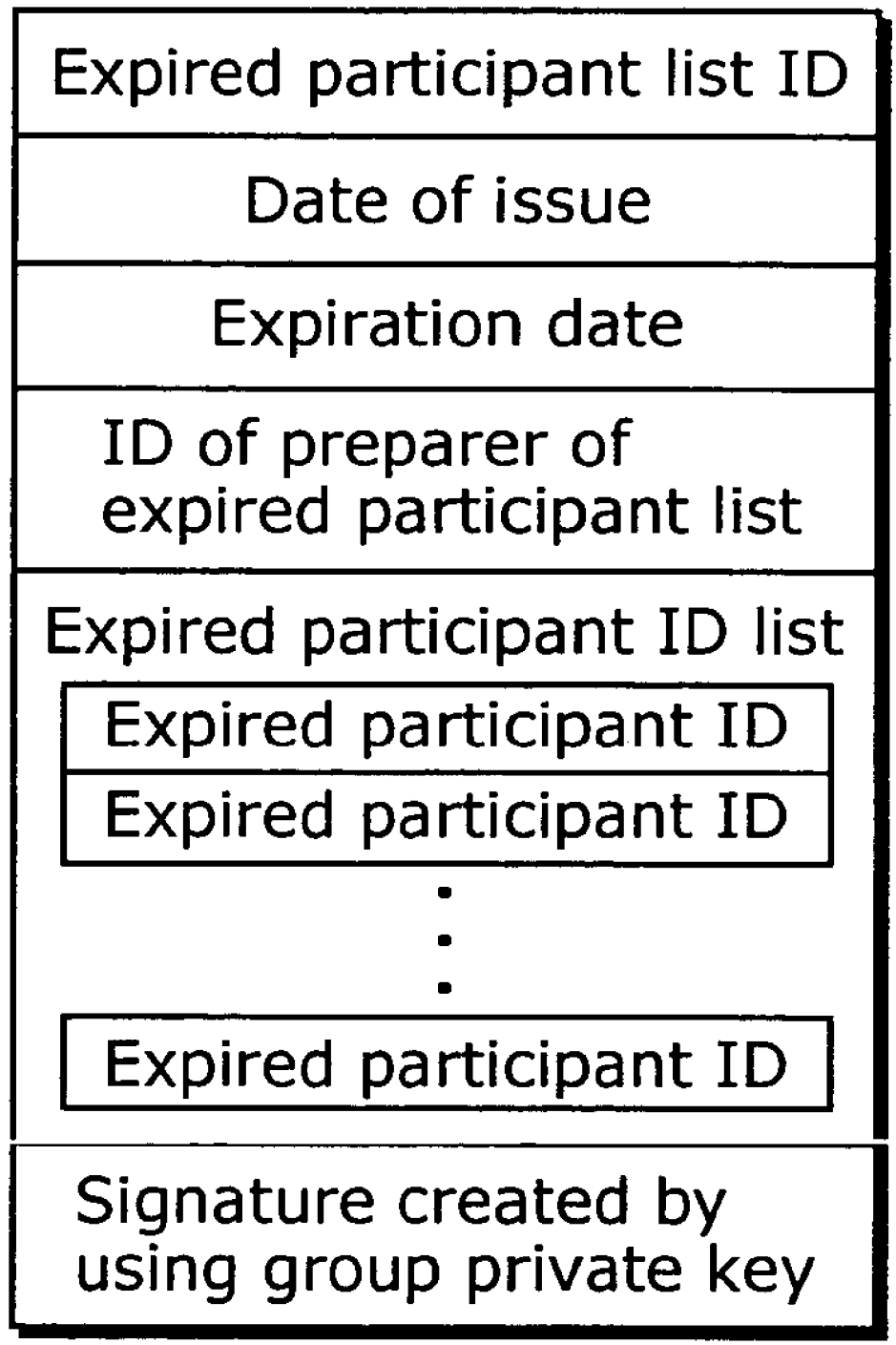
FIG. 7 is a diagram showing an example format of an expired participant list according to a first embodiment of the present invention.

FIG. 7 is a diagram showing an example format of an expired participant list prepared by the group manager. The following data is stored in each field of the expired participant list:

(1) Expired Participant List Id:

An identifier for uniquely identifying the expired participant list;

(2) Date of Issue:

The date and time when the expired participant list was prepared;

(3) Expiration Date:

The date until when the expired participant list needs to be possessed;

(4) Id of Preparer of Expired Participant List:

An identifier for uniquely identifying a manager who prepared the expired participant list. For example, the public key of the manager is used as a preparer's ID.

This field is to be referred to in order to specify which issuer has issued the expired participant list, if there are a plurality of issuers in the group;

(5) Expired Participant Id List:

A list of IDs of old participants expelled from the group;

(6) Expired Participant Id:

An identifier for uniquely identifying old participants expelled from the group; and (7) Signature:

A signature created by the use of the group private key. The signature assures that the expired participant list cannot be prepared by anyone other than the manager.

The manager shall prepare/update an expired participant list every time a member is expelled from the group. All group members possess identical expired participant lists.

10. Add Group Manager

As described above, new membership to the group can be requested only when the terminal of the group manager is in an online state, meaning that the above request cannot be made when the terminal of the group manager is in an offline state. In order to provide users wishing to join the group with increased opportunities for making the above request, the number of group manager terminals shall be increased. In this case, the group private key KG_S is transferred from the terminal of the group manager to a terminal of a newly added group manager, by using some sort of secure means (e.g. cipher communication).

11. Renew Group Public Key

If the group private key KG_S is leaked to a user other than the group manager due to some accident, such user who has obtained the group private key can issue a group participation certificate or a list of expired participants. In such a case, it becomes impossible for the group members to discriminate between a group participation certificate issued by an authorized group manager and an illicitly issued group participation certificate. In order to circumvent such a situation, the group manager needs to renew a pair of the group public key and private key. Also, when wishing to deprive one of the added group mangers of the authority as a group manager, the group manager who originated the group is required to renew a pair of the group public key and private key. Meanwhile, if the group manager has renewed a pair of the group public key and private key to "KG_P'" and "KG_S'", it is still possible for group members who have the original group public keys KG_P and group participation certificates prepared on the basis of such original group public keys KG_P to continue to perform group authentication among themselves. Therefore, all group members are required to possess the latest group public keys and to obtain group participation certificates corresponding to the latest group public keys.

The group public key can be renewed by using one of the following methods:

(1) Send new public keys to the terminals of all group members via the P2P network, illustrated in FIG. 1, at the point of time when the group manager renewed a pair of the group public key and private key. Each terminal of the members which has received a new group public key replaces an old group public key with a new one;

(2) Include information about the time of renewing the group public key in the group information to allow each terminal of the group members to keep such information about the renewal time of the group public key in addition to the group public key. Then, when authentication is performed between group members, a comparison is made between respective group public keys and the information about renewal time. Then, when the terminal of one of the two group members has proven to hold an authorized old group public key, such old group public key will be replaced with a new public key of the other group member; and (3) If the aforementioned group information index server is operated by the group manager, include the information about the renewal time of the group public key in the group information as in the case of (2). Furthermore, when entering into an online state, the group members access the group information index server for every predetermined time period or just before performing group authentication, for example, so as to obtain the latest group public key at such timing.

Note that in order to obtain a group participation certificate corresponding to the latest group public key, a user terminal which has detected that there is a renewed group public key just needs to make a group participation certificate reissue request to the group manager at such timing.

Figure 9:
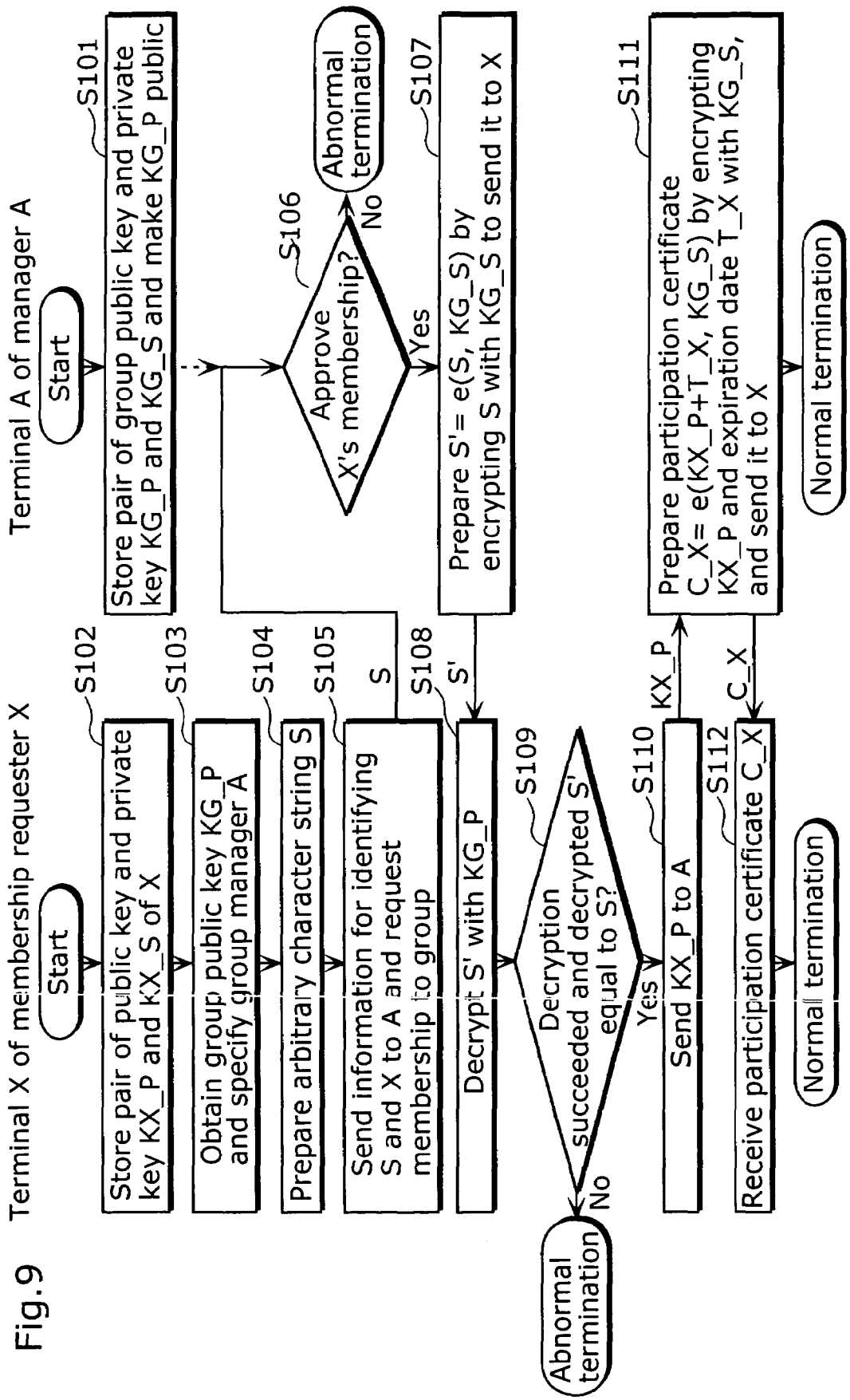
FIG. 9 is a flowchart illustrating a flow of a process "Request new membership to group" in the first embodiment.

Next, an explanation is given of the operation of the network terminal authentication system 100 with the above configuration. FIG. 9 is a flowchart illustrating the flow of "5. Request new membership to group" described above. FIG. 9 illustrates the flow of each process carried out on the terminal X of a user X requesting a new membership to the group (to be referred to as "membership requester X" hereinafter) and on the terminal A of the group manager A. Note that FIG. 10 shows information possessed by the terminal X after the processing shown in FIG. 9.

On the instructions of the group manager A, the terminal A stores, in advance, a pair of a newly prepared group public key KG_P and a group private key KG_S, and makes public the group public key KG_P out of such newly prepared pair of keys (S101) (Refer to "1. Form group" and "2. Advertise group").

Similarly, the terminal X of the membership requester X stores, in advance, a pair of prepared public key KX_P and private key KX_S on the instructions of the membership requester X (S102). These keys may be prepared on the basis of information (pass phrase) specified by the membership requester X, or a character string prepared on the basis of a program or the functionality of the terminal X (e.g. keys prepared on the basis of random numbers).

Next, on the instructions of the membership requester X, the terminal X obtains the public key KG_P of the group which the membership requester X wishes to join (Refer to "3. Obtain group information), and specifies the entry point information of the terminal A of the group manager A at the same time (Refer to "4. Obtain entry point information) (S103).

Furthermore, the terminal X creates an arbitrary character string S on the instructions of the membership requester X (S104). This character string S may be a character string itself which has been inputted by the membership requester X, or a character string prepared on the basis of a program or the functionality of the terminal X (e.g. a character string created on the basis of random numbers).

Subsequently, the terminal X sends, to the terminal A, the character string S and information by which the membership requester X can be identified (e.g. name, address etc.) on the instructions of the membership requester X, so as to make a request indicating that the membership requester X wishes to join the group (S105).

Accordingly, the terminal A determines whether or not to approve the membership of the membership requester X, based on the information sent from the terminal X by which the membership requester X can be identified (S106). When determining not to approve the membership of the membership requester X (S106: No), the terminal A terminates this process with the terminal X being unable to join the group.

When the membership of the membership requester X to the group is approved (S106: Yes), the terminal A creates a character string S'=e (S, KG_S) that results from encrypting the character string S received from the terminal X with the group private key KG_S, and sends the encrypted character string S' to the terminal X (S107).

Subsequently, the terminal X decrypts the encrypted character string S' sent by the terminal A with the group public key KG_P (S108). When this is done, the terminal X verifies if the character string S' has been normally decrypted by the public key KG_P and the decrypted character string is equal to the original character string S (S109). Accordingly, it is possible to verify that the character string S' has been encrypted by using the private key KG_S corresponding to the group public key KG_P, i.e. that the terminal A is surely the terminal of the group manager A who holds the group private key KG_S. When the decryption fails, or the result of the decryption is not equal to the original character string S (S109: No), the terminal X terminates this process without being able to join the group, since it cannot be verified whether or not the user of the terminal A is the group manager.

Next, the terminal X sends a public key KX_P of the membership requester X to the terminal A (S110). Subsequently, the terminal A prepares a group participation certificate C_X for the membership requester X, and sends the group participation certificate C_X to the terminal X (S111). Such group participation certificate C_X is prepared by encrypting the result of attaching an expiration date T_X indicating the date and time when the group participation certificate expires to the public key KX_P of the terminal X (KX_P+T_X), by using the group private key KG_S. Such group participation certificate C_X can be represented as C_X=e (KX_P+T_X, KG_S). In this case, as a method to attach the expiration date T_X to the public key KX_P, any method may be employed as long as the expiration date T_X and the public key KX_P cannot be separated before decryption and can be separated by means of decryption in such method. An example is a method in which results of representing the public key KX_P and the expiration date T_X respectively are connected using a predetermined symbol (e.g. hyphenation "-").

Furthermore, when the terminal X receives the group participation certificate C_X (S112), the processing for requesting new membership to the group completes. Note that FIG. 10 shows an example of information possessed by the terminal X at the point of time when the above processing completes (i.e. three types of key information and the group participation certificate).

As illustrated in FIG. 9, although the terminal X sends the information by which the membership requester X can be identified and then the public key KX_P of the membership requester X to the terminal A in the present embodiment (S105 and S110), the present invention is not limited to this sending order, and therefore such sending order may be reversed.

Figure 11:
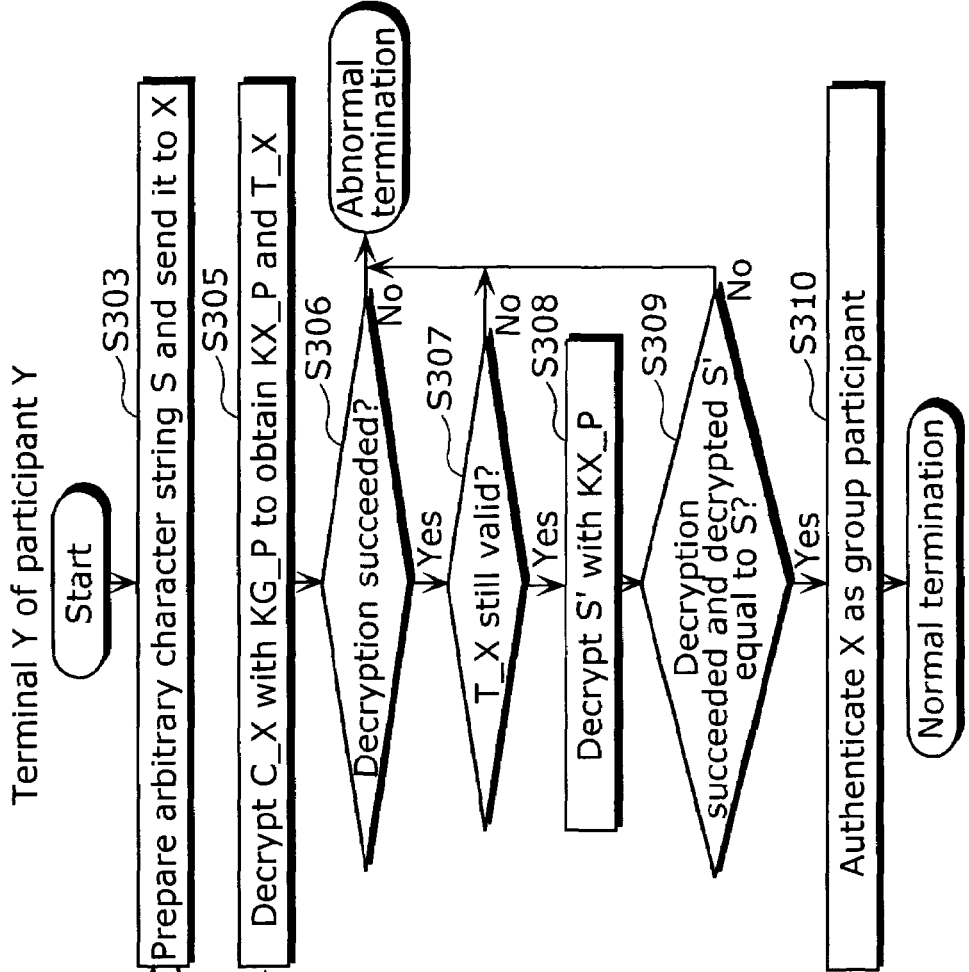
FIG. 11 is a flowchart showing a flow of the process "Authenticate each other between group members" in the first embodiment.

Next, referring to FIG. 11, a detailed explanation is given of the process "6. Authenticate each other between group members". FIG. 11 is a flowchart showing the flow of each process carried out on the terminal X of a group participant X and on the terminal Y of the group participant Y, both of whom have already obtained group participation certificates. Note that the terminal X holds the aforementioned three types of key information and the group participation certificate shown in FIG. 10.

First, the terminal X of the participant X specifies the entry point information of the terminal Y of another group participant Y (S301), by using one of the following methods:

(1) When the terminal X performs a search, with part or whole of the group identification information as a search key, by utilizing the information search method of the P2P network illustrated in FIG. 1, a participant belonging to the group responds to the search. Then, the terminal X is notified of the entry point information of the terminal Y of the group participant Y through such response from the above group participant;

(2) When the peer information server is operated, the terminal X performs a search on such peer information server, with the group identification information as a search key, and obtains the entry point information of another participant in an online state on the basis of the search result; and (3) If the terminal X already knows about the terminal Y of another participant Y, and knows that the entry point information never changes and that the terminal Y is in an online state all the time, the terminal X uses such entry point information.

Next, the terminal X requests the terminal Y to perform authentication (S302). Subsequently, the terminal Y prepares an arbitrary character string S, and sends the character string S to the terminal X, as in the case illustrated in FIG. 9 (S303).

Then, the terminal X prepares a character string S'=e (S, KX_S) by encrypting the received character string S with its own private key KX_S, on the instructions of the participant X, and sends such character string S' and the group participation certificate C_X which it possesses to the terminal Y (S304).

After this, the terminal Y decrypts the group participation certificate C_X sent from the terminal X with the group public key KG_P so as to obtain the public key KX_P of the participant X and the expiration date T_X (S305).

Here, the terminal Y verifies whether or not the above decryption has succeeded (S306). If the decryption failed (i.e. the participation certificate C_X has not been encrypted with the authorized group private key KG_S), the terminal Y regards the terminal X as not being a member of the group, and terminates the process (S306: No).

Furthermore, the terminal Y verifies whether or not the expiration date T_X obtained as a result of the above decryption is valid (S307). If the expiration date T_X is invalid (S307: No), it means that the group participation certificate is also invalid, and therefore the terminal Y regards the terminal X as not being a member of the group, and terminates the process.

Moreover, the terminal Y decrypts the encrypted character string S' sent by the terminal X with the public key KX_P of the terminal X obtained by performing the above decryption (S308). Subsequently, the terminal Y verifies whether or not the character string S' has been decrypted successfully and the decrypted character string matches the original character string S (S309). If not matched (S309: No), since it indicates that the terminal X does not hold the private key KX_S corresponding to the public key KX_P, the terminal Y regards the terminal X as a third person pretending to be a group member, and terminates the process.

As described above, the terminal Y authenticates the terminal X as a group participant if the following items are all verified (S310):

(1) The terminal X holds a group participation certificate encrypted by the group manager using the group private key KG_S;

(2) The expiration date T_X of the group participation certificate is valid; and (3) The terminal X holds the private key KX_S corresponding to the encrypted public key KX_P in the group participation certificate.

Then, the above processes (S301–S310) are carried out with the positions of the terminals X and Y being exchanged. If such processes end in success, the terminal X authenticates the terminal Y as a group participant, and mutual authentication between the terminals X and Y completes.

Figure 12:
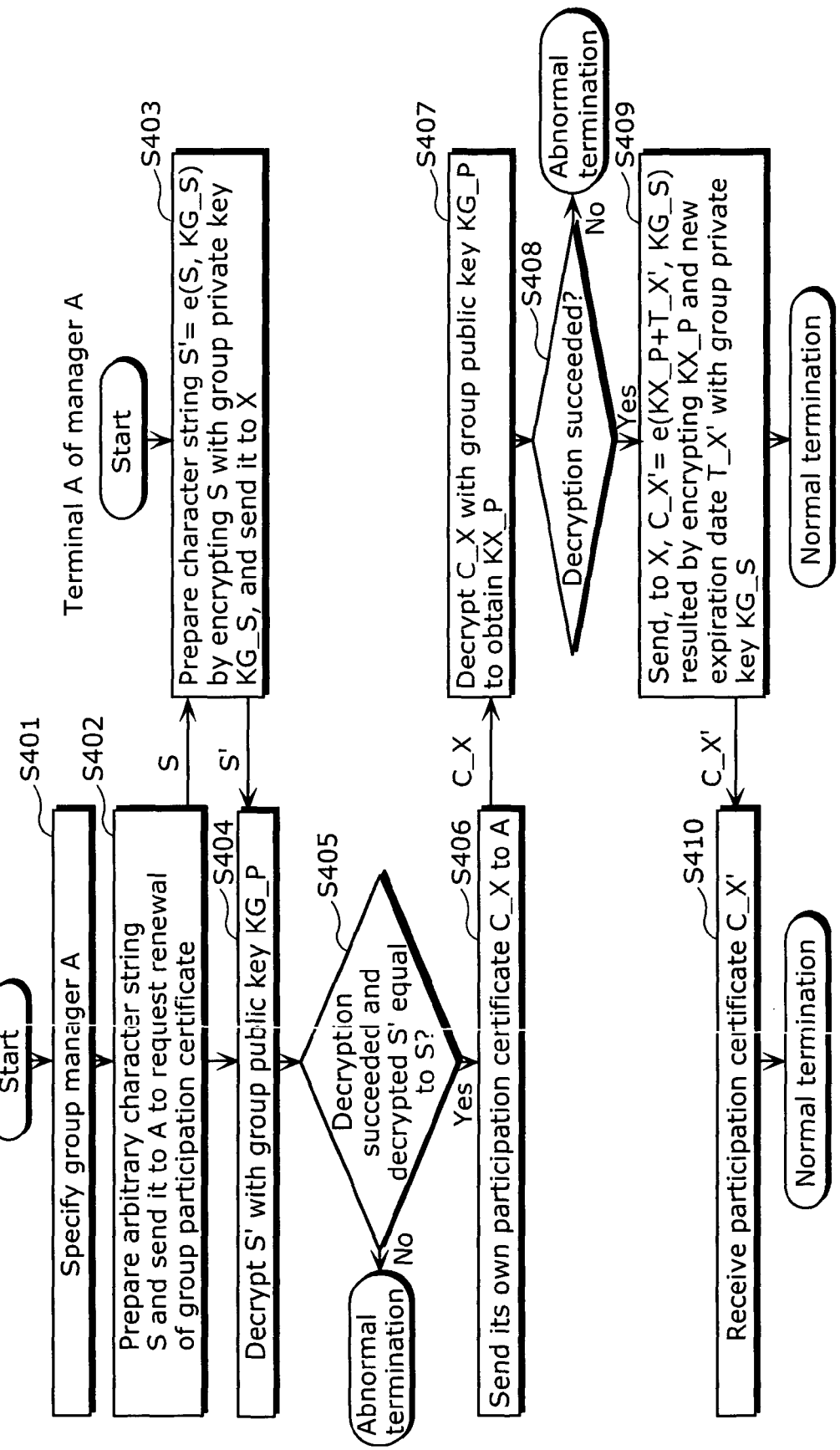
FIG. 12 is a flowchart showing a flow of a process "Renew group participation certificate" in the first embodiment.

Next, referring to FIG. 12, a detailed explanation is given of the process "8. Renew group participation certificate". FIG. 12 is a flowchart showing the flow of each process carried out on the terminal X of an X requesting renewal (to be referred to as "renewal requester X" hereinafter) and on the terminal A of the group manager A. Note that the terminal X holds the aforementioned three types of key information and the group participation certificate shown in FIG. 10.

First, the terminal X specifies the entry point information of the terminal A on the instructions from the terminal X (S401) (refer to "4. Obtain entry point information"). Then, the terminal X creates an arbitrary character string S on the instructions of the renewal requester X, and sends the character string S to the terminal A so as to request the renewal of the group participation certificate (S402). This character string S may be a character string itself which has been inputted by the renewal requester X, or a character string prepared on the basis of a program or the functionality of the terminal X (e.g. a character string created on the basis of random numbers).

Subsequently, the terminal A creates a character string S'=e (S, KG_S) by encrypting the character string S with the private key KG_S, and sends the encrypted character string S' to the terminal X (S403). Then, the terminal X decrypts the encrypted character string S' with the group public key KG_P (S404).

Furthermore, the terminal X verifies if the character string S' has been normally decrypted with the group public key KG_P and the decrypted character string is equal to the original character string S (S405). Accordingly, it is possible to verify that the character string S' has been encrypted using the private key KG_S corresponding to the group public key KG_P, i.e. that the terminal A is surely the terminal of the group manager A which holds the group private key KG_S. When the decryption failed, or the result of the decryption is not equal to the original character string S (S405: No), the terminal X regards the terminal A as not being the terminal of the group manager A, and terminates this process without being able to have its group participation certificate renewed.

When the decryption has ended in success and the decryption result is equal to the character string S (S405: Yes), the terminal X sends its participation certificate C_X=e (KX_P+T_X, KG_S) to the terminal A (S406). Subsequently, the terminal A decrypts the received group participation certificate C_X with the group public key KG_P so as to obtain the public key KX_P of the renewal requester X (S407).

Furthermore, the terminal X verifies whether or not the above decryption has succeeded (S408). If the decryption failed (S408: No), the terminal A regards the terminal X as a terminal which does not have a group participation certificate encrypted by the group private key KG_S, i.e. as not being a group participant, and terminates the process without renewing the group participation certificate of the terminal X.

When the decryption has ended in success (S408: Yes), the terminal A creates a new participation certificate C_X'=e (KX_P+T_X', KG_S) by encrypting the result of attaching a new expiration date T_X' to the public key KX_P of the terminal X by using the group private key KG_S, and sends the new participation certificate C_X' to the terminal X (S409).

Subsequently, the terminal X receives the new participation certificate C_X' (S410).

Through the above processing, a new expiration date is attached to the group participation certificate of the renewal requester X, thereby enabling the renewal requester X to stay in the group until such new expiration date via the terminal X.

Next, a detailed explanation is given of the process for sharing expired participant information in "9. Remove group member", with reference to figures.

In order to solve the above-mentioned problem, in addition to a system in which the manager broadcasts, through its terminal, expired participant lists to member terminals in an online state, another system is employed in which member terminals exchange expired participant lists among themselves soon after they have been authenticated by one another as terminals of group members.

Figure 8A:
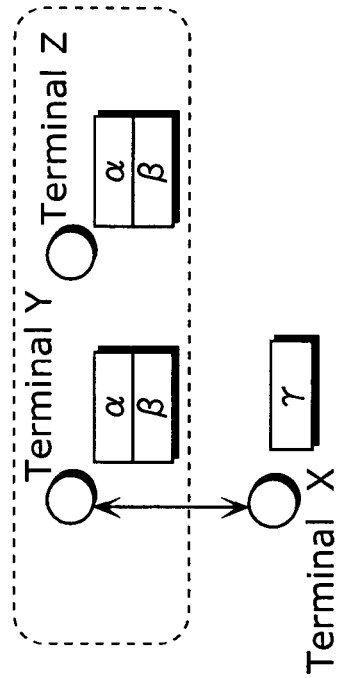
FIG. 8A is a diagram showing a case where a terminal in an online state and a terminal in an offline state possess different expired participant lists in the first embodiment.
Figure 8B:
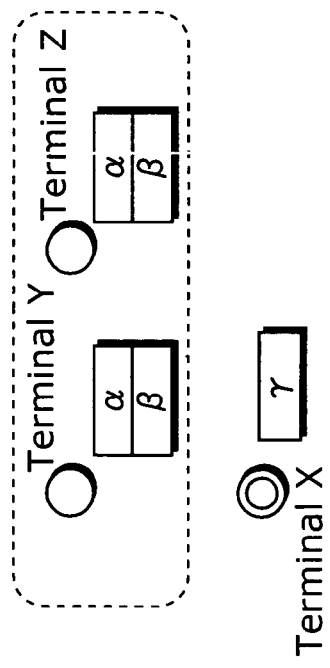
FIG. 8B is a diagram showing a terminal which has entered into an online state, performing group authentication with a terminal in an online state in the first embodiment.
Figure 8D:
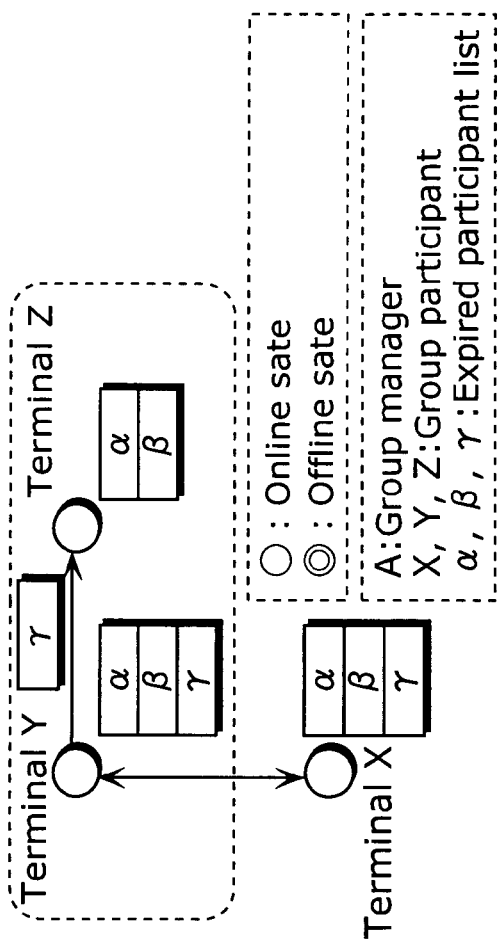
FIG. 8D is a diagram showing a terminal which has newly obtained an expired participant list, propagating such new expired participant list to terminals which the terminal already knows.
Figure 8C:
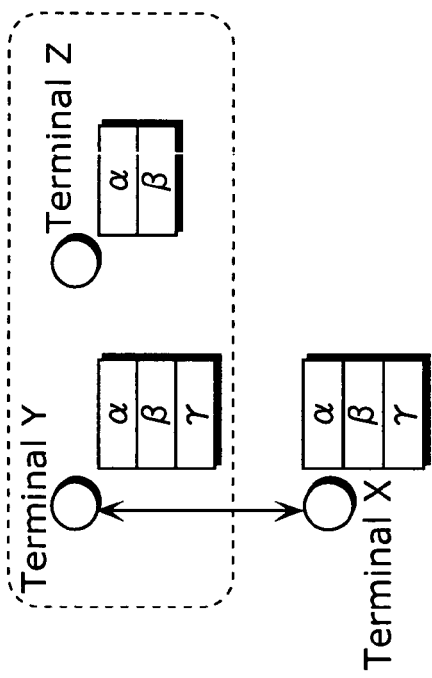
FIG. 8C is a diagram showing two terminals that finished group authentication between themselves, exchanging each other's expired participant lists in the first embodiment.

As shown in FIG. 8A, assume the case where the terminals Y and Z in an online state and the terminal X in an offline state all have different expired participant lists. Next, as shown in FIG. 8B, the terminal X in an offline state performs group authentication with the member terminal Y in an online state at the same time when the terminal X enters into an online state. As shown in FIG. 8C, the member terminals X and Y exchange each other's expired participant lists, when the group authentication succeeded.

FIG. 8C illustrates that the member terminal X has obtained expired participant lists α and β from the member terminal Y. Moreover, as shown in FIG. 8D, the member terminal Y, which has newly obtained an expired participant list from the member terminal X in an offline state, propagates such newly obtained expired participant list to the member terminal Z in an online state which the terminal Y already knows.

With the above method, it is possible for member terminals which were in an offline state at the point of time when a new expired participant list was notified by the manager, to obtain new expired participant information from another member even when the manger is in an offline state.

Figure 24:
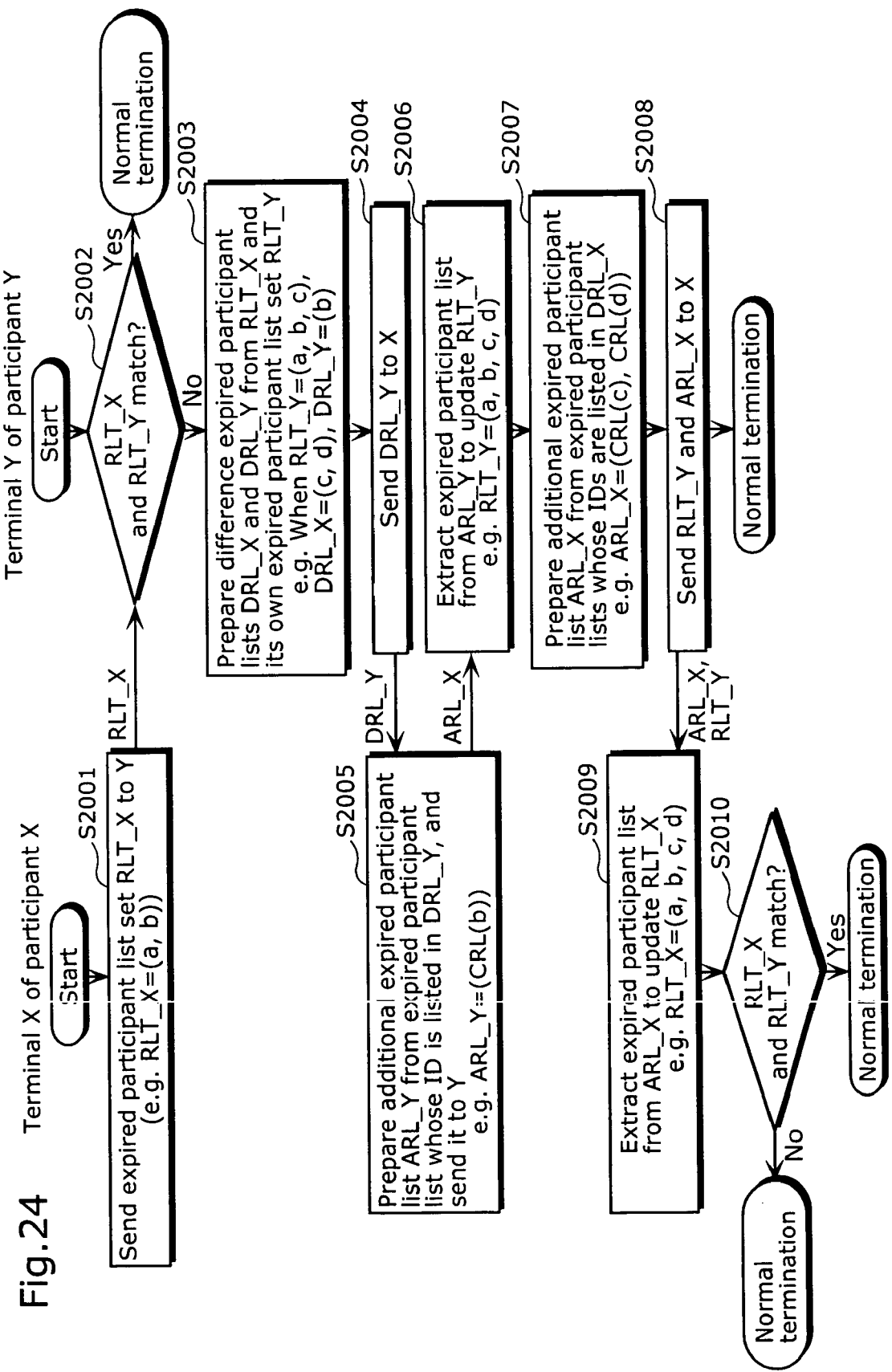
FIG. 24 is a flowchart showing a flow of a process "Exchange expired participant lists" in the first embodiment.

FIG. 24 is a flowchart showing the flow of the processing for exchanging expired participant lists between the terminal X of a participant X and the terminal Y of the participant Y and sharing the exchanged expired participant lists. FIG. 25 shows the meanings of the terms used in FIG. 24.

Note that the terminals X and Y have already authenticated each other as terminals of group members through the process "6. Authenticate each other between group members".

First, the terminal X of the participant X who has newly joined the group sends, to the terminal Y of the participant Y, an expired participant list set (RLT_X), which is the result of listing up all expired participant list IDs which it possesses (S2001). Here, assuming that expired participant lists possessed by the terminal X are CRL (a) and CRL(b), the RLT_X can be represented as "(a, b)" in which the IDs of these expired participants are put together.

Subsequently, the terminal Y compares the expired participant list set (RLT_X) obtained from the terminal X with an expired participant list set (RLT_Y), which lists expired participant list IDs which the terminal Y possesses (S2002), and prepares a difference expired participant list (DRL_X) which lists expired participant list IDs which the terminal Y has but the terminal X does not, and a difference expired participant list (DRL_Y) which lists expired participant list IDs which the terminal X has but the terminal Y does not (S2003).

In FIG. 24, since the RLT_X is (a, b) and the RLT_Y is (a, c, d), the DRL_X=(c, d) and the DRL_Y=(b). Next, the terminal Y sends the DRL_Y to the terminal X (S2004).

Subsequently, the terminal X prepares an additional expired participant list (ARL_Y) which collectively lists expired participant lists which the terminal X possesses but which the terminal Y does not, from the difference expired participant list DRL_Y sent by the terminal Y (S2005).

In FIG. 24, since the DRL_Y is (b), the contents of the ARL_Y will be the expired participant list CRL(b) whose expired participant ID is "b".

Moreover, the terminal Y extracts the ID of the expired participant from the additional expired participant list ARL_Y sent by the terminal X, and adds such extracted ID to the expired participant list set RLT_Y the terminal Y possesses for update (S2006). In FIG. 24, the contents of the RLT_Y are (a, b, c, d).

Following this, the terminal Y prepares an additional expired participant list ARL_X which lists expired participant lists which the terminal Y possesses but which the terminal X does not, on the basis of the difference expired participant list DRL_X (S2007). In FIG. 24, since the DRL_X is (c, d), the contents of the additional expired participant list ARL_X are the expired participant list CRL (c) whose expired participant ID is "c" and the expired participant list CRL(d) whose expired participant ID is "d" (CRL(c) and CRL(d)).

Then, the terminal Y sends the expired participant list set RLT_Y and the additional expired participant list ARL_X to the terminal X (S2008).

Subsequently, the terminal X extracts the IDs of the expired participants from the additional expired participant list ARL_X sent by the terminal Y so as to update the expired participant list set RLT_X which the terminal X possesses (S2009).

Finally, the terminal X compares the RLT_Y obtained from the terminal Y with the updated RLT_X (S2010). If they match each other (S2010: Yes), it means that the expired participant lists of the terminals X and Y are normally synchronized with each other.

Note that verification is required to determine whether or not the obtained expired participant lists are valid, since expired participant lists are obtained in the above method from those users who are not the manger.

Regarding an expired participant list prepared by the manager, it is possible to verify the validity of such expired participant list by using the group public key, since such expired participant list is added with a signature created by the use of the group private key.

An expired participant list whose validity has been verified shall be stored in the terminal of each member until the expiration date. Note, however, that if there are a plurality of expired participant lists whose preparer's IDs are the same as one another's, expired participant lists with the same preparer's ID may be destroyed except for the one whose date of issue is the latest of all.

To put it another way, if there are a plurality of participation certificate issuers in the group, each group member needs to hold the number of expired participant lists equivalent to the number of such issuers, but each group member just needs to hold the latest expired participant list out of the expired participants lists issued by the same manager.

At the time of group member authentication, each group member shall refuse to perform authentication for a user wishing to be authenticated if the ID or public key described on such user's participation certificate is included in the expired participant list.

As described above, with the communication system according to the first or the second embodiment, it is possible for group participants who possess group participation certificates issued by the group manager to authenticate each other between themselves, even if there is no involvement of the group manager's terminal (even if the terminal of the group manager is in an offline state).

Furthermore, even when it becomes desirable that a certain user should be expelled from the group, it is possible not to authenticate such user as a group member at least after an expiration date to be included in a group participation certificate. Moreover, it is also possible to exclude such user from the targets of group authentication until such expiration date by referring to a list of expired members.

Second Embodiment

The first embodiment explains about an embodiment in which a group on a network is comprised of two types of users, a group manager and ordinary users, but the second embodiment provides an embodiment in which there is more than one member who has the authority equivalent to that of the group manager.

As described above, duplication of the group private key is required if the number of group managers is increased in response to increased opportunities for new membership to a group. However, if a plurality of users hold group private keys, there is a higher possibility that such private keys become subject to leakage.

The present embodiment is intended to improve the above problem, in which group members are categorized into three types of users: one and only group manager (to be referred to also as "manager" hereinafter); group issuers (to be also referred to simply as "issuers" hereinafter), each having a group participation certificate issue permit and therefore the authority to issue group participation certificates; and participants (to be referred to also as "group members" hereinafter). Here, a participant for whom the group manager issued a group participation certificate issue permit is called a "group issuer". Only the group manager is allowed to grant, to a participant, the authority to issue group participation certificates, and only the group manager and group issuers are allowed to issue group participation certificates for ordinary users.

As described above, if the manager assigns more than one issuer in the group, it is possible to increase opportunities for new membership to a group without needing to duplicate the group private key.

In order to manage such a group, the following processes are required:

(1) Form group;
(2) Advertise group;
(3) Add group issuer
(4) Obtain group information;
(5) Obtain entry point information;
(6) Request new membership to group;
(7) Authenticate each other between group members;
(8) Share information between group members;
(9) Renew group participation certificate;
(10) Renew group participation certificate issue permit;
(11) Remove group member; and
(12) Renew group public key.

The following explains each of the above-listed processes. Note, however, that explanations of the same processes as those of the first embodiment are omitted.

1. Form Group

An explanation of this process is omitted since it is the same as that of "1. Form group" in the first embodiment.

2. Advertise Group

An explanation of this process is omitted since it is the same as that of "2. Advertise group" in the first embodiment.

3. Add Group Issuer

As mentioned above, the group manager who formed the group on the network can assign a group issuer by issuing a group participation certificate issue permit to a group member so as to grant such member the authority to increase the number of group members. In other words, it is possible for a group issuer who has been granted a group participation certificate issue permit to issue group participation certificates for other users. A detailed explanation of this process is given later.

4. Obtain Group Information

An explanation of this process is omitted since it is the same as that of "3. Obtain group information" in the first embodiment.

5. Obtain Entry Point Information

A user X wishing to newly join a certain group needs to communicate at least with an issuer of the group via its terminal X, but in order to do so, the user X is required to specify the entry point information of such group issuer by using one of the following methods, for example:

(1) Perform a search with part or whole of the group identification information and the like as a search key, by utilizing the information search method of the P2P network illustrated in FIG. 1. Then, the group issuer responds to this search, and notifies the terminal X of its entry point information;

(2) If the peer information server is operated, the user X performs a search on such peer information server, with the group identification information and the like as a search key, and obtains the entry point information of the terminal of the above group issuer according to the search result; and (3) If the terminal X already knows about the group issuer, and knows that the entry point information never changes and that such group issuer is in an online state all the time, the terminal X uses such entry point information.

6. Request New Membership to Group

The user X wishing to newly join a certain group communicates with the group issuer via its terminal X using the entry point information specified in the above manner, so as to request the issue of a group participation certificate. A detailed explanation of this process is given later.

7. Authenticate Each Other Between Group Members

It is possible for group members who have obtained their group participation certificates through the above process "6. Request new membership to group" to authenticate each other as belonging to the same group. A detailed explanation of this process is given later.

8. Share Information Between Group Members

An explanation of this process is omitted since it is the same as that of "7. Authenticate each other between group members" in the first embodiment.

9. Renew Group Participation Certificate

If a group participation certificate issued in the process "6. Request new membership to group" includes expiration date information, a user possessing such group participation certificate will be unable to participate in the group (perform authentication among group members) after the expiration date, and therefore such user needs to renew the group participation certificate through its terminal. A detailed explanation of this process is given later.

10. Renew Group Participation Certificate Issue Permit

If a group participation certificate issue permit issued in the process "3. Add group issuer" includes expiration date information, an issuer will be unable to issue group participation certificates after the expiration date, and therefore such issuer needs to renew its group participation certificate issue permit through its terminal. A detailed explanation of this process is given later.

11. Remove Group Member

As in the case of the first embodiment, there may occur a case where a specific member withdraws or is required to be expelled from a group before the expiration date of such member's group participation certificate due to some reason or other. In this case, a method for deleting or invalidating the group participation certificate of such member is the same as that of "9. Remove group member" in the first embodiment by substituting "group manager" with "group manager or group issuer" in such process. Therefore, a detailed explanation of this process is omitted.

Note that it is also possible to prepare expired participant information and to share such information, as in the case of the first embodiment. For example, the following processes are performed:

(11-1) Prepare Expired Participant Information

Under instructions from the manager, the terminal of the manager prepares expired participant information including information for identifying one of the group members (including the group managers and group issuers) to be expelled (e.g. the public key of such member);

(11-2) Share Expired Participant List

The terminal of the manager or an issuer, when the process "7. Authenticate each other between group members" is carried out, (i) compares an expired participant list possessed on the terminal of a participant with that of a participant to be authenticated and (i) when there is expired participant information included only in one of the two lists, adds such information to the list which does not include such expired participant information, so that participant lists of all the group members can match one another;

(11-3) Expel Expired Participant

The terminal of the manager or an issuer verifies, in the process "7. Authenticate each other between group members", if there is information identifying the participant to be authenticated in the expired participant list which such manager or issuer holds, and refuses to authenticate such member as a group member if there exists such information in the list. For example, when the public key of a user to be authenticated is used as expired participant information, authentication is refused to be performed for such user if the public key of such user matches any of the expired participant information included in the list; and (11-4) Refuse to Renew Membership of Expired Participant The terminal of the manager or an issuer verifies, in the process "9. Renew group participation certificate", if a participant who has requested the renewal of its group participation certificate is included in the list of expired participants, and refuses to renew the group participation certificate of such participant if there exists information of the participant in the list.

Note that it is possible to include a deletion date in expired participant information and to delete expired participant information after such deletion date, as in the case of the first embodiment.

Also, expired participant information may be prepared only by a group issuer and may be encrypted with the private key of such group issuer so as to be shared, as in the case of the first embodiment. By obtaining expired participant information and the group participation certificate issue permit of a group issuer who has issued such expired participant information together, group members can decrypt the expired participant information by using the public key of such group issuer included in such group participation certificate issue permit, thereby making it possible for them to verify that the expired participant information has not been tampered with. Accordingly, it is possible to prevent unauthorized expired participant information prepared by a malicious user from being shared among group members.

Next, a detailed explanation is given of a method for removing a group member by the use of the above expired participant information. Note that as a concrete example of the expired participant information, an "expired participant list" which lists information about members expelled from the group is used here.

Figure 13:
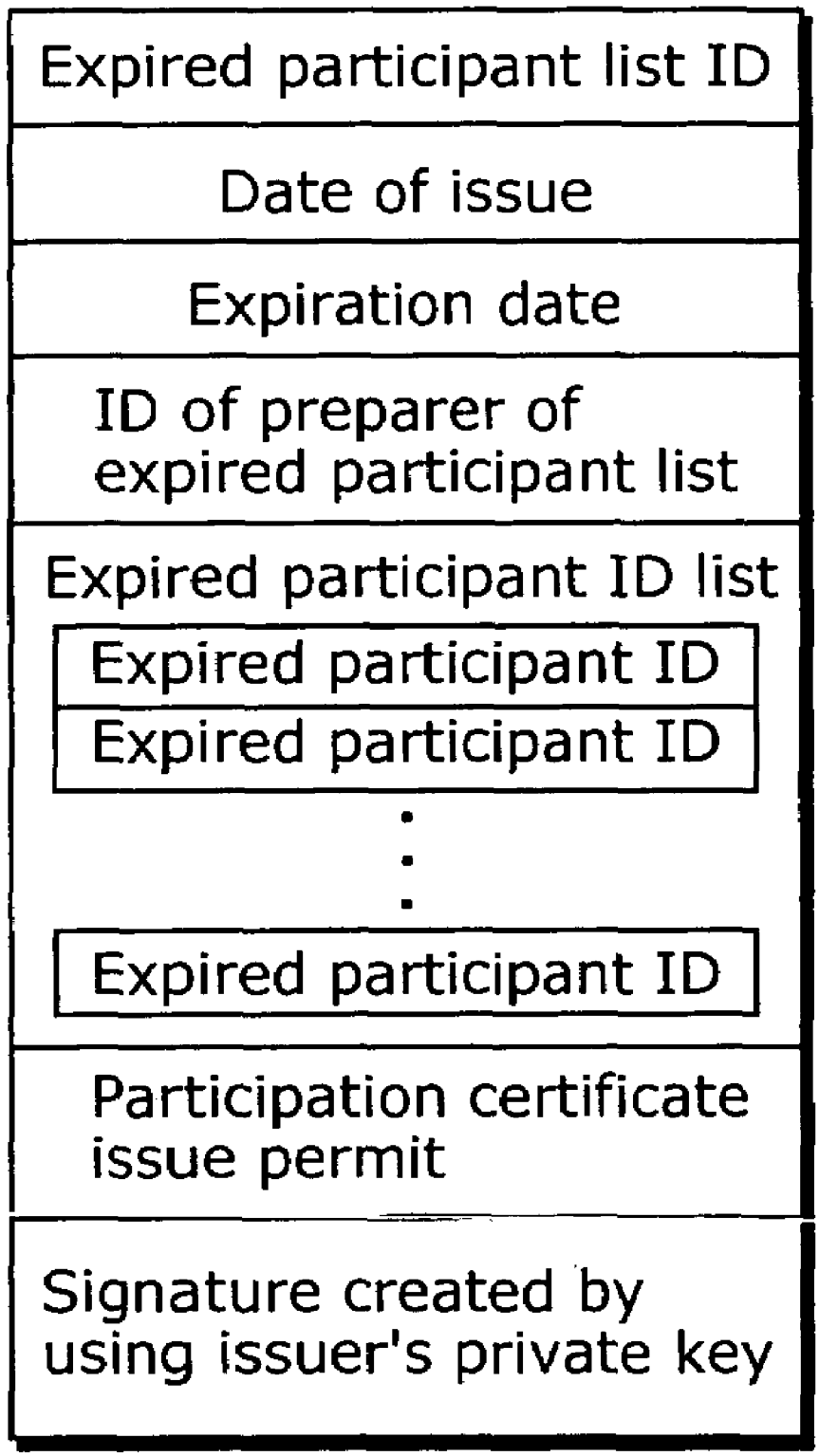
FIG. 13 is a diagram showing an example format of an expired participant list in a second embodiment of the present invention.

FIG. 13 is a diagram showing an example format of an expired participant list prepared by the group manager. The following data is stored in each field of the expired participant list:

(1) Expired Participant List Id:

An identifier for uniquely identifying the expired participant list;

(2) Date of Issue:

The date and time when the expired participant list was prepared;

(3) Expiration Date:

The date until when the expired participant list needs to be possessed;

(4) Id of Preparer of Expired Participant List:

An identifier for uniquely identifying the manager who prepared the expired participant list. For example, the public key of the manager is used as a preparer's ID.

This field is to be referred to in order to specify which issuer has issued the expired participant list, if there are a plurality of issuers in the group;

(5) Expired Participant Id List:

A list of IDs of old participants expelled from the group;

(6) Expired Participant Id:

An identifier for uniquely identifying old participants expelled from the group. Note that this ID shall be included in the group participation certificate;

(7) Participation Certificate Issue Permit:

The participation certificate issue permit possessed by the terminal of an issuer who prepared the expired participant list; and (8) Signature:

A signature created by the use of the group private key of the issuer who prepared the expired participant list. The signature assures that the expired participant list cannot be prepared by anyone other than the manager.

A detailed explanation of a method for distributing expired participant lists prepared by an issuer is omitted since it is the same as that of distributing expired participant lists prepared by the manager described above.

An explanation is also omitted here of a method for synchronizing the expired participant lists possessed by the terminals X and Y of the two participants X and Y, since it is the same as that of the first embodiment.

Note that verification is required to determine whether or not the obtained expired participant lists are valid, since expired participant lists are obtained in the above method from those who other than the manger.

The validity of an expired participant list prepared by an issuer can be confirmed by executing the following two steps:

1. Verify a participation certificate issue permit within the expired participant list by the use of the group public key; and 2. Check the signature on the expired participant list by the use of the issuer's public key included in the participation certificate issue permit within the expired participant list.

The above step 1 is intended for verifying that a person who prepared the expired participant list is an authorized issuer, while the above step 2 is intended for checking if the expired participant list itself has been prepared by an authorized issuer himself/herself.

The expired participant list whose validity has been verified shall be stored in the terminal of each member until the expiration date. Note, however, that if there are a plurality of expired participant lists whose preparer's ID are the same as each other's, expired participant lists with the same preparer's ID may be destroyed except for the one whose date of issue is the latest of all.

To put it another way, if there are a plurality of issuers, each group member needs to hold the number of expired participant lists equivalent to the number of such issuers, but each group member just needs to hold the latest expired participant list out of the expired participants lists issued by the same issuer.

12. Renew Group Public Key

If the group private key KG_S is leaked to a user other than the group manager due to some sort of accident, it becomes possible for such user who has obtained the group private key to illicitly issue a group participation certificate issue permit as well as to further issue a group participation certificate. In such a case, it becomes impossible for the group members to make a distinction between an unauthorized group participation certificate issued under an unauthorized group participation certificate issue permit and an authorized one, and the only method to prevent the issue of unauthorized group participation certificates is to renew a pair of the group public key and private key. Meanwhile, even if the group manager has renewed the group public key and private key from (KG_P·KG_S) to (KG_P'·KG_S'), it is still possible for group members who have the original group public keys KG_P and group participation certificates prepared on the basis of such public keys to carry out "6. Authenticate each other between group members" between themselves. Therefore, all group members are required to hold the latest group public keys and to obtain group participation certificates corresponding to such latest group public keys. In addition, an issuer is required to obtain a group participation certificate issue permit corresponding to the latest group public key.

It is possible to hold the latest group public key by using one of the following methods, as in the case of the first embodiment:

(1) Send new group public keys to all network participants via the P2P network illustrated in FIG. 1 at the point of time when the group manager renews the group public key and private key. Each group member, who has received a new group public key, replaces an old group public key with a new one;

(2) Include information about the time of renewing the group public key in the group information disclosed in "2. Advertise group" so as to enable each group member to hold information about a renewal time of the group public key in addition to the group public key. Then, when "6. Authenticate each other between group members" is carried out, a comparison is made between respective group public keys and information about the renewal time so as to replace an old public key with a new one; and (3) If the group information index server described in (4) in "2. Advertise group" is operated, include the information about the renewal time of the group public key in the group information, so as to allow the group members to make an access to the group information index server for every predetermined time period or just before performing group authentication, for example, when they are in an online state, and to obtain the latest public key of the group at such timing.

In order to obtain a group participation certificate issue permit corresponding to the latest group public key, an issuer who has detected that there is a renewed group public key just needs to make a group participation certificate issue permit reissue request at such timing. Moreover, in order to obtain a group participation certificate corresponding to the latest group public key, a group participation certificate reissue request just needs to be made at such timing.

Figure 14:
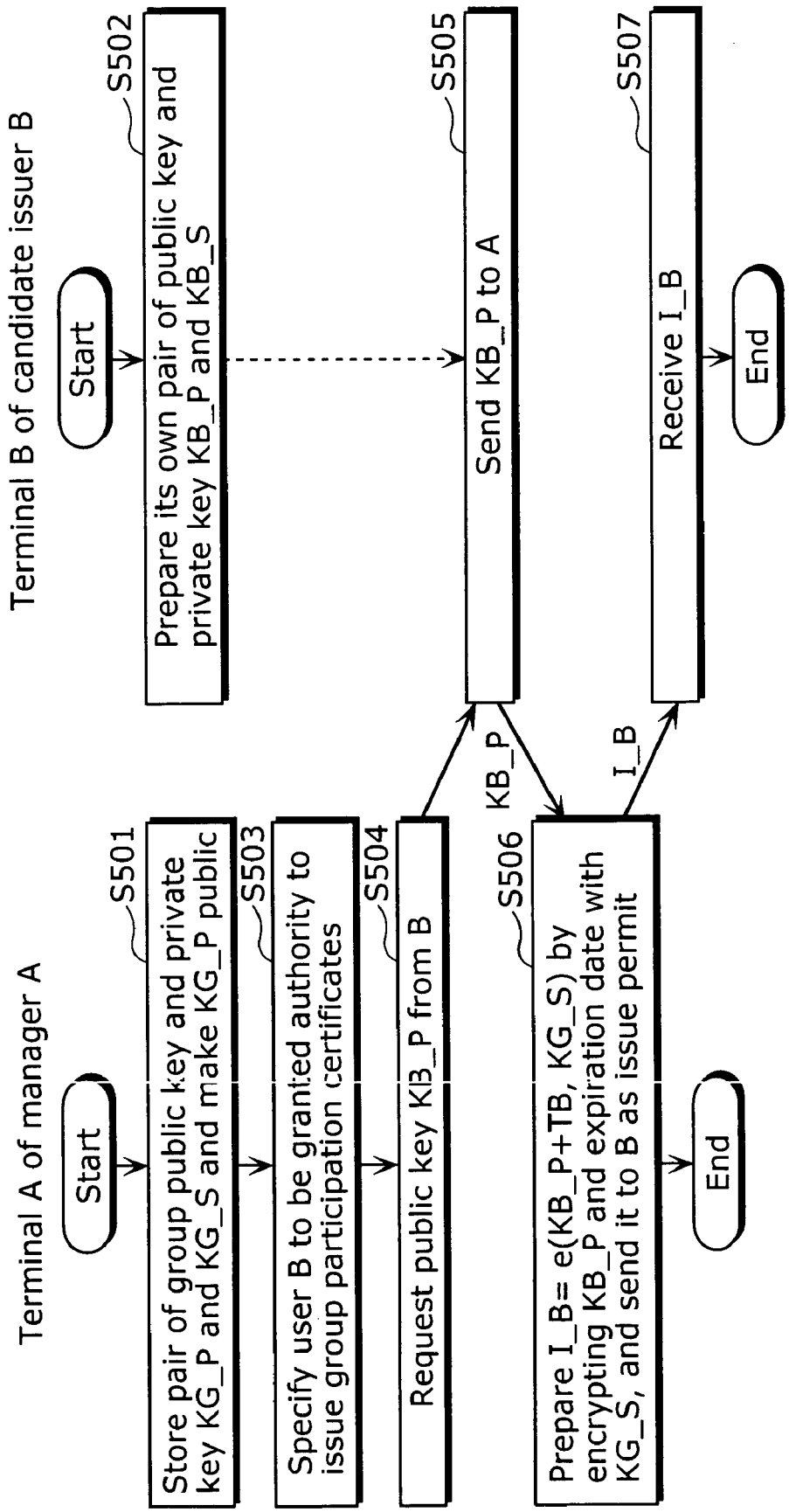
FIG. 14 is a flowchart illustrating a flow of "Add group issuers" in the second embodiment.

Next, an explanation is given of the operation of a communication system 200 (not illustrated in a diagram) with the above configuration. FIG. 14 is a flowchart illustrating the flow of "3. Add group issuer" described above. FIG. 14 illustrates the flow of each process carried out on the terminal A of the group manager A and on the terminal B of a candidate for an issuer B (to be referred to as "candidate issuer B" hereinafter). Here, a user who was selected by the group manager as a candidate for a group issuer is referred to as a "candidate issuer". Note that FIG. 15 shows information possessed by the terminal B after the processing shown in FIG. 14.

On the instructions of the group manager A, the terminal A of the group manager A prepares, in advance, a pair of a group public key KG_P and a group private key KG_S, and makes public the group public key KG_P out of such prepared keys (S501).

Similarly, the terminal B of the candidate issuer B stores, in advance, a pair of a public key KB_P and a private key KB_S on the instructions of the terminal B of the candidate issuer B (S502). These keys may be prepared on the basis of information specified by candidate issuer B (pass phrase), or a character string prepared on the basis of a program or the functionality of the terminal B (e.g. keys prepared on the basis of random numbers).

Next, on the instructions of the manager A, the terminal A selects the user terminal B as an additional group issuer, and specifies the entry point information of the terminal B (S503), by using the following method, for example:

(1) The terminal A searches for a user participating in the group by utilizing the information search method of the P2P network illustrated in FIG. 1. A user who has responded to such search sends, through its terminal, information for identifying such user and its own entry point information to the terminal A. Subsequently, the terminal A selects the user B who is deemed appropriate, on the basis of the received information; and (2) the terminal A notifies the terminal B of the candidate issuer B that the terminal B has been selected as a group issuer candidate, by using a method such as E-mail which includes some means other than the P2P network. The terminal B responds to the terminal A by sending its own entry point information, if the terminal B wishes to accept this request to be a group issuer.

Next, the terminal A requests the terminal B to send the public key of the candidate issuer B (S504). Subsequently, the terminal B sends the public key KB_P of the candidate issuer B to the terminal A (S505).

Furthermore, the terminal A creates a group participation certificate issue permit I_B=e (KB_P+T_B, KG_S) by encrypting the result of attaching expiration date information T_B to the public key KB_P of the candidate issuer B, using the group private key, and sends the group participation certificate issue permit I_B to the terminal B (S506).

Then, the terminal B receives the group participation certificate issue permit I_B from the terminal A (S507).

Through the above processing, it is possible for the terminal B to issue group participation certificates for other users. Note that FIG. 15 shows information possessed by the terminal B (i.e. three types of key information and the group participation certificate issue permit) at the point of time when the above processing completes.

Note that although the terminal A makes a request to the terminal B concerning group issuer as illustrated in FIG. 14 (S503), it is also possible that the terminal B makes a request of the terminal A indicating that the terminal B wishes to be granted the authority to issue group participation certificate issue permits, and then the terminal A approves such request.

Next, referring to FIG. 16, a detailed explanation is given of the process "6. Request new membership to group". FIG. 16 is a flowchart showing the flow of each process carried out on the terminal X of a user X requesting membership (to be referred to as "membership requester X" hereinafter) and on the terminal B of the group issuer B. FIG. 17 shows information possessed by the terminal X at the point of time when the processing for requesting new membership to the group completes. Note that the terminal B shall hold the information shown in FIG. 15.

First, the terminal X obtains the public key KG_P of the group the membership requester X wishes to join (Refer to "4. Obtain group information), and specifies the terminal B of the group issuer B at the same time (S701) (refer to "5. Obtain entry point information").

Next, the terminal X creates an arbitrary character string S on the instructions of the membership requester X, so as to make a request for new membership to the group (S702). This character string S may be a character string itself which has been inputted by the membership requester X, or a character string created on the basis of a program or the functionality of the terminal X (e.g. a character string created on the basis of random numbers).

Subsequently, the terminal B sends, to the terminal X, a character string S'=e (S, KB_S) that results from encrypting the character string S with the group private key KB_S of the issuer B and the group participation certificate issue permit I_B (S703).

Then, the terminal X decrypts the group participation certificate issue permit I_B with the group public key KG_P so as to obtain the public key KB_P and the expiration date T_B of the issuer B (S704).

Furthermore, the terminal X verifies whether or not the group participation certificate issue permit I_B has been normally decrypted by the group public key KG_P and the expiration date T_X is valid. If the group participation certificate issue permit I_B is proven not to be decrypted normally or beyond the expiration date, the terminal X terminates this process with the membership requester X being unable to join the group, since it cannot be verified that the group participation certificate issue permit I_B possessed by the terminal B is one which was encrypted by the private key KG_S of the group manager, i.e. that the terminal B is surely the terminal of the group issuer B.

Next, the terminal X decrypts the encrypted character string S' with the public key KB_P of the membership requester B (S706).

The terminal X further verifies if the character string S' has been normally decrypted using the group public key KB_P and the decrypted character string is equal to the original character string S (S707). Accordingly, it is possible to verify that the character string S' has been encrypted with the private key KB_S corresponding to the public key KB_P of the issuer B, i.e. that the terminal B is surely the terminal of the group manager B who holds the private key KB_S. When the decryption failed, or the result of the decryption is not equal to the original character string S (S707: No), meaning that it is impossible to verify that the terminal B is the terminal of the group issuer B, the terminal X terminates this process with the membership requester X being unable to join the group.

When the decryption has ended in success and the decryption result is equal to the character string S (S707: Yes), the terminal X sends the public key KX_P of the membership requester X to the terminal B (S708).

Then, the terminal B prepares a group participation certificate C_X of the membership requester X, and sends the group participation certificate C_X to the terminal X (S709). Such group participation certificate C_X is prepared by encrypting the result of attaching an expiration date T_X indicating the date and time when the group participation certificate expires to the public key KX_P of the terminal X (KX_P+T_X), by using the private key KB_S of the issuer B. Such group participation certificate C_X can be represented as follows:

$$C\_X=e(KX\_P+T\_X, KB\_S)$$

As a method to attach the expiration date T_X to the public key KX_P of the membership requester X, any method may be employed as long as the expiration date T_X and the public key KX_P cannot be separated before decryption and can be separated by means of decryption in such method. An example method is one in which results of representing the public key KX_P and the expiration date T_X respectively are connected by using a predetermined symbol (e.g. hyphenation "-").

Finally, the terminal X receives the group participation certificate C_X from the terminal B, and the processing for requesting new membership to the group performed by the membership requester X completes (S710). Note that FIG. 17 shows information possessed by the terminal X at the point of time when the above processing completes.

Note that although the public key KX_P of the membership requester X is sent to the terminal B (S708) in the present embodiment, such public key KX_P may be sent before that step, or more specifically, while a request for the issue of a group participation certificate is made (S702).

Also note that it is also possible that the membership requester X also sends information by which the terminal B can identify the membership requester X (S105 in FIG. 9) so that the terminal B can judge whether or not to let the membership requester X join the group on the basis of such information, as in the case of the first embodiment, and that the terminal B terminates this process without allowing the membership requester X to join the group, when judging not to let the membership requester X in the group.

Figure 19:
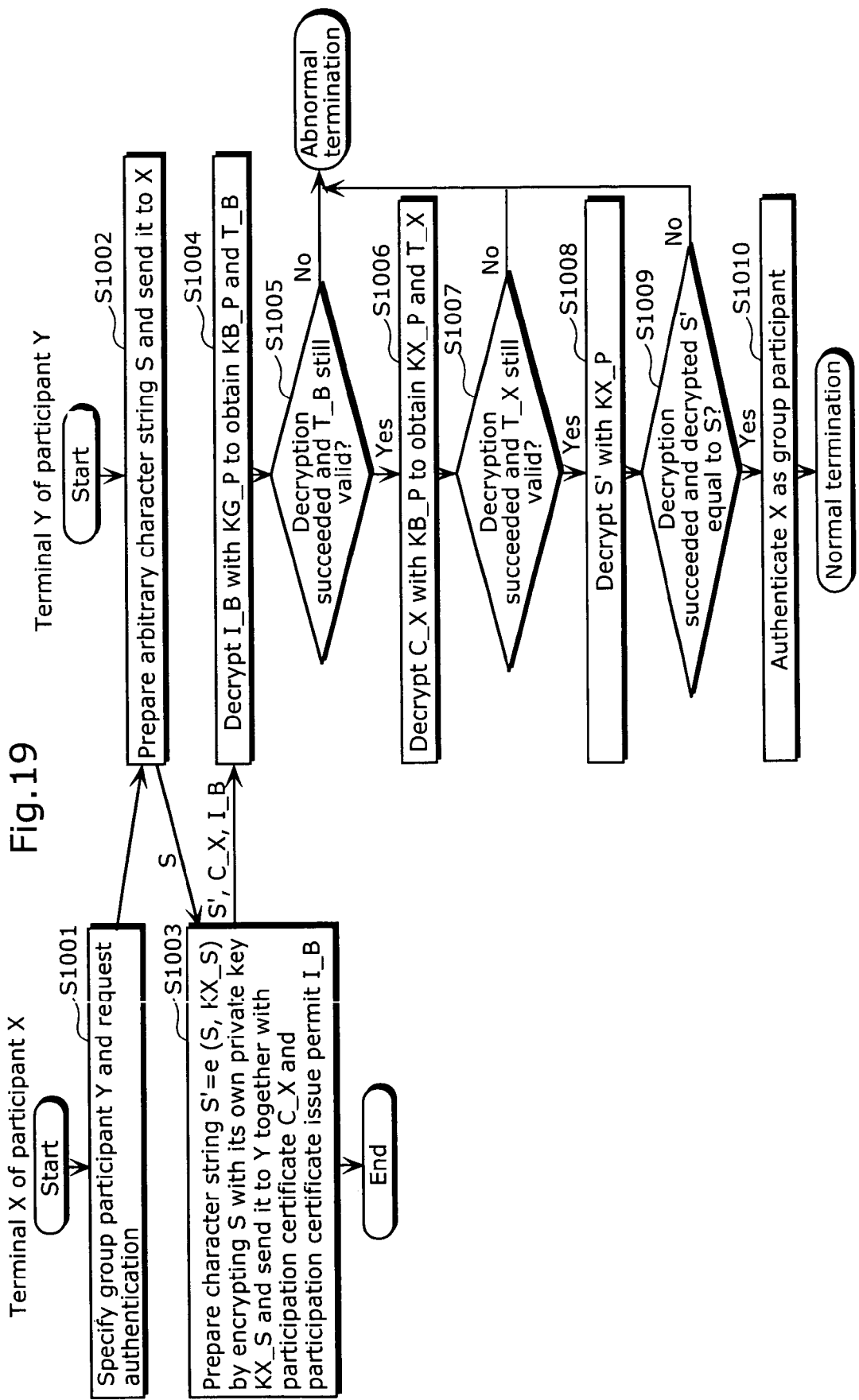
FIG. 19 is a flowchart showing a flow of the process "Authenticate each other between group members" in the second embodiment.

Next, referring to FIG. 19, a detailed explanation is given of the process "7. Authenticate each other between group members". FIG. 19 is a flowchart showing the flow of each process carried out on the terminal X of a group participant X and on the terminal Y of the group participant Y who have obtained group participation certificates. Note that FIGS. 17 and 18 show information possessed by the terminals X and Y, respectively.

Note that an explanation is omitted of the processing equivalent to the one shown in FIG. 11 in the first embodiment.

The terminal X creates a character string $S'=e(S, KX\_S)$ that results from encrypting the character string S with the private key KX_S of the participant X, and sends, to the terminal Y, the group participation certificate issue permit I_B and the group participation certificate C_X sent by the group manager (S1003).

Then, the terminal Y decrypts the group participation certificate issue permit I_B with the group public key KG_P so as to obtain the public key KB_P of the group issuer and the expiration date T_B of the group participation certificate (S1004).

Furthermore, the terminal Y verifies whether or not the decryption has succeeded and whether or not the obtained expiration date T_B is valid (S1005). If the decryption failed, it means that the group participation certificate issue permit has not been correctly encrypted with the group private key KG_S, and if it is beyond the expiration date, it means that the group participation certificate issue permit is invalid. Thus, in any case (S1005: No), the terminal Y regards the terminal X as not being a group member, and terminates this process.

When the decryption has succeeded and it is not beyond the expiration date, the terminal Y decrypts the group participation certificate of the terminal X with the public key KB_P of the group issuer so as to obtain the public key KX_P of the participant X and the expiration date T_X included in the group participation certificate of the participant X (S1006). Then, the terminal Y verifies whether or not the decryption has succeeded and whether or not the obtained expiration date T_X is valid (S1007). If the decryption failed, it means that the group participation certificate has not been encrypted with the group private key KB_S of the group issuer, and if it is beyond the expiration date, it means that the group participation certificate is invalid.

Thus, in any case (S1007: No), the terminal Y regards the terminal X as not being a group member, and terminates this process.

Next, the terminal Y decrypts the encrypted character string S' with the public key KX_P of the participant X (S1008). Furthermore, the terminal Y verifies whether or not the character string S' has been decrypted successfully and whether or not the decrypted character string matches the original character string S (S1009). When the decryption failed or the decrypted character string does not match the character string S (S1009: No), the terminal Y regards the terminal X as a third person pretending to be a group member, and terminates the process, since it indicates that the participant X does not hold the private key KX_S corresponding to the public key KX_P.

Through the above processing, the terminal Y authenticates the terminal X as a group participant, when the following items are all verified (S1010):

(1) The group participation certificate is not beyond the expiration date;

(2) The terminal X holds the private key KX_S corresponding to the encrypted public key KX_P in the group participation certificate;

(3) The group participation certificate issue permit of the group manager who issued the group participation certificate is not beyond the expiration date;

(4) The group issuer who issued the group participation certificate holds the private key KB_S corresponding to the encrypted public key KB_P in the group participation certificate issue permit; and (5) The group participation certificate issue permit is encrypted by the group manager using the group private key KG_S.

Then, the above processes (S1001–S1010) are carried out with the positions of the terminals X and Y being exchanged. If these processes end in success, the terminal X authenticates the terminal Y as a group participant, and mutual authentication between the terminals X and Y completes.

Figure 20:
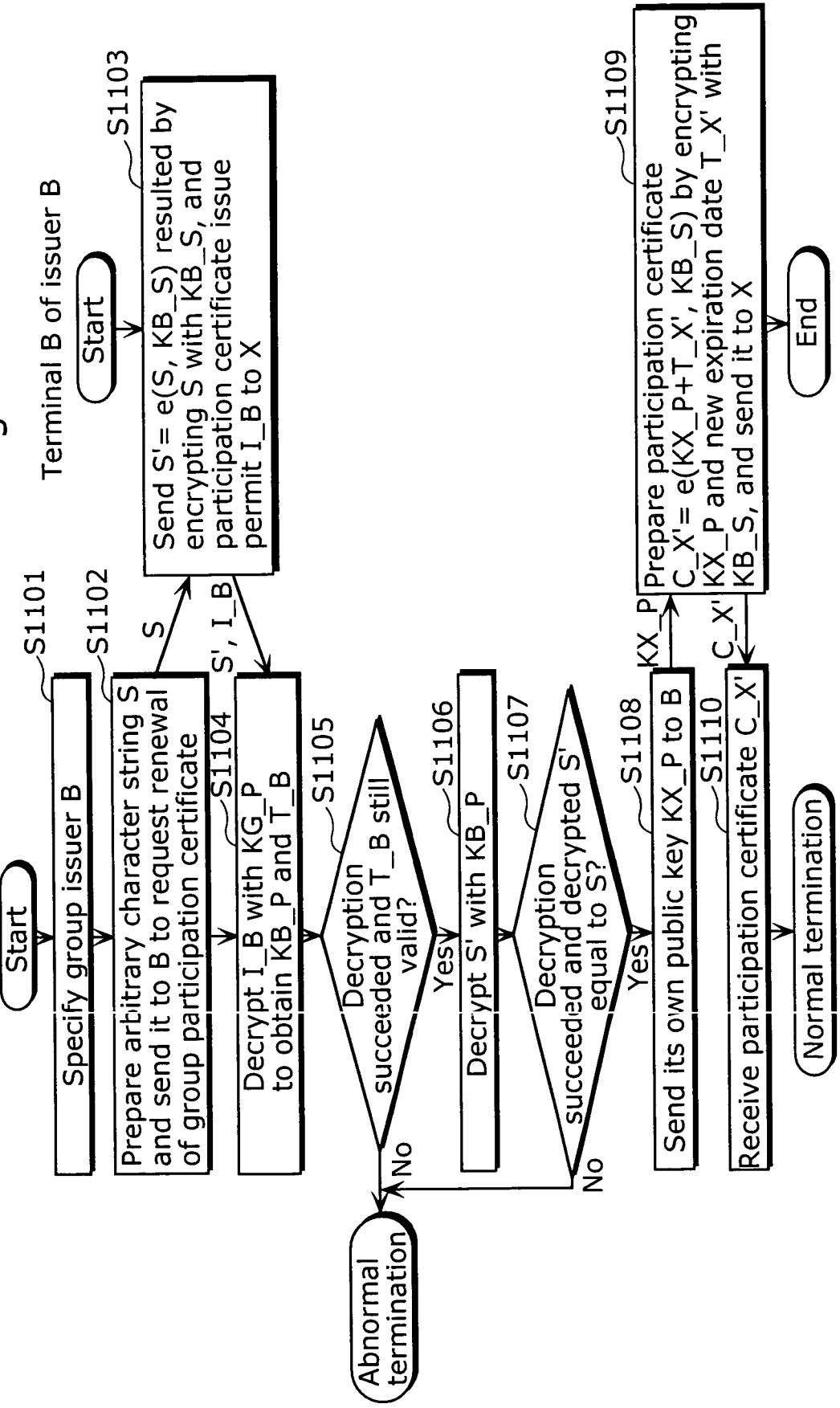
FIG. 20 is a flowchart showing a flow of a process "Renew group participation certificate" in the second embodiment.

Next, referring to FIG. 20, a detailed explanation is given of the process "9. Renew group participation certificate". FIG. 20 is a flowchart showing the flow of each process carried out on the terminal X of an X requesting for the renewal of the participation certificate (to be referred to as "participation certificate renewal requester X" hereinafter) and on the terminal B of the group issuer B. Note that FIG. 21 shows information possessed by the terminal X at the point of time when the processing for renewing the group participation certificate completes. Also note that FIG. 17 shows information possessed by the terminal X, and FIG. 15 shows information possessed by the terminal B, respectively.

In the following, an explanation shall be omitted of processing equivalent to the one shown in FIG. 16.

First, the terminal X specifies the terminal B of the group issuer B (S1101) (Refer to "5. Obtain entry point information"). Note that the issuer B is specified as a group issuer here, but processing described hereinafter shall be applicable to any issuer as long as such issuer belongs to the same group.

Next, the terminal X creates an arbitrary character string S under instructions from the participation certificate renewal requester X, and sends the character string S to the terminal B so as to request the renewal of the participation certificate, as in the case of FIG. 16 (S1102).

Upon receipt of the public key KX_P of the participation certificate renewal requester X from the terminal X (S1108), the terminal B prepares a new group participation certificate of the participation certificate renewal requester X, and sends the new group participation certificate to the terminal X (S1109). More specifically, the following serves as the new group participation certificate: C_X'=e (KX_P+T_X', KG_S) created by encrypting the result of attaching a new expiration date T_X' to the public key KX_P of the participation certificate renewal requester X, by using the group private key KB_S of the terminal B.

Accordingly, the terminal X receives the renewed participation certificate C_X', and the processing for renewing the group participation certificate completes (S1110). FIG. 21 shows information possessed by the terminal X at the point of time when the processing for renewing the group participation certificate completes.

Figure 22:
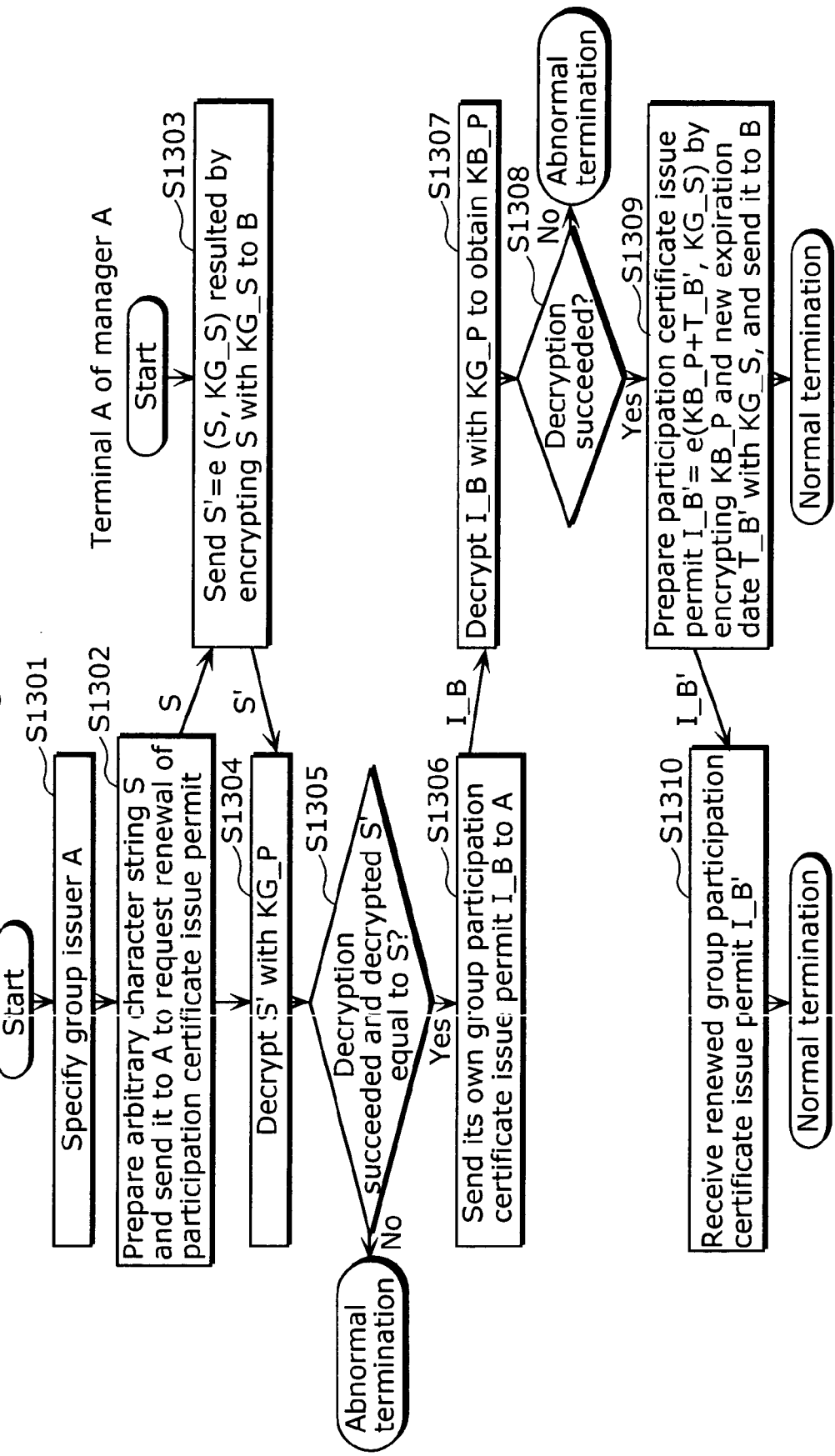
FIG. 22 is a flowchart showing a flow of a process "Renew group participation certificate issue permit" in the second embodiment.

Next, referring to FIG. 22, a detailed explanation is given of the process "10. Renew group participation certificate issue permit". FIG. 22 is a flowchart showing the flow of each process carried out on the terminal B of the group issuer B and on the terminal A of the group manager A. Note that FIG. 23 shows information possessed by the terminal B at the point of time when the processing for renewing the group participation certificate issue permit completes.

First, the terminal B of the group issuer B specifies the group manager A (S1301). This specification is carried out in the same manner as that of "4. Obtain entry point information" in the first embodiment.

Next, the terminal B creates an arbitrary character string S, and sends the character string S to the terminal A so as to request the renewal of the participation certificate issue permit, as in the above case (S1302).

Accordingly, the terminal A creates a character string S'=e (S, KG_S) by encrypting the character string S with the group private key KG_S, and sends the encrypted character string S' to the terminal B (S1303).

Subsequently, the terminal B decrypts the encrypted character string S' with the group public key KG_P (S1304). Furthermore, the terminal B verifies if the character string S' has been normally decrypted with the group public key KG_P and the decrypted character string is equal to the original character string S. Accordingly, it is possible to verify that the character string S' has been encrypted with the private key KG_S corresponding to the group public key KG_P, i.e. that the manager A is surely the group manager who holds the group private key KG_S. When the decryption failed, or the result of the decryption is not equal to the original character string S (S1305: No), the terminal B terminates this process without being able to have its group participation certificate issue permit renewed, since it cannot verify that the manager A is surely the group manager.

When the decryption has ended in success and the decryption result is equal to the character string S (S1305: Yes), the terminal B sends the group participation certificate issue permit I_B of the issuer B to the terminal A (S1306).

Subsequently, the terminal A decrypts such group participation certificate issue permit I_B with the group public key KG_P so as to obtain the public key KB_P of the issuer B (S1307).

Furthermore, the terminal A verifies whether or not the group participation certificate issue permit I_B has been decrypted successfully. If the decryption succeeded (S1308: Yes), it is possible to confirm that the group participation certificate issue permit possessed by the terminal B has been encrypted with the group private key KG_S, i.e. that the terminal B is the terminal of an authorized group issuer. If the decryption failed (S1308: No), the terminal A terminates the process without renewing the group participation certificate issue permit of the terminal B, since it cannot verify that the terminal B is an authorized issuer of the group.

Subsequently, the terminal A creates a group participation certificate issue permit I_B'=e (KB_P+T_B', KG_S), which is a renewed version of the group participation certificate issue permit I_B, by encrypting the public key KB_P of the issuer B together with a new expiration date T_B' by using the group private key KG_S, and sends the renewed group participation certificate issue permit I_B' to the terminal B (S1309).

The terminal B receives the renewed group participation certificate issue permit I_B' from the terminal A (S1310). FIG. 23 shows information possessed by the terminal B at the point of time when the above processing for renewing the group participation certificate issue permit completes.

Note that, as in the case of expired participant information in the process "11. Remove group members", it is also possible to control the authority of a certain group issuer to issue group participation certificates by preparing, sharing and removing expiration information about such group issuer and by refusing to renew its group participation certificate issue permit.

A unique effect of the second embodiment is that it is possible to increase opportunities for new membership to a group without needing to duplicate the private key, which has a high degree confidentiality, by having only the group manager assign group issuers having the authority to issue group participation certificates where required.

Note that although a group participation certificate, a group participation certificate issue permit, and a expired participant list are encrypted with the private key of the group manager or a group issuer in the first and the second embodiments, since what is encrypted is a public key that is made public and expiration period information, which do not necessarily have to be kept secret, a signature may be created by the use of the above private key instead of performing encryption. Since it is also possible for a recipient to detect that the contents of the public key have been tampered with and a participation certificate issue permit has been issued illegally, there is no effect on the present invention.

Furthermore, an expiration date to be attached to a group participation certificate is a date and time when such group participation certificate becomes invalid in both the first and the second embodiments, it is also possible that a group participation certificate includes the date and time when the group participation certificate was issued, and the difference is determined between the time and date when the participation certificate is verified and the time and date of issue, so as to judge that it is within the expiration date if the determined difference is not beyond a predetermined period of time (e.g. one month).

Moreover, the present date and time to be used for judging an expiration date is extracted from the clock of an ordinary terminal, but since there arises a possibility that group authentication processing will be affected by a big time difference between the clocks of two users engaged in group authentication, group authentication processing should not be desirably performed if there is a big time difference between the two clocks. In order to address this problem, the following measures are assumed: if it is shown, as a result of comparing two clocks before performing group authentication, that there is a difference between two clocks which goes far beyond a predetermined reference value, (i) a caution is issued by a user who has detected such difference to a partner user and group authentication is not performed; (ii) adjust one clock to the other forcefully; and (iii) determine an average value between the two clocks and adjust both clocks to the determined average value.

Also, there is no mention about the encryption of a communication channel other than in "7. Share information between group members" of the first embodiment and "8. Share information between group members" of the second embodiment, but encryption may be similarly performed in all the processes. Such encryption is not mandatory since a third person cannot immediately make an illicit use of a group participation certificate or a group participation certificate issue permit to be exchanged, even if s/he obtains them, unless s/he obtains the private key of a group member or a group issuer. However, a communication channel may be encrypted for further enhanced security.

Furthermore, it may also be possible that a single user becomes a manger of more than one group by preparing and holding more than one pair of group public keys and group private keys. Similarly, it may also be possible that a single user becomes a member or an issuer of each of a plurality of groups, or belongs to a plurality of groups as a member with a different authority (i.e. manager, issuer and ordinary member) in each of such groups.

Third Embodiment

The present embodiment explains an embodiment in which a search is made for the above group on the P2P network. In this case, the following processes are assumed or required in order to make an access to a group member:

(1) Form group;
(2) Advertise group;
(3) Obtain group information;
(4) Obtain entry point information;
(5) Request new membership to group
(6) Authenticate each other between group members;
(7) Share information between group members;
(8) Renew group participation certificate;
(9) Remove group member;
(10) Add group manager; and
(11) Renew group public key;

Note that explanations of the above-listed processes are omitted since they are the same as those explained in the first embodiment.

As in the case of (2) of "3. Obtain group information" or (1) of "4. Obtain entry point information" in the first embodiment, when a participant of the group with a group participation certificate searches, through its terminal, for group information and entry point information utilizing the information search method of the P2P network, such member shall be notified of the latest group public key as a response from another member of the group. In this process, such searcher adds a "request indicating that such searcher wishes to be notified of the group public key" to a message to be prepared at the time of search. Each group member stores the history of the group public key, and upon receipt of the above message, sends the latest group public key as a response to such searcher, when the group public key included in such message is included in the group public key history possessed by such group member. A detailed explanation of a method for notifying a searcher who searches for entry point information of the latest group public key is given later.

Figure 26:
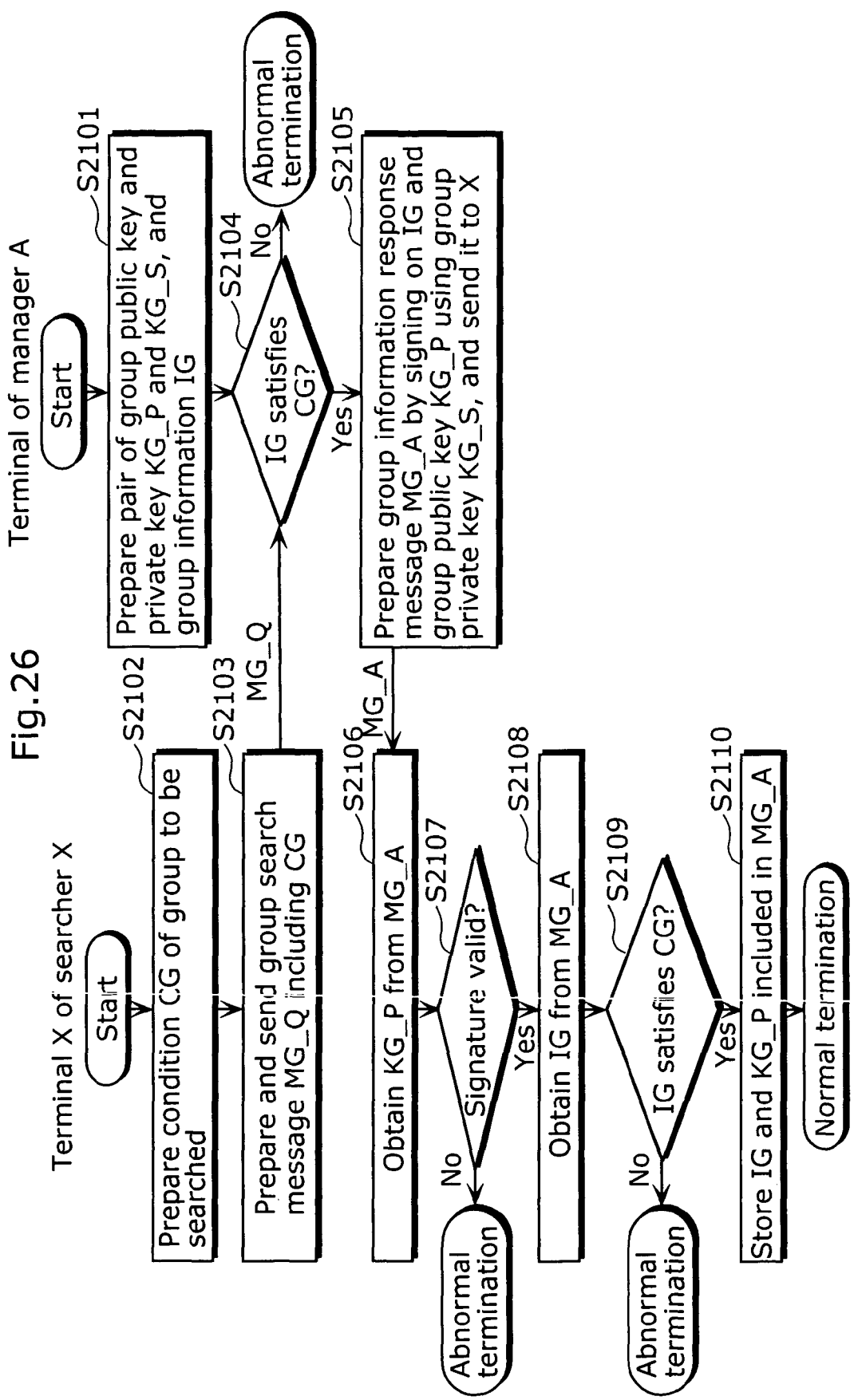
FIG. 26 is a flowchart showing a flow of a process "Obtain group information" in a third embodiment of the present invention.

Next, referring to FIG. 26, an explanation is given of the processing for obtaining group information by utilizing the information search method of the P2P network described in "3. Obtain group information". FIG. 26 is a flowchart showing the flow of each process carried out on the terminal X of a searcher X and on the terminal A of the group manager A. FIG. 27 shows information possessed by the terminal X at the point of time when the processing for obtaining the group information completes.

The terminal A prepares, in advance, a pair of the group public key KG_P and private key KG_S, and group information IG on the instructions of the group manager (S2101). Note that the group public key KG_P and the group information IG may be made public in advance (Refer to "1. Form group" and "2. Advertise group").

The terminal X prepares a condition CG which should be satisfied by a group wishes to whishes join (S2102) on the instructions of the searcher X. Such condition for search is assumed to be a group category and the like, but the present invention is not limited to this. Also, there is no limitation to forms for describing a search condition.

The terminal X prepares a group search message MG_Q which includes the prepared group condition CG, and sends the group search message MG_Q (S2103). This group search message MG_Q can be sent by means of broadcast, multicast, and a message transmission method of the P2P network, but the present invention is not limited to these methods.

Subsequently, the terminal A receives the group search message MG_Q, and compares the group condition CG included in this MG_Q with the group information IG of the group stored in the terminal A so as to judge if these conditions match each other (S2104). Such judgment may be automatically made by a program or the like. When the group condition CG and the group information IG do not match (S2104: No), the terminal A destroys the MG_Q to terminate the process, or sends the MG_Q to another user to terminate the process.

When the group condition CG and the group information IG match each other (S2104: Yes), the terminal A prepares a group information response message MG_A from the group information IG including the group public key KG_P, creates a signature on the MG_A by using the group private key KG_S, and sends the signed group information response message MG_A to the terminal X (S2105).

Upon receipt of the group information response message MG_A from the terminal A, the terminal X obtains the group public key KG_P included in such MG_A (S2106).

Furthermore, the terminal X verifies the validity of the signature on the MG_A by using the group public key KG_P (S2107). If the validity of the signature cannot be verified (S2107: No), there is a possibility that the MG_A has been tampered with by a third person, and therefore the terminal X destroys the MG_A to terminate the process.

When the validity of the signature has been verified (S2107: Yes), the terminal X obtains the group information IG from the group information response message MG_A (S2108).

Then, the terminal X compares the group information IG with the group condition CG so as to judge whether or not they match each other (S2109).

When judging that they do not match (S2109: No), the terminal X destroys the group information response message MG_A, and terminates the process.

Meanwhile, when judging that they match each other (S2109: Yes), the terminal X memorizes the group information IG and the group public key KG_P included in the group information response message MG_A received from the terminal A. Note that a message does not necessarily have to be prepared by the manager, and therefore, another embodiment is assumed in which another user caches a response message which was previously prepared by the manager so as to use the cached message for response.

With the above method, the searcher X can verify that the group information which s/he obtained as a response has been prepared by the group manager who possesses the group public key KG_P.

In other words, by using the group public key as an identifier for uniquely identifying the group and by adding a signature to the group information by the use of the group private key, it is possible to prevent anyone other than the group manager from falsifying information about the group.

Moreover, even if the manager of another group G2 would use the group public key of the above group G1 as an identifier of the group G2, it is impossible to fake the private key of the group G1 since it is virtually difficult to calculate the private key of the group G1 from the public key which is long enough to make it impossible at present.

Thus, the use of the above method solves the problems concerning the falsification of group information and the verification of the uniqueness of the groups.

However, a single group public key cannot serve as an identifier for verifying the uniqueness of the group, if the group public key is to be renewed from time to time for security reasons. In such a case, the uniqueness of the group needs to be assured by utilizing the history of the group public key as described later.

Figure 28:
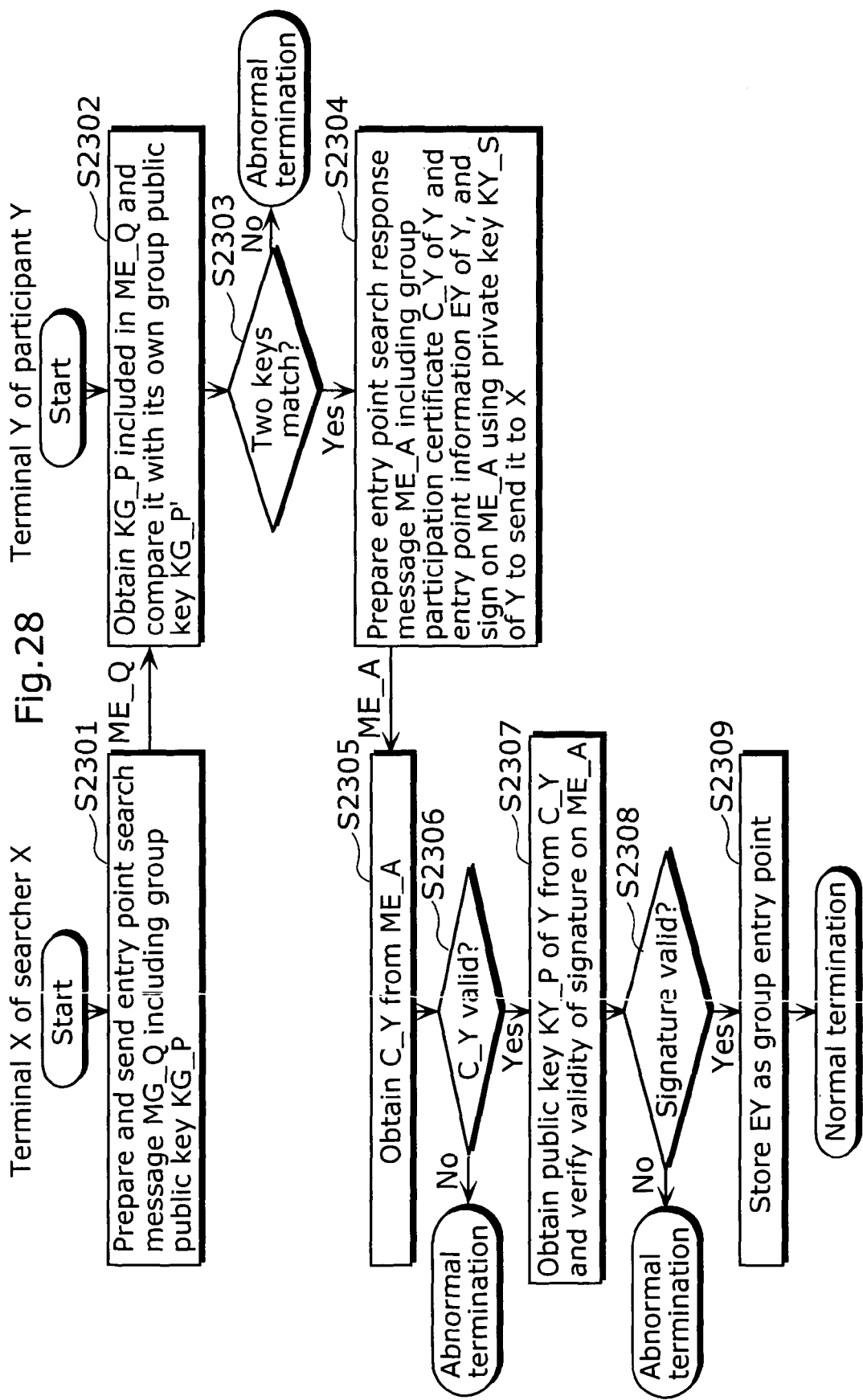
FIG. 28 is a flowchart showing a flow of a process "Obtain entry point information" in the third embodiment.

Next, referring to FIG. 28, a detailed explanation is given of the processing for obtaining entry point information, by utilizing the information search method of the P2P network as described in "4. Obtain entry point information". FIG. 28 is a flowchart showing the flow of each process carried out on the terminal X of a searcher X and on the terminal Y of the participant Y. FIG. 29 shows information possessed by the terminal X at the point of time when the processing for obtaining entry point information completes.

The terminal X prepares an entry point search message ME_Q which includes the group public key KG_P of the group whose entry point information the terminal X wishes to obtain, and sends the entry point search message ME_Q to the network (S2301). This entry point search message ME_Q can be sent by means of broadcast, multicast, unicast, and a message transmission method of the P2P network, but the present invention is not limited to any specific methods.

Upon receipt of the ME_Q, the terminal Y of the participant Y obtains the group public key KG_P included in the ME_Q, and compares the group public key KG_P with a group public key KG_P' of the group of Y (S2302).

When these two public keys do not match each other (S2303: No), the terminal Y destroys the ME_Q to terminate the process, or sends the ME_Q to another user to terminate the process.

When these two keys match each other (S2303: Yes), the terminal Y prepares an entry point search response message ME_A that includes a group participation certificate C_Y the terminal Y holds and its own entry point information EY, under instructions from the participant Y. Furthermore, the terminal Y creates a signature on the ME_A by using a private key KY_S of the participant Y, and sends the signed ME_A to the terminal X (S2304).

Subsequently, the terminal X obtains the C_Y from the received ME_A (S2305). Then, the terminal X verifies the validity of the C_Y by using the group public key KG_P (S2306). The validity of the C_Y can be verified by checking the following two points (S2306):

(1) If the C_Y can be normally decrypted with the KG_P, or the signature can be verified; and (2) If the expiration date is still valid.

When the validity of the C_Y cannot be verified (S2306: No), the terminal X destroys the ME_A to terminate the process.

The terminal X obtains the public key KY_P of the participant Y from the C_Y, and further verifies the validity of the signature on the ME_A by using the KY_P (S2307).

When the validity of the signature on the ME_A cannot be verified (S2308: No), the terminal X destroys the ME_A and terminates the process, regarding that there is a possibility that the ME_A has been tampered with by a third person.

When the validity of the signature on the ME_A has been verified (S2308: Yes), the terminal X authenticates the terminal Y as a member of the group to be identified by the KG_P, and memorizes the EY as an entry point of the group (S2309).

As described above, by using the group public key as information for uniquely identifying the group and by including, in a search response, information which attests that a participant is a member of the group to be identified by such group public key, it is possible to prevent anyone other than group members from falsifying entry point information.

Figure 30:
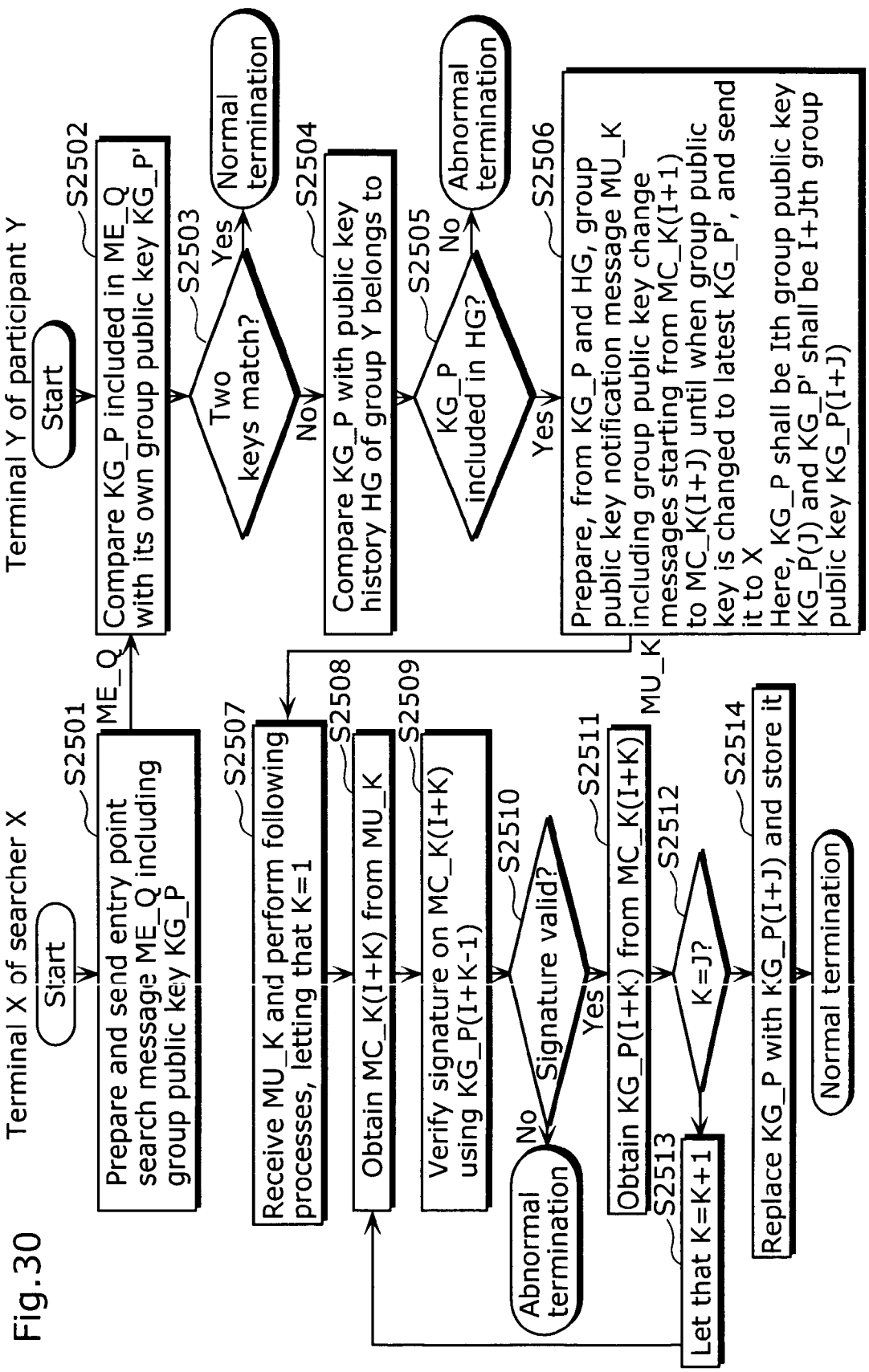
FIG. 30 is a flowchart showing a flow of a process "Renew group public key" in the third embodiment.

Next, referring to FIG. 30, a detailed explanation is given of a method for renewing the group public key explained in (4) in "11. Renew group public key". FIG. 30 is a flowchart showing the flow of each process carried out on the terminal X of an entry point searcher X and on the terminal Y of a participant Y who is a member of the group using such group public key. FIG. 31 shows information possessed by the terminal X at the point of time when the processing for renewing the group public key completes.

The terminal X of the searcher X prepares an entry point search message ME_Q which includes the group public key KG_P of the group whose entry point information the terminal X wishes to obtain, and sends the entry point search message ME_Q to the network (S2501). This entry point search message ME_Q can be sent by means of broadcast, multicast, unicast, and a message transmission method of the P2P network, but the present invention is not limited to any specific methods.

Upon receipt of the ME_Q, the terminal Y obtains the KG_P included in the ME_Q. Furthermore, the terminal Y compares a public key KG_P' of the group to which the participant Y belongs, with the KG_P (S2502).

When these two public keys do not match (S2503: No), the terminal Y judges whether or not the KG_P is included in a group public key history HG of the group to which the participant Y belongs (S2504).

When the KG_P is not included in the HG (S2505: No), the terminal Y destroys the ME_Q to terminate the process, or sends the ME_Q to another user to terminate the process.

Note that the terminal Y shall already possess a group public key change message MC_K which is indicative of a change of the group pubic key in the group public key history HG, together with such group public key history HG. Also, when the group public key is changed from KG_P (I) to KG_P (I+1), the group manager sends a group public key change message MC_K (I) to all the group members. The MC_K (I) includes the KG_P (I+1), the signature on which has been checked by the use of the KG_P (I) and KG_P (I+1), and therefore it is possible to verify that it has been issued by the manager who possesses the previous and latest group private keys.

If the KG_P is the $I^{th}$ key of the group and the KG_P' is the $I+J^{th}$ key of the group, the terminal Y prepares a group public key notification message MU_K including J pieces of group public key change messages starting from MC_K (I+1) to MC_K (I+J), and sends the group publication key notification message MU_K to the terminal X (S2506).

Subsequently, the terminal X receives the MU_K, and carries out the subsequent processes, letting that K=1 (S2507).

The terminal X obtains MC_K (I+K) from the received MU_K (S2508). Further, the terminal X verifies the validity of the signature on the MC_K (I+K), by using KG_P (I+K−1) (S2509).

When the validity of the signature cannot be verified (S2510: No), the terminal X destroys the MU_K, and terminates the process.

When the validity of the signature has been verified (S2510: Yes), the terminal X obtains KG_P (I+K) from the MC_K (I+K) (S2511).

Furthermore, the terminal X judges whether or not K and J are equal to each other (S2512). If K and J are not equal (S2512: No), the terminal X carries on the above processes (S2508~S2512), letting that K=K+1 (S2513).

Meanwhile, when K and J are equal (S2512: Yes), the terminal X replaces KG_P'=KG_P (I+J) with the KG_P as the latest group public key (S2514).

As above, by judging the uniqueness of the group by the use of the group public key history, it is possible to use, as a group identifier, such information as a group public key which is subject to renewal.

Moreover, the use of the above method enables a user having only an old group public key to be notified of the latest group public key and to verify the validity of such received latest group public key by using the previous group public key.

As described above, if a group uses a fixed group public key, it becomes possible to solve the problems concerning the verification of the uniqueness of the group and the falsification of the group information.

Fourth Embodiment

Members making up the group are only the manager and ordinary users in the third embodiment, but a larger number of managers, i.e. those who have the authority to issue group participation certificates (and therefore the duplication of the group private key) are required, in order to increase opportunities for new membership to the group, as stated in the first embodiment. However, if more than one user holds the group public key, there is a higher possibility that such group public key becomes subject to leakage.

The present embodiment is intended to improve the above problem, in which group members are categorized into three types of members: one and only group manager; issuers who have the authority to issue group participation certificates; and ordinary users. Here, only the group manager is allowed to grant, to a participant, the authority to issue group participation certificates, and only the group manager and group issuers are allowed to issue group participation certificates for ordinary users. As described above, if the manager assigns more than one issuer in the group, it is possible to increase opportunities for new membership to a group without needing to duplicate the group private key.

In order to manage such group, the following processes are required:
(1) Form group;
(2) Advertise group;
(3) Add group issuer
(4) Obtain group information;
(5) Obtain entry point information;
(6) Request new membership to group;
(7) Authenticate each other between group members;
(8) Share information between group members;
(9) Renew group participation certificate;
(10) Renew group participation certificate issue permit;
(11) Remove group member; and
(12) Renew group public key.

Note that explanations of the above-listed processes are omitted since they are the same as those explained in the first and the second embodiments.

Figure 32:
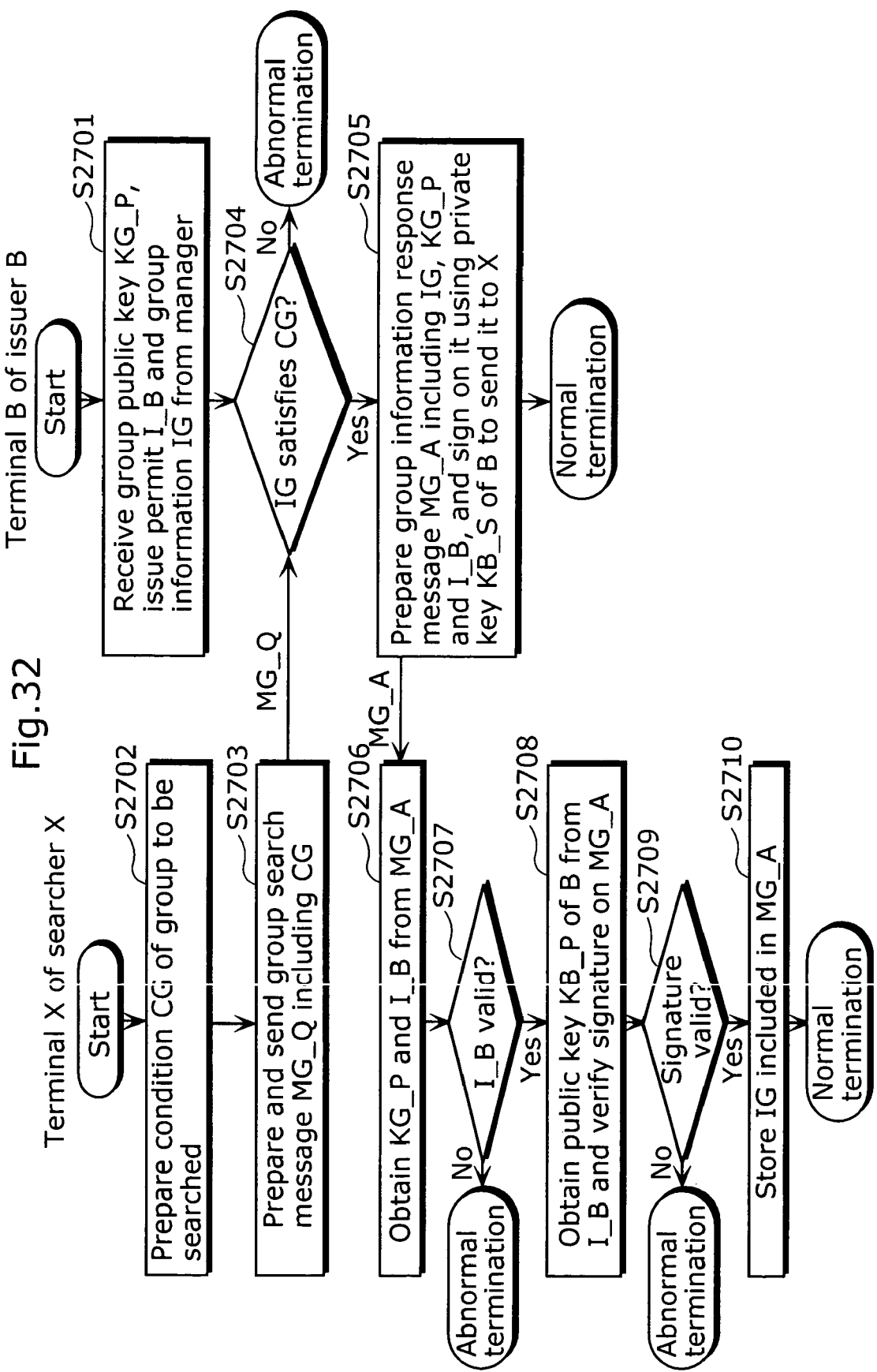
FIG. 32 is a flowchart showing a flow of a process "Obtain group information in a fourth embodiment of the present invention.

Next, referring to FIG. 32, a detailed explanation is given of the processing for obtaining the group information, utilizing the information search method of the P2P network described in "4. Obtain group information". FIG. 32 is a flowchart showing the flow of each process carried out on the terminal X of a group searcher X and on the terminal B of the group issuer B. Note that information possessed by the terminal X at the point of time when the processing for obtaining the group information completes is the same as the one illustrated in FIG. 27.

The terminal B obtains, from the group manger, a group participation certificate issue permit I_B and group information IG including the group public key KG_P, under instructions from the issuer B (S2701).

The terminal X prepares a condition CG which should be satisfied by a group the terminal X wishes to join (S2702) on the instructions of the searcher X. Such condition for search is assumed to be a group category and the like, but the present invention is not limited to this. Also, there is no limitation to forms for describing a search condition.

The terminal X prepares a group search message MG_Q which includes the prepared CG, and sends the group search message MG_Q to the network (S2703). This group search message MG_Q can be sent by means of broadcast, multicast, and a message transmission method of the P2P network, but the present invention is not limited to any specific transmission methods.

Subsequently, the terminal B receives the group search message MG_Q, and compares the CG included in this MG_Q with the group information IG of the group to which the issuer B belongs, so as to judge whether or not the group that the issuer B belongs to satisfies the condition indicated by the CG (S2704). Such judgment may be automatically made by a program or the like. When the CG and the IG do not match each other (S2704: No), the terminal B destroys the MG_Q to terminate the process, or sends the MG_Q to another user to terminate the process.

The terminal B prepares a group information response message MG_A that includes the IG including the group public key KG_P and the group participation certificate issue permit I_B of the issuer B. Then, after adding a signature on the MG_A by using the private key KB_S of the issuer B, the terminal B sends the signed MG_A to the terminal X (S2705).

Upon receipt of the group information response message MG_A from the terminal B, the terminal X obtains the KG_P and the I_B included in such MG_A (S2706).

Then, the terminal X verifies the validity of the I_B using the group public key KG_P (S2707). The validity of the I_B can be verified by checking the following two points:

(1) If the I_B can be normally decrypted, or the signature on the I_B can be verified; and (2) If the expiration date of the I_B is still valid.

When the validity of the I_B cannot be verified, the terminal X destroys the MG_A to terminate the process because of the possibility that the MG_A has been generated by a person who is not an authorized issuer.

The terminal X obtains the public key KB_P of the issuer B from the I_B, and further verifies the validity of the signature on the MG_A by using the KB_P (S2708). If the validity of the signature cannot be verified (S2109: No), there is a possibility that the MG_A has been tampered with by a third person, and therefore the terminal X destroys the MG_A to terminate the process.

The terminal X stores the IG included in the MG_A received from the terminal A (S2710).

With the above method, it is possible to prevent those users other than group issuers and the group manager from tampering with the group information.

Furthermore, the group public key can be used as information for uniquely identifying the group, as described in an example of obtaining the group information in the first embodiment. Note that a message does not necessarily have to be prepared by the manager, and therefore, another embodiment is assumed in which another user caches a response message which was previously prepared by the manager so as to use the cached message for response.

Figure 33:
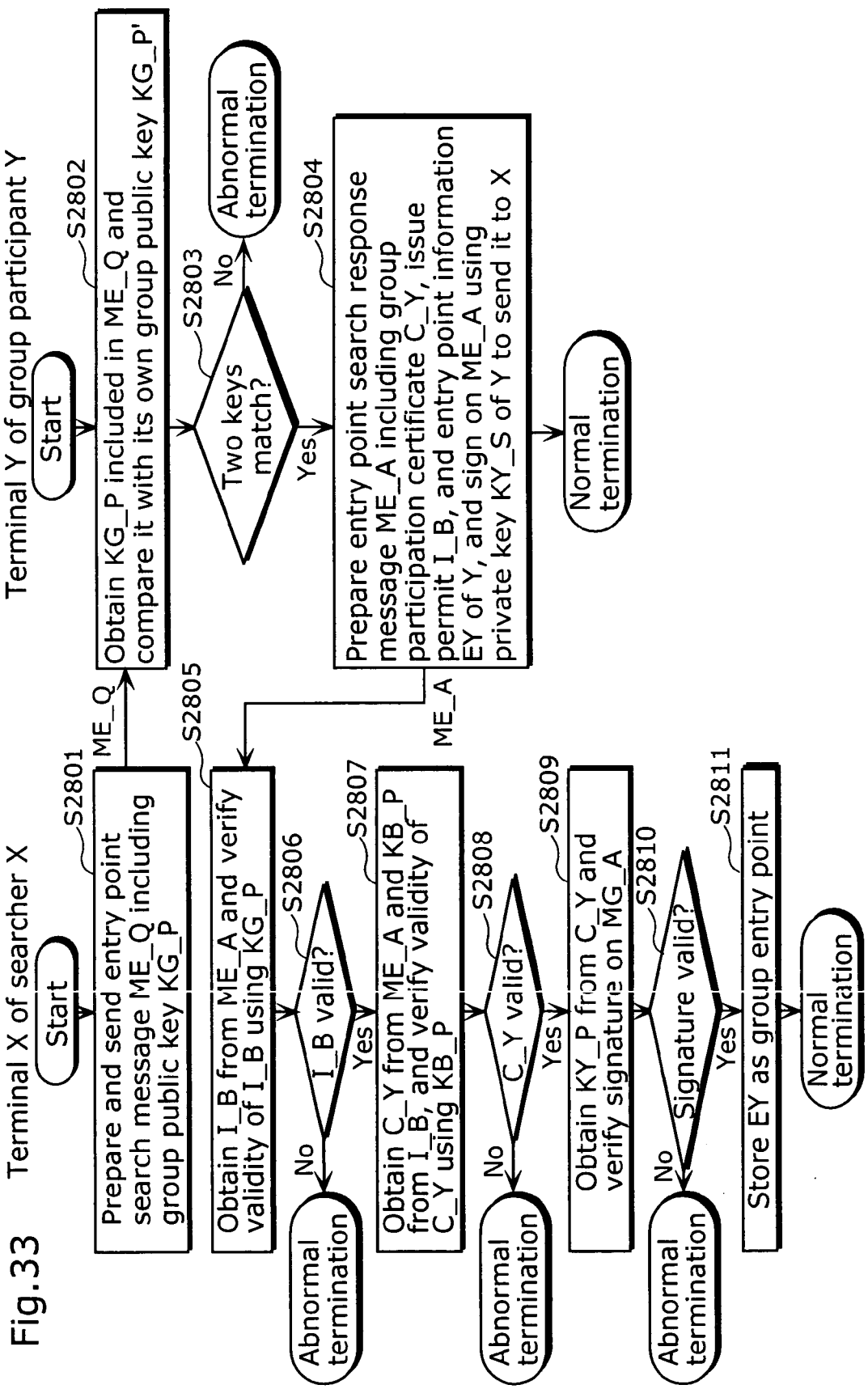
FIG. 33 is a flowchart showing a flow of a process "Obtain entry point information" in the fourth embodiment.

Next, referring to FIG. 33, a detailed explanation is given of the processing for obtaining entry point information by utilizing the information search method of the P2P network as described in "5. Obtain entry point information". FIG. 33 is a flowchart showing the flow of each process carried out on the terminal X of a searcher X and on the terminal Y of a group participant Y. Note that the group participation certificate of the participant Y shall have been issued by the group issuer B. FIG. 34 shows information possessed by the terminal X at the point of time when the processing for obtaining entry point information completes.

The terminal X prepares an entry point search message ME_Q which includes the group public key KG_P of the group whose entry point information the terminal X wishes to obtain, and sends the entry point search message ME_Q to the network (S2801). This entry point search message ME_Q can be sent by means of broadcast, multicast, unicast, and a message transmission method of the P2P network, but the present invention is not limited to any specific methods.

Upon receipt of the ME_Q, the terminal Y obtains the KG_P included in the ME_Q (S2802).

The terminal Y compares the public key KG_P' of the group which the participant Y belongs to, with the group public key KG_P (S2803). When these two public keys do not match each other (S2803: No), the terminal Y destroys the ME_Q to terminate the process, or sends the ME_Q to another user to terminate the process.

The terminal Y prepares an entry point search response message ME_A that includes a group participation certificate C_Y of the participant Y, the group participation certificate issue permit I_B of the group issuer B who issued the C_Y, and entry point information EY of the participant Y, under instructions from the participant Y. Furthermore, the terminal Y creates a signature on the ME_A by using a private key KY_S of the participant Y, and sends the signed ME_A to the terminal X (S2804).

Subsequently, the terminal X obtains the I_B from the received ME_A, and verifies the validity of the I_B using the KG_P (S2805).

When the validity of the I_B cannot be verified (S2806: No), the terminal X regards the participant Y as not belonging to the group, and destroys the ME_A to terminate the process.

When the validity of the I_B has been verified (S2806: Yes), the terminal X obtains the public key KB_P of the issuer B from such I_B, and further obtains the C_Y from the ME_A so as to verify the validity of the C_Y using the KB_P (S2807).

When the validity of the C_Y cannot be verified (S2808: No), the terminal X regards the terminal Y as not belonging to the group, and destroys the ME_A to terminate the process.

When the validity of the C_Y has been verified (S2808: Yes), the terminal X obtains the public key KY_P of the participant Y from the C_Y, and verifies the signature on the ME_Q (S2809).

When the validity of the sign cannot be verified (S2810: No), the terminal X destroys the ME_Q and terminates the process, regarding that there is a possibility that the ME_Q has been tampered with by a third person.

When the validity of the sign has been verified (S2810: Yes), the terminal X authenticates the terminal Y as a member of the group to be identified by the KG_P, and obtains the EY from the ME_A so as to memorize it as an entry point of the group (S2811).

By using the above method, it is possible to verify if a user who prepared entry point information is a member of the group.

As explained above, according to the communication system described in the third and the fourth embodiments, there is no need for a server that is required to be operated all the time. Moreover, by allowing a search result to be obtained by the use of the private key or the group participation certificate of a person who responds to such search, it is possible to prevent non-group members from responding to the search, i.e. those who falsify group information so as to make a fraudulent response.

What is claimed is:

1. A terminal apparatus that communicates with another terminal apparatus on a peer to peer network, said terminal apparatus possessing a public key of a group formed on the peer to peer network, said terminal apparatus comprising:

an inquiry information sending unit operable to send inquiry information to the other terminal apparatus, the inquiry information indicating an inquiry about whether or not the other terminal apparatus is a terminal apparatus of an authorized member of the group formed on the peer to peer network;

an encrypted information receiving unit operable to receive predetermined encrypted information from the other terminal apparatus in response to the inquiry information sent by said inquiry information sending unit;

a decryption trial unit operable to try decrypting the received encrypted information by using the group public key;

an information judgment unit operable to make a judgment as to whether or not decrypted information is appropriate, only when said decryption trial unit successfully decrypts the received encrypted information, and the decrypted information includes a group participation certificate whose expiration date does not exceed a predetermined expiration date; and a terminal judgment unit operable to judge that the other terminal apparatus is a terminal apparatus of an authorized member of the group, when said information judgment unit judges that the decrypted information is appropriate.

2. The terminal apparatus according claim 1, wherein:
said inquiry information sending unit is further operable to add, to the inquiry information, identification information for identifying said terminal apparatus, and send the inquiry information added with the identification information; and
said information judgment unit is further operable to judge whether or not the decrypted information includes the identification information, when making the judgment as to whether or not the decrypted information is appropriate.

3. The terminal apparatus according to claim 2, wherein:
said inquiry information sending unit is further operable to add, to the inquiry information, information indicating that a user of said terminal apparatus wishes to join the group, and send the inquiry information added with the information indicating that the user of said terminal apparatus wishes to join the group;
said information judgment unit is further operable to judge whether or not the decrypted information includes information indicating that the user of said terminal apparatus is approved to join the group; and
said terminal judgment unit is further operable to judge that the user of said terminal apparatus has joined the group, when said information judgment unit judges that the decrypted information includes the information indicating that the user of said terminal apparatus is approved to join the group.

4. The terminal apparatus according to claim 2, wherein:
said inquiry information sending unit is further operable to add an arbitrary character string to the inquiry information, and send the inquiry information added with the character string;
said information judgment unit is further operable to judge whether or not the decrypted information includes the character string and a participation certificate allowing a user of the other terminal apparatus to participate in the group; and
said terminal judgment unit is further operable to judge that the other terminal apparatus is a terminal apparatus of an authorized member of the group, when said information judgment unit judges that the decrypted information includes the character string and the participation certificate.

5. The terminal apparatus according to claim 4, wherein:
the participation certificate includes a specified expiration date;
said information judgment unit is further operable to judge whether or not the participation certificate included in the decrypted information is valid on the basis of the expiration date; and
said terminal judgment unit is further operable to judge that the other terminal apparatus is a terminal apparatus of an authorized member of the group, when said information judgment unit judges that the participation certificate is valid.

6. The terminal apparatus according to claim 2, wherein:
said inquiry information sending unit is further operable to add an arbitrary character string to the inquiry information, and send the inquiry information added with the character string;

said information judgment unit is further operable to judge whether or not the decrypted information includes the character string, a specified participation certificate, and a specified participation certificate issue permit; and
said terminal judgment unit is further operable to judge that the other terminal apparatus is a terminal apparatus of an authorized member of the group, when said information judgment unit judges that the decrypted information includes the character string, the participation certificate, and the participation certificate issue permit.

7. The terminal apparatus according to claim 6, wherein:
each of the participation certificate and the participation certificate issue permit individually includes a specified expiration date;
said information judgment unit is further operable to judge whether or not the participation certificate and the participation certificate issue permit included in the decrypted information are valid on the basis of the individual expiration date; and
said terminal judgment unit is further operable to judge that the other terminal apparatus is a terminal apparatus of an authorized member of the group, when said information judgment unit judges that both the participation certificate and the participation certificate issue permit are valid.

8. A communication method for a first terminal to communicate with a second terminal on a peer to peer network, wherein the first terminal possesses a public key of a group formed on the peer to peer network, said communication method comprising:
an inquiry information sending step of sending inquiry information to the second terminal, the inquiry information indicating an inquiry about whether or not the second terminal is a terminal of an authorized member of the group formed on the peer to peer network;
an encrypted information receiving step of receiving predetermined encrypted information from the second terminal in response to the inquiry information sent in said inquiry information sending step;
a decryption trial step of trying to decrypt the received encrypted information by using the group public key;
an information judgment step of making a judgment as to whether or not decrypted information is appropriate, only when said decryption trial step successfully decrypts the received encrypted information, and the decrypted information includes a group participation certificate whose expiration date does not exceed a predetermined expiration date; and
a terminal judgment step of judging that the second terminal is a terminal of an authorized member of the group, when the decrypted information is judged to be appropriate in said information judgment step.

9. The communication method according to claim 8, wherein:
said inquiry information sending step comprises adding identification information for identifying the first terminal to the inquiry information, and sending the inquiry information added with the identification information; and
said information judgment step comprises judging whether or not the decrypted information includes the identification information for identifying the first terminal, when the judgment is made on whether or not the decrypted information is appropriate.

10. The communication method according to claim 9, wherein:

said inquiry information sending step comprises adding information indicating that a user of the first terminal wishes to join the group to the inquiry information, and sending the inquiry information added with the information indicating that the user of the first terminal wishes to join the group;

said information judgment step comprises judging whether or not the decrypted information includes information indicating that the user of the first terminal is approved to join the group; and said terminal judgment step comprises judging that the user of the first terminal has joined the group, when said information judgment step judges that the decrypted information includes the information indicating that the user of the first terminal is approved to join the group.

11. The communication method according to claim 9, wherein:

said inquiry information sending step comprising adding an arbitrary character string to the inquiry information, and sending the inquiry information added with the character string;

said information judgment step comprises judging whether or not the decrypted information includes the character string and a participation certificate allowing a user of the second terminal to participate in the group; and said terminal judgment step comprises judging that the second terminal is a terminal of an authorized member of the group, when said information judgment step judges that the decrypted information includes the character string and the participation certificate.

12. The communication method according to claim 11, wherein:

the participation certificate includes a specified expiration date;

said information judgment step comprises judging whether or not the participation certificate included in the decrypted information is valid on the basis of the expiration date; and said terminal judgment step comprises judging that the second terminal is a terminal of an authorized member of the group, when said information judgment step judges that the participation certificate is valid.

13. The communication method according to claim 9, wherein:

said inquiry information sending step comprises adding an arbitrary character string to the inquiry information, and sending the inquiry information added with the character string;

said information judgment step comprises judging whether or not the decrypted information includes the character string, a specified participation certificate, and a specified participation certificate issue permit; and said terminal judgment comprises judging that the second terminal is a terminal of an authorized member of the group, when said information judgment step judges that the decrypted information includes the character string, the participation certificate, and the participation certificate issue permit.

14. The communication method according to claim 13, wherein:

each of the participation certificate and the participation certificate issue permit individually includes a specified expiration date;

said information judgment step comprises judging whether or not the participation certificate and the participation certificate issue permit included in the decrypted information are valid on the basis of the individual expiration date; and said terminal judgment step comprises judging that the second terminal is a terminal of an authorized member of the group, when said information judgment step judges that both the participation certificate and the participation certificate issue permit are valid.

15. A communication method for carrying out a communication between a first terminal and a second terminal on a network, wherein the first terminal possesses a public key of a group formed on the network and a pair of a private key and a public key of a first user who is a user of the first terminal, and the second terminal possesses a pair of a private key and a public key of the group, said communication method comprising steps A executed by the first terminal and steps B executed by the second terminal, wherein said steps A include:

an inquiry information sending step of sending inquiry information to the second terminal, the inquiry information indicating an inquiry about whether or not the second terminal is a terminal of an authorized member of the group;

an encrypted information receiving step of receiving predetermined encrypted information from the second terminal in response to the inquiry information sent in said inquiry information sending step;

a decryption trial step of trying to decrypt the received encrypted information by using the group public key;

an information judgment step of making a judgment as to whether or not decrypted information is appropriate, when said decryption trial step successfully decrypts the received encrypted information;

a manager judgment step of judging that the second terminal is a terminal of an authorized manager of the group, when the decrypted information is judged to be appropriate in the information judgment step;

a membership request sending step of sending membership request information to the second terminal judged to be the authorized manager in said manager judgment step, the membership request information including information indicating that the first user wishes to join the group and the pubic key of the first user; and a participation certificate receiving step of receiving a participation certificate indicating that the first user has been approved to join the group from the second terminal; and wherein said steps B include:

an inquiry information receiving step of receiving the inquiry information from the first terminal;

an encrypted information sending step of generating the encrypted information which has been encrypted according to the received inquiry information, and sending the generated encrypted information to the first terminal;

a membership request receiving step of receiving the membership request information from the first terminal;

a participation certificate generation step of generating the participation certificate on the basis of the received membership request information; and a participation certificate sending step of sending the generated participation certificate to the first terminal.

16. The communication method according to claim 15, wherein said steps B further include:

a request date specification step of specifying a date, month and year on which the membership request information was received; and an expiration date determination step of determining an expiration date of the participation certificate on the basis of the specified date, month, and year; and wherein said participation certificate generation step comprises generating the participation certificate according to the membership request information and the expiration date.

17. The communication method according to claim 15, wherein the network is a peer to peer network.

18. A communication method for carrying out a communication between a first terminal and a second terminal on a network, wherein the first terminal possesses a pair of a private key and a public key of a group formed on the network and a public key of a second user who is a user of the second terminal, and the second terminal possesses a public key of the group, said communication method comprising steps A executed by the first terminal and steps B executed by the second terminal, wherein said steps A include:

an inquiry information sending step of sending inquiry information to the second terminal, the inquiry information indicating an inquiry about whether or not the second terminal is a terminal of an authorized member of the group;

an encrypted information receiving step of receiving predetermined encrypted information from the second terminal in response to the inquiry information sent in said inquiry information sending step;

a decryption trial step of trying to decrypt the received encrypted information by using the group public key of the second user;

an information judgment step of making a judgment as to whether or not decrypted information is appropriate, when said decryption trial step successfully decrypts the received encrypted information;

a participant judgment step of judging that the second terminal is a terminal of an authorized participant in the group, when the decrypted information is judged to be appropriate in said information judgment step;

an assignment information sending step of sending assignment information to the second terminal when the second user, who is the user of the second terminal, is judged to be an authorized participant, the assignment information indicating that the second user is wished to be assigned as an issuer of the group who issues a participation certificate;

a public key receiving step of receiving the public key of the second user from the second terminal;

a public key judgment step of judging whether or not the received public key of the second user and the public key possessed by the first terminal match;

a permit generation step of generating a participation certificate issue permit indicating that authority to issue the participation certificate is granted to the second user; and a permit sending step of sending the generated participation certificate issue permit to the second terminal; and wherein said steps B include:

an inquiry information receiving step of receiving the inquiry information from the first terminal;

a public key sending step of sending the public key of the second user to the first terminal; and a permit receiving step of receiving the participation certificate issue permit from the first terminal.

19. The communication method according to claim 18, wherein said steps A further include:

a permission date specification step of specifying a date, month and year on which the public key of the second user was received; and an expiration date determination step of determining an expiration date of the participation certificate issue permit, on the basis of the specified date, month, and year; and wherein said permit generation step comprises generating the participation certificate issue permit according to the public key of the second user and the expiration date.

20. The communication method according to claim 18, wherein the network is a peer to peer network.

21. A communication method for carrying out a communication between a first terminal and a second terminal on a network, wherein the first terminal possesses a public key of a group formed on the network and a pair of a private key and a public key of a first user who is a user of the first terminal, and the second terminal possesses a public key of the group, said communication method comprising steps A executed by the first terminal and steps B executed by the second terminal, wherein said steps A include:

an inquiry information sending step of sending inquiry information to the second terminal, the inquiry information indicating an inquiry about whether or not the second terminal is a terminal of an authorized issuer of the group who has authority to issue a participation certificate;

a permit receiving step of receiving an encrypted participation certificate issue permit from the second terminal;

a decryption trial step of trying to decrypt the received participation certificate issue permit by using the public key of the group;

an information judgment step of making a judgment as to whether or not a decrypted participation certificate issue permit is appropriate, when said decryption trial step successfully decrypts the received participation certificate;

an issuer judgment step of judging that the second terminal is a terminal of an authorized issuer of the group, when the decrypted participation certificate issue permit is judged to be appropriate in said information judgment step;

a membership request sending step of sending membership request information to the second terminal judged to be the authorized issuer in said issuer judgment step, the membership request information including information indicating that the first user wishes to join the group and the pubic key of the first user; and a participation certificate receiving step of receiving a participation certificate indicating that the first user has been approved to join the group from the second terminal; and wherein said steps B include:
an inquiry information receiving step of receiving the inquiry information from the first terminal;
an encrypted information sending step of sending the encrypted participation certificate issue permit to the first terminal after the inquiry information is received;
a membership request receiving step of receiving the membership request information from the first terminal;
a participation certificate generation step of generating the participation certificate on the basis of the received membership request information; and
a participation certificate sending step of sending the generated participation certificate to the first terminal.

22. The communication method according to claim 21, wherein said steps B further include:
a request date specification step of specifying a date, month and year on which the membership request information was received; and
an expiration date determination step of determining an expiration date of the participation certificate on the basis of the specified date, month, and year; and
wherein said participation certificate generation step comprises generating the participation certificate according to the membership request information and the expiration date.

23. The communication method according to claim 21, wherein the network is a peer to peer network.

24. A communication system comprising a first terminal and a second terminal that communicate with each other on a network, said first terminal possessing a public key of a group formed on the network and a pair of a private key and a public key of a first user who is a user of the first terminal, and said second terminal possessing a pair of a private key and a public key of the group, wherein said first terminal includes:
an inquiry information sending unit operable to send inquiry information to said second terminal, the inquiry information indicating an inquiry about whether or not said second terminal is a terminal of an authorized member of the group;
an encrypted information receiving unit operable to receive predetermined encrypted information from said second terminal in response to the inquiry information sent by said inquiry information sending unit;
a decryption trial unit operable to try decrypting the received encrypted information by using the group public key;
an information judgment unit operable to make a judgment as to whether or not decrypted information is appropriate, when said decryption trial unit successfully decrypts the received encrypted information;
a manager judgment unit operable to judge that said second terminal is a terminal of an authorized manager of the group, when said information judgment unit judges that the decrypted information is appropriate;
a membership request sending unit operable to send membership request information to said second terminal judged to be the authorized manager by said manager judgment unit, the membership request information including information indicating that the first user wishes to join the group and the pubic key of the first user; and
a participation certificate receiving unit operable to receive a participation certificate indicating that the first user has been approved to join the group from said second terminal; and said second terminal includes:
an inquiry information receiving unit operable to receive the inquiry information from said first terminal;
an encrypted information sending unit operable to generate the encrypted information which has been encrypted according to the received inquiry information, and send the generated encrypted information to said first terminal;
a membership request receiving unit operable to receive the membership request information from said first terminal;
a participation certificate generation unit operable to generate the participation certificate on the basis of the received membership request information; and
a participation certificate sending unit operable to send the generated participation certificate to said first terminal.

25. The communication system according to claim 24, wherein said second terminal further includes:
a request date specification unit operable to specify a date, month and year on which the membership request information was received; and
an expiration date determination unit operable to determine an expiration date of the participation certificate on the basis of the specified date, month, and year; and
wherein said participation certificate generation unit is operable to generate the participation certificate according to the membership request information and the expiration date.

26. The communication system according to claim 24, wherein the network is a peer to peer network.

27. A communication system comprising a first terminal and a second terminal that communicate with each other on a network, said first terminal possessing a pair of a private key and a public key of a group formed on the network and a public key of a second user who is a user of the second terminal, and said second terminal possessing a public key of the group, wherein said first terminal includes:
an inquiry information sending unit operable to send inquiry information to said second terminal, the inquiry information indicating an inquiry about whether or not said second terminal is a terminal of an authorized member of the group;
an encrypted information receiving unit operable to receive predetermined encrypted information from said second terminal in response to the inquiry information sent by said inquiry information sending unit;
a decryption trial unit operable to try decrypting the received encrypted information by using the public key of the second user;
an information judgment unit operable to make a judgment as to whether or not decrypted information is appropriate, when said decryption trial unit successfully decrypts the received encrypted information;

a participant judgment unit operable to judge that said second terminal is a terminal of an authorized participant in the group, when said information judgment unit judges that the decrypted information is appropriate;

an assignment information sending unit operable to send assignment information to said second terminal when the second, who is the user of said second terminal is judged to be an authorized participant, the assignment information indicating that the second user is wished to be assigned as an issuer of the group who issues a participation certificate;

a public key receiving unit operable to receive the public key of the second user from said second terminal;

a public key judgment unit operable to judge whether or not the received public key of the second user and the public key possessed by said first terminal match;

a permit generation unit operable to generate a participation certificate issue permit indicating that authority to issue the participation certificate is granted to the second user; and a permit sending unit operable to send the generated participation certificate issue permit to said second terminal; and wherein said second terminal includes:
an inquiry information receiving unit operable to receive the inquiry information from said first terminal;
a public key sending unit operable to send the public key of the second user to said first terminal; and
a permit receiving unit operable to receive the participation certificate issue permit from said first terminal.

28. The communication system according to claim 27, wherein said first terminal further includes:
a permission date specification unit operable to specify a date, month and year on which the public key of the second user was received; and
an expiration date determination unit operable to determine an expiration date of the participation certificate issue permit, on the basis of the specified date, month, and year; and
wherein said permit generation unit is operable to generate the participation certificate issue permit according to the public key of the second user and the expiration date.

29. The communication system according to claim 27, wherein the network is a peer to peer network.

30. A communication system comprising a first terminal and a second terminal that communicate with each other on a network, said first terminal possessing a public key of a group formed on the network and a pair of a private key and a public key of a first user who is a user of said first terminal, and said second terminal possessing a public key of the group,
wherein said first terminal includes:
an inquiry information sending unit operable to send inquiry information to said second terminal, the inquiry information indicating an inquiry about whether or not said second terminal is a terminal of an authorized issuer of the group who has authority to issue a participation certificate;
a permit receiving unit operable to receive an encrypted participation certificate issue permit from said second terminal;
a decryption trial unit operable to try decrypting the received participation certificate issue permit by using the public key of the group;
an information judgment unit operable to make a judgment as to whether or not a decrypted participation certificate issue permit is appropriate, when said decryption trial unit successfully decrypts the received participation certificate issue permit;
an issuer judgment unit operable to judge that said second terminal is a terminal of an authorized issuer of the group, when said information judgment unit judges that the decrypted participation certificate issue permit is appropriate;
a membership request sending unit operable to send membership request information to said second terminal judged to be the authorized issuer by said issuer judgment unit, the membership request information including information indicating that the first user wishes to join the group and the pubic key of the first user; and
a participation certificate receiving unit operable to receive a participation certificate indicating that the first user has been approved to join the group from said second terminal; and
wherein said second terminal includes:
an inquiry information receiving unit operable to receive the inquiry information from said first terminal;
an encrypted information sending unit operable to send the encrypted participation certificate issue permit to said first terminal after receiving the inquiry information;
a membership request receiving unit operable to receive the membership request information from said first terminal,
a participation certificate generation unit operable to generate the participation certificate on the basis of the received membership request information; and
a participation certificate sending unit operable to send the generated participation certificate to said first terminal.

31. The communication system according to claim 30, wherein said second terminal further includes:
a request date specification unit operable to specify a date, month and year on which the membership request information was received; and
an expiration date determination unit operable to determine an expiration date of the participation certificate on the basis of the specified date, month, and year; and
wherein said participation certificate generation unit is operable to generate the participation certificate according to the membership request information and the expiration date.

32. The communication system according to claim 30, wherein the network is a peer to peer network.

33. A program, recorded on a computer-readable medium, for a terminal apparatus that communicates with another terminal apparatus on a network, wherein the first terminal apparatus possesses a public key of a group formed on the network, said program comprising:
an inquiry information sending step of sending inquiry information to the other terminal apparatus, the inquiry information indicating an inquiry about whether or not the other terminal apparatus is a terminal apparatus of an authorized member of the group;

an encrypted information receiving step of receiving predetermined encrypted information from the other terminal apparatus in response to the inquiry information sent in said inquiry information sending step;
a decryption trial step of trying to decrypt the received encrypted information by using the group public key;
an information judgment step of making a judgment as to whether or not decrypted information is appropriate, when said decryption trial step successfully decrypts the received encrypted information; and a terminal judgment step of judging that the other terminal apparatus is a terminal apparatus of an authorized member of the group, when the decrypted information is judged to be appropriate in said information judgment step.

34. The program according to claim 33, wherein the network is a peer to peer network.

* * * * *

UNITED STATES PATENT AND TRADEMARK OFFICE
CERTIFICATE OF CORRECTION

| | | |
|---|---|---|
| PATENT NO. | : 7,225,342 B2 | Page 1 of 1 |
| APPLICATION NO. | : 10/623742 | |
| DATED | : May 29, 2007 | |
| INVENTOR(S) | : Naoya Takao et al. | |

It is certified that error appears in the above-identified patent and that said Letters Patent is hereby corrected as shown below:

IN THE CLAIMS
In column 53, line 8, change "the second," to --the second user,--.

Signed and Sealed this

Eleventh Day of September, 2007

JON W. DUDAS
*Director of the United States Patent and Trademark Office*